US005666534A

United States Patent [19]
Gilbert et al.

[11] Patent Number: 5,666,534
[45] Date of Patent: Sep. 9, 1997

[54] METHOD AND APPARTUS FOR USE BY A HOST SYSTEM FOR MECHANIZING HIGHLY CONFIGURABLE CAPABILITIES IN CARRYING OUT REMOTE SUPPORT FOR SUCH SYSTEM

[75] Inventors: Jeremy H. Gilbert, Billerica; David B. Hout, Wilmington; Michael P. Keohane, Brighton, all of Mass.; David K. Perlow, Merrimack, N.H.; Daniel G. Peters, Nashua, N.H.; Eric J. Storch, Nashua, N.H.

[73] Assignee: Bull HN Information Systems Inc., Billerica, Mass.

[21] Appl. No.: 85,272

[22] Filed: Jun. 29, 1993

[51] Int. Cl.[6] .................................................. G06F 9/44
[52] U.S. Cl. ................. 395/651; 395/183.07; 395/200.54
[58] Field of Search .............................. 395/700, 200.11, 395/651

[56] References Cited

U.S. PATENT DOCUMENTS

| | | | |
|---|---|---|---|
| 5,111,384 | 5/1992 | Aslanian et al. | 395/575 |
| 5,210,757 | 5/1993 | Barlow et al. | 371/16.1 |
| 5,432,941 | 7/1995 | Crick et al. | 395/700 |
| 5,437,030 | 7/1995 | Reitman et al. | 395/650 |

OTHER PUBLICATIONS

"DPX/2 500 Remote Maintenance Facility Guide", Bull HN Information Systems Inc., Mar. 1991 Order No. LW07–00.

*Primary Examiner*—Thomas M. Heckler
*Assistant Examiner*—Kakali Chaki
*Attorney, Agent, or Firm*—Faith F. Driscoll; John S. Solakian

[57] ABSTRACT

A remote service facility (RSF) unit is integrated into the operating system of the host system being supported. The RSF unit utilizes a standard generic menu interface system (GMIS) unit through which a user can enter different types of commands which results in the display of a number of menu sequences for configuring how the different independently controllable components of the RSF unit will operate in performing remote support functions. The components include a problem detection and reaction component, a system action component and a callback component, each of which operatively couple to the GMIS unit. The components are integrated in a predetermined manner so that collectively, they carry out remote support according to the way in which they were configured.

52 Claims, 46 Drawing Sheets

```
Record of actions for source "system"
----------------------------------------------------------------
Date:    Thu Apr  1 14:26:34 1993
ACTION:  /usr/bin/callact
RESULT:  UNSUCCESSFUL (1)
OUTPUT:
    Performing Callout: Thu Apr 1 14:26:30 EST 1993
Error: Invalid message identifier
Specified ID is not a hexadecial number: hazel
Date:    Thu Apr  1 14:56:05 1993
ACTION:  /usr/bin/mailact
RESULT:  SUCCESSFUL
OUTPUT:
Date:     Fri Apr  2 12:53:26 1993
ACTION:  /usr/bin/callact
RESULT:  SUCCESSFUL
OUTPUT:
    Performing Callout: Fri Apr 2 12:53:19 EST 1993
    Successfully queued callout
Date:    Fri Apr  2 12:53:26 1993
ACTION:  /usr/bin/mailact
RESULT:  SUCCESSFUL
OUTPUT:
```

```
Record of actions on behalf of cluster nodes
----------------------------------------------------------------
Date:    Thu Apr  1 15:36:13 1993
ACTION:  /usr/bin/netcall
RESULT:  SUCCESSFUL
OUTPUT:
    Callout on behalf of cluster node fiver
    Successfully sent message to BRC
    Customer Service Request Number: 20823928
Date:    Thu Apr  1 15:39:58 1993
ACTION:  /usr/bin/netcall
RESULT:  SUCCESSFUL
OUTPUT:
    Callout on behalf of cluster node thayli
    Successfully sent message to BRC
    Customer Service Request Number: 20823929
Date:    Thu Apr  1 15:47:17 1993
ACTION:  /usr/bin/netcall
RESULT:  SUCCESSFUL
OUTPUT:
    Callout on behalf of cluster node hyzenthlay
    Successfully sent message to BRC
    Customer Service Request Number: 20823930
```

FIG. 5c

| ID | LABEL | TYPE | CLASS | ERROR DESCRIPTION |
|---|---|---|---|---|
| 00530EA6 | DMA_ERR | UNKN | H | UNDETERMINED ERROR |
| 0065D888 | LAN0030 | Temp | S | SOFTWARE PROGRAM ERROR |
| 1063B942 | LU0_ConfOp | PERM | S | CONFIGURATION OR CUSTOMIZATION ERROR |
| 019125F9 | LAN801E | Temp | S | SOFTWARE PROGRAM ERROR |
| 01F2D769 | X25_ALERT2 | PERM | H | X-25 RESTART REQUEST BY X.25 ADAPTER |
| 02288DD6 | LAN805C | Perm | S | SOFTWARE PROGRAM ERROR |
| 0260B082 | SDL800E | PERM | S | SOFTWARE PROGRAM ERROR |
| 026D4F56 | SDL801D | PERM | S | SOFTWARE PROGRAM ERROR |
| 0299F00B | FDDI_NOMBU | TEMP | S | RESOURCE UNAVAILABLE ERROR |
| 0375DFC2 | X25_ALERT9 | TEMP | H | X-9FRAME TYPE W RECEIVED |
| 038F2580 | SCSI_ERR7 | UNKN | H | UNDETERMINED ERROR |
| 038F3117 | MPQP_DSRDR | TEMP | H | COMMUNICATION PROTOCOL ERROR |
| 03ACD152 | NB20 | PERM | S | SOFTWARE PROGRAM ERROR |
| 429B097 | LAN0853 | Perm | S | SOFTWARE PROGRAM ERROR |
| 1C8C0 | VCA_INITZ | TEMP | S | Host independent initialization failed |
| 66 | SCSI_ERR1 | PERM | H | ADAPTER ERROR |
|  | SDL0014 | TEMP | S | SOFTWARE PROGRAM ERROR |
|  | MEM2 | PERM | H | Memory failure |
|  | CFG_BU | PERM | S | Configuration failed:ad bus type |

— SYSTEM LOG FILE

```
Jun 23 08:54:51 TP_init: Can't allocate memory for first IOPB
Jun 23 13:02:42 Feedback from MVU-MS does not indicate movement
Jun 23 13:02:46 Controller retries attempted before command completed
Jun 23 13:02:46 Can't allocate message buffer
Jun 23 13:02:51 Illegal (odd) count specified in S/G list
Jun 23 13:03:51 Video signal missing from TP module 2
Jun 23 13:02:55 Cannot start motor (4:2): fail, sense key is 0x2231
Jun 23 13:02:55 Cannot activate MVU 4 of TP module 2
Jun 23 13:03:57 Audio signal missing from TP module 2
Jun 23 13:03:59 Status reg 0x02, Bank 0x0003, Syndrome 0xFFFF, err on TP 2
Jun 23 13:05:00 Can't flush/unmap unit structure
Jun 23 13:05:00 Address not mapped properly
Jun 23 13:05:01 Can't dump more than 512 MB physical memory
```

—ASCII LOG FILE

FIG. 5e

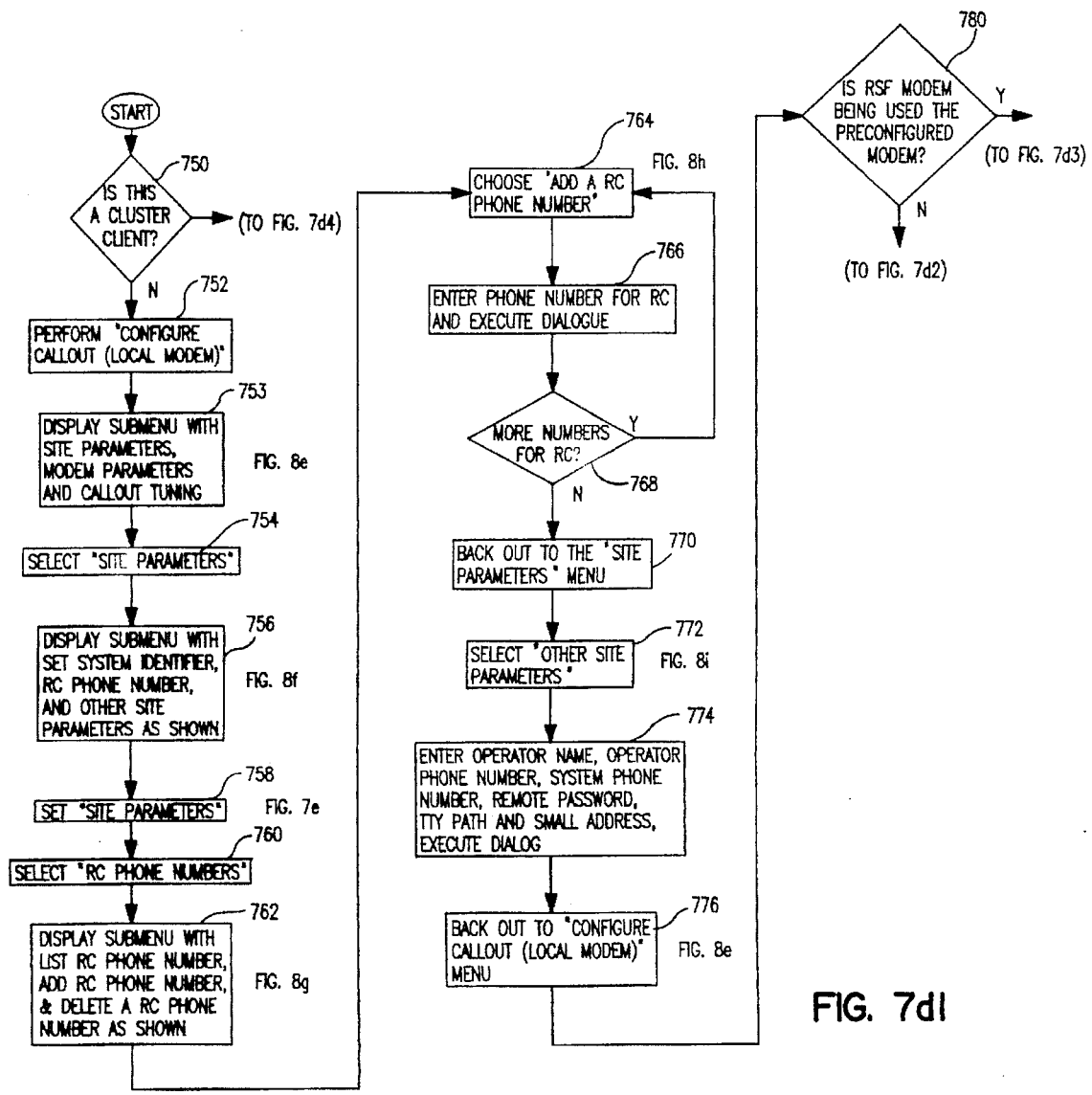
FIG. 7d1

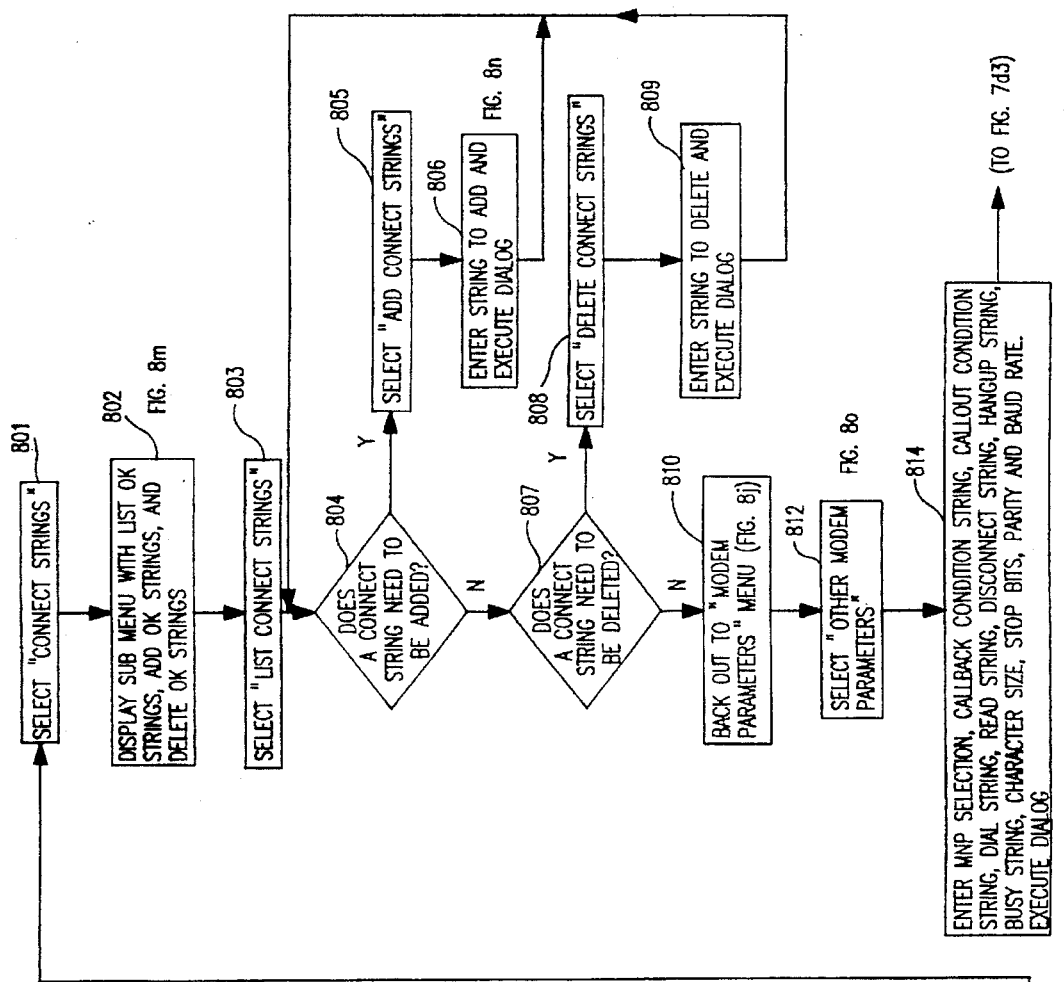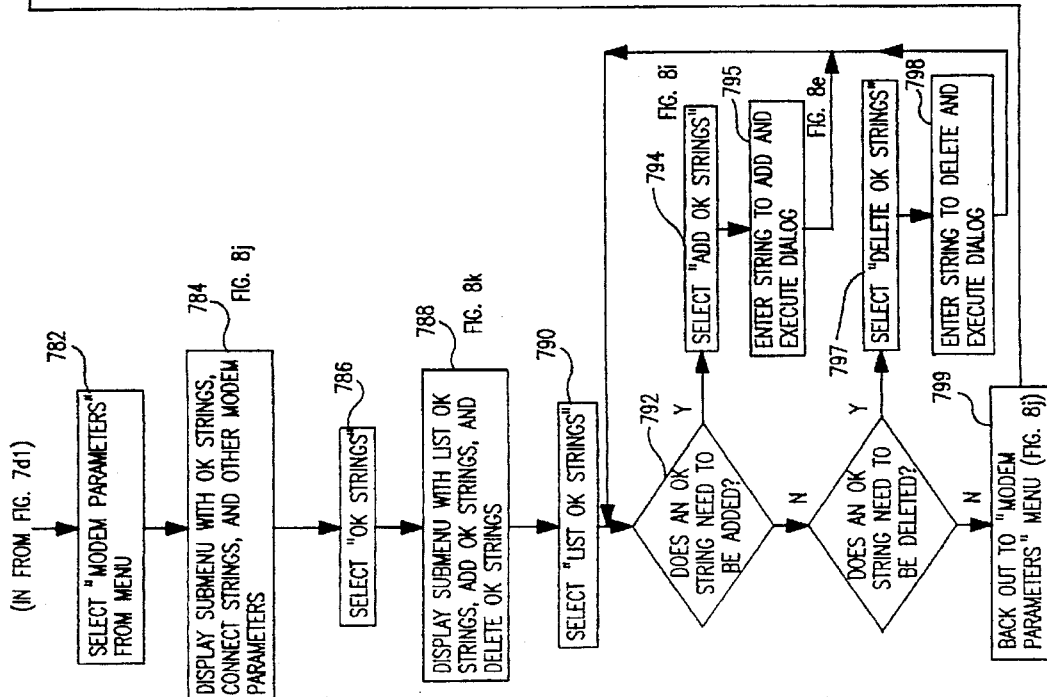
FIG. 7d2

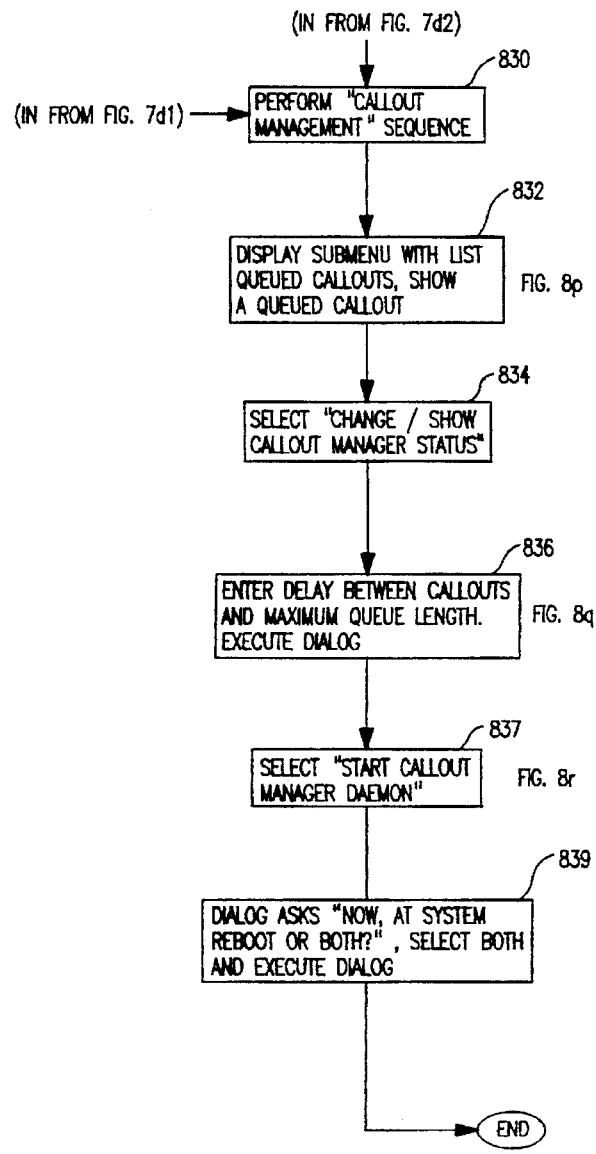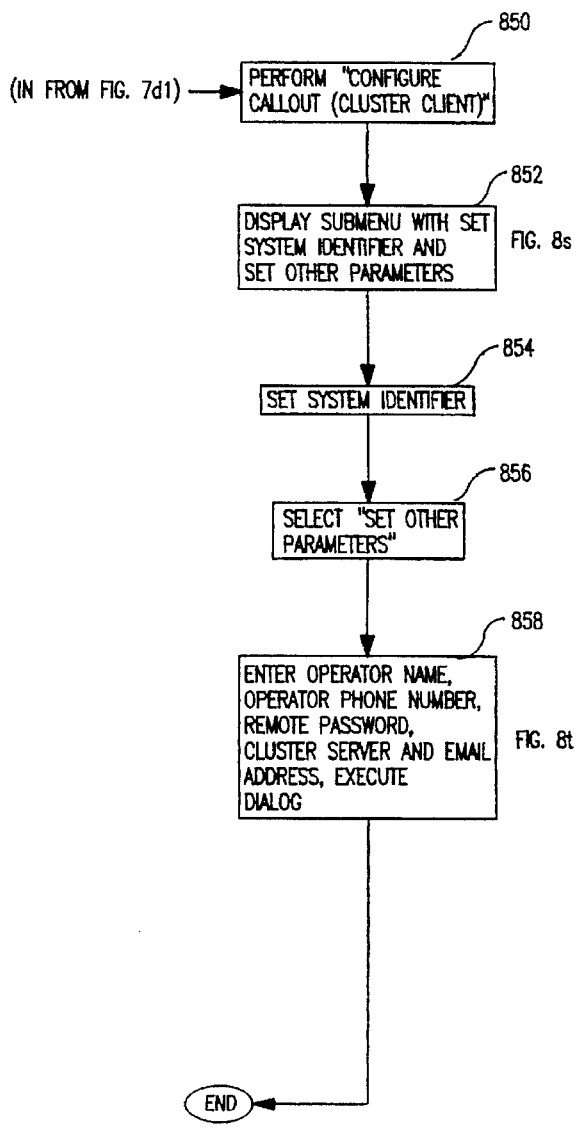
FIG. 7d3
FIG. 7d4

```
                   Install Software With Updates
Type or select values in entry fields.
Press Enter AFTER making all desired changes.
                                                     [Entry Fields]
* INPUT device / directory for software              /dev/fd0
* SOFTWARE to install                                [all]              +
  Automatically install PREREQUISITE software?       no                 +
  COMMIT software?                                   no                 +
  SAVE replaced files?                               yes                +
  VERIFY software?                                   no                 +
  EXTEND file systems if space needed?               yes                +
  REMOVE input file after installation?              no                 +

F1=Help          F2=Refresh          F3=Cancel          F4=List
Esc+5=Undo       Esc+6=Command       Esc+7=Edit         Esc+8=Image
Esc+9=Shell      Esc+0=Exit          Enter=Do
```

FIG. 8a

```
                   Install Software With Updates
Ty
Pr                      SOFTWARE to install Move cursor to desired item and press F7.
*     ONE OR MORE items can be selected.
*  Press Enter AFTER making all selections.                            +
                                                                       +
   [TOP]                                                               +
        # Option Name              Level                I/U O Content  +
        # ================================================================ +
          rsf.all                                                      +
        #    Description:  Will include ALL the images for rsf.        +
        #
          rsf.rsf.obj               00.17.0000.0000
        #  RSF (Remote Services Facilities) Software, Remote Se I  N usr,root
        #
   [MORE...21]

F1=Help            F2=Refresh          F3=Cancel
F1   Esc+7=Select       Esc+8=Image         Esc+0=Exit
Es   Enter=Do
Es
```

FIG. 8b

```
                         Add a Source
Type or select values in entry fields.
Press Enter AFTER making all desired changes.
                                                     [Entry Fields]
* Source Identifier                                  []                    /
* Source Path                                        []                    /
* Action                                             []
  Type                                               [ASCII]              +
  Cleantime                                          [1-day]
  Searchtime                                         [5-hours]
  Initialization File                                []                    /

F1=Help          F2=Refresh          F3=Cancel          F4=List
Esc+5=Undo       Esc+6=Command       Esc+7=Edit         Esc+8=Image
Esc+9=Shell      Esc+0=Exit          Enter=Do
```

FIG. 8c

```
                    Add a SYSTEM Message
Type or select values in entry fields.
Press Enter AFTER making all desired changes.
                                              [Entry Fields]
     Source Identifier                        system
     Message Identifier                       [ ]              +X
     Threshold                                [5]              +#
     Duration                                 [1-day]          +
     Keepmax                                  [20]             #
     Initialization File                      [ ]              /

F1=Help            F2=Refresh         F3=Cancel          F4=List
Esc+5=Undo         Esc+6=Command      Esc+7=Edit         Esc+8=Image
Esc+9=Shell        Esc+0=Exit         Enter=Do
```

FIG. 8d

```
                    Configure Callout (Local Modem)
Move cursor to desired item and press Enter.

Site Parameters
     Modem Parameters
     Callout Tuning

F1=Help            F2=Refresh         F3=Cancel          Esc+8=Image
Esc+9=Shell        Esc+0=Exit         Enter=Do
```

FIG. 8e

```
                         Site Parameters
Move cursor to desired item and press Enter.

Set System Identifier
     BRC Phone Numbers
     Other Site Parameters

F1=Help            F2=Refresh         F3=Cancel          Esc+8=Image
Esc+9=Shell        Esc+0=Exit         Enter=Do
```

FIG. 8f

```
                    BRC Phone Numbers
Move cursor to desired item and press Enter.

List BRC Phone Numbers
  Add a BRC Phone Number
  Delete a BRC Phone Number

F1=Help          F2=Refresh        F3=Cancel         Esc+8=Image
Esc+9=Shell      Esc+0=Exit        Enter=Do
```

FIG. 8g

```
                   Add a BRC Phone Number
Type or select values in entry fields.
Press Enter AFTER making all desired changes.

[Entry Fields]
  BRC Phone Number                              [ ]

F1=Help          F2=Refresh        F3=Cancel         F4=List
Esc+5=Undo       Esc+6=Command     Esc+7=Edit        Esc+8=Image
Esc+9=Shell      Esc+0=Exit        Enter=Do
```

FIG. 8h

```
                     Set Other Parameters
Type or select values in entry fields.
Press Enter AFTER making all desired changes.

[Entry Fields]
  Operator Name                                  [John H. Jones]
  Operator Phone Number                          [(508) 555-3325]
  System Phone Number                            [5085558275]
  Remote Password                                [phoenix]
  TTY Path                                       [/dev/tty1]
  E-mail Address                                 [root]

F1=Help          F2=Refresh        F3=Cancel         F4=List
Esc+5=Undo       Esc+6=Command     Esc+7=Edit        Esc+8=Image
Esc+9=Shell      Esc+0=Exit        Enter=Do
```

FIG. 8i

```
                        Callout Management
Move cursor to desired item and press Enter.

List Queued Callouts
  Show a Queued Callout
  Remove a Queued Callout
  Show Callout Manager Status
  Change / Show Callout Manager Status
  Start Next Callout
  Re-start Failed Callouts
  Display Callout Records
  Reset Callout Records
  Start Callout Management Daemon
  Stop Callout Management Daemon F
F1=Help          F2=Refresh        F3=Cancel            Esc+8=Image
Esc+9=Shell      Esc+0=Exit        Enter=Do
```

FIG. 8p

```
                  Change / Show Callout Manager Status
Type or select values in entry fields.
Press Enter AFTER making all desired changes.
                                                     [Entry Fields]
  Delay Between Callouts                             [60-mins]
  Maximum Queue Length                               [20]

F
F1=Help          F2=Refresh        F3=Cancel            F4=List
Esc+5=Undo       Esc+6=Command     Esc+7=Edit           Esc+8=Image
Esc+9=Shell      Esc+0=Exit        Enter=Do
```

FIG. 8q

```
                     Start Callout Management Daemon
Type or select values in entry fields.
Press Enter AFTER making all desired changes.
                                                     [Entry Fields]
  Change Daemon Now, At System Reboot, or Both?      [now]         +

F
F1=Help          F2=Refresh        F3=Cancel            F4=List
Esc+5=Undo       Esc+6=Command     Esc+7=Edit           Esc+8=Image
Esc+9=Shell      Esc+0=Exit        Enter=Do
```

FIG. 8r

```
                    Configure Callback
Move cursor to desired item and press Enter.
  Configure Permissions
  Configure Monitoring F1=Help              F2=Refresh           F3=Cancel              Esc+8=Image
Esc+9=Shell          Esc+0=Exit           Enter=Do
```

FIG. 9a

```
                    Configure Permissions
Type or select values in entry fields.
Press Enter AFTER making all desired changes.

[Entry Fields]
  Remote Service Dial-In                            Disabled            +
  Allow Root Privileges                             YES                 +

F1=Help              F2=Refresh           F3=Cancel              F4=List
Esc+5=Undo           Esc+6=Command        Esc+7=Edit             Esc+8=Image
Esc+9=Shell          Esc+0=Exit           Enter=Do
```

FIG. 9b

```
                    Configure Monitoring
Type or select values in entry fields.
Press Enter AFTER making all desired changes.

[Entry Fields]
  Session Notification Interactive                  []                  +
  Notification Device                               [/dev/console]      +/
  Session Logging                                   []                  +
  Enable E-mail on Call-in                          []                  +
  E-mail Address                                    [root]
  Terminal Type for Callback                        [vt100]

F1=Help              F2=Refresh           F3=Cancel              F4=List
Esc+5=Undo           Esc+6=Command        Esc+7=Edit             Esc+8=Image
Esc+9=Shell          Esc+0=Exit           Enter=Do
```

FIG. 9c

```
                        Actions
Move cursor to desired item and press Enter.

Show RSF Status
  Start RSF Daemon
  Stop RSF Daemon
  Start Cluster Daemon
  Stop Cluster Daemon
  Display Record of Actions
  Reset Record of Actions
  Configure Diagnostic
  Show Diagnostic Settings F1=Help            F2=Refresh         F3=Cancel             Esc+8=Image
Esc+9=Shell        Esc+0=Exit         Enter=Do
```

FIG. 10a

```
                     Configure Diagnostic
Type or select values in entry fields.
Press Enter AFTER making all desired changes.
                                                  [Entry Fields]
  Enable Diagnostic?                              [Yes]              +
  Frequency                                       [MONTHLY]           +

F1=Help          F2=Refresh         F3=Cancel        F4=List
Esc+5=Undo       Esc+6=Command      Esc+7=Edit       Esc+8=Image
Esc+9=Shell      Esc+0=Exit         Enter=Do
```

FIG. 10b

```
                      Start RSF Daemon
Type or select values in entry fields.
Press Enter AFTER making all desired changes.
                                                     [Entry Fields]
  Change RSF Action Now, at System Reboot, or Both?  [Now]            +

F1=Help          F2=Refresh         F3=Cancel        F4=List
Esc+5=Undo       Esc+6=Command      Esc+7=Edit       Esc+8=Image
Esc+9=Shell      Esc+0=Exit         Enter=Do
```

FIG. 10c

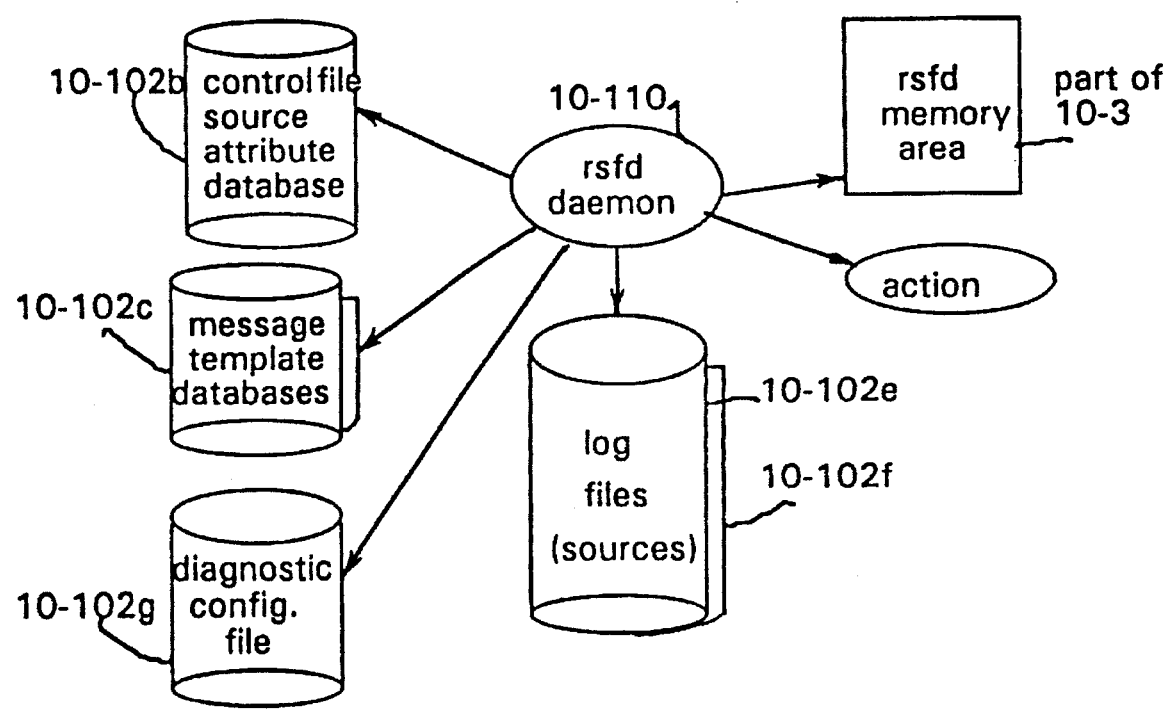
FIG. IIa

METHOD AND APPARTUS FOR USE BY A HOST SYSTEM FOR MECHANIZING HIGHLY CONFIGURABLE CAPABILITIES IN CARRYING OUT REMOTE SUPPORT FOR SUCH SYSTEM

BACKGROUND OF THE INVENTION

1. Field of Use

The present invention relates to systems for detecting and reporting problems encountered in a host system during normal operations and more particularly to methods and systems for providing remote maintenance and support services for Such host systems.

2. Prior Art

Numerous kinds of systems have been developed over the years for maintaining and diagnosing faults occurring within data processing systems either locally ore remotely. Such systems have taken the form of system management apparatus, maintenance processors and remote maintenance system interfaces and systems. Examples of these types of systems are discussed in U.S. Pat. Nos. 4,298,935, 5,202, 963, and 5,210,757.

Also, software components have been used to provide remote support for host systems. One such system disclosed in U.S. Pat. No. 5,111,384 provides for automating the dump analysis process. Another type of system monitors a system error log to detect problems and automatically calls a remote center for diagnosis and corrective action. An example of this system is the remote maintenance manager (RMM) tool developed by Bull HN Information Systems Inc. which is described in the publication entitled, "DPX/2 500 Remote Maintenance Facility Guide," published by Bull HN Information Systems Inc., dated March, 1991, having Order No. LW07-00.

The remote maintenance manager (RMM) subsystem tool is implemented as a single component which is integrated into the operating system of the host system. The tool includes a daemon (background) process that is initialized by an interface program run by an administrator or operator to set up parameters for the RMM subsystem. The daemon process continues to monitor the host system for error conditions established through exceeding predetermined thresholds and responds by making an automatic callout to a response center when an established threshold has been exceeded.

Upon receipt of the callout and accompanying message, a remote operator is able to determine the source of the callout by examining the message contents. When the callout is made, the administrator is informed of the action by receipt of a mail message. Also, the remote operator writes a message to the administrator's console notifying the administrator when a callback has been made to host system by the remote operator. Such callback takes the form of the remote operator logging onto the host system's operating system facilities wherein the remote operator initiates a remote session.

If the administrator needs to terminate the remote session, the administrator enters a standard command via the console or can communicate with the logged on remote operator by standard operating system utilities.

This type of system is very inflexible in that its operations are dictated by a set of predefined sequences of operations which assumes the existence of a particular configuration of host system components.

With more and more vital information databases being entrusted to computerized systems, access and security of such information is of the utmost importance to users. Also, it is essential that faults or errors be detected and corrected without delay to prevent any loss of user information and computer time. At times, there arise conflicts between these two requirements. Also, since security requirements could vary from installation to installation, there could be a variety of different needs to satisfy. Hence, it is desirable that the user be able to have a certain degree of control over how remote support is carried out.

An area which should be distinguished relative to remote support systems is developments pertaining to network management which provide for the handling or processing of events occurring on a communications network. Network management systems normally manage a network of local or remote distributed resources and other communications devices for the purpose of ascertaining the status of such resources and devices in order to ensure that certain jobs or tasks have been completed. Such systems have the ability to receive events and include means for signalling software related alert conditions visually or audibly to an operator based on receipt of such events so that the operator is able to take any necessary prompt corrective action to bring about the completion of such jobs and tasks in a timely and proper fashion. Thus, this type of system is concerned with monitoring network resources and applications which utilize such resources. Examples of this type of system are disclosed in U.S. Pat. No. 4,965,772 entitled, "Method and Apparatus for Communication Network Alert Message Construction" which issued on Oct. 23, 1990 and U.S. Pat. No. 5,155,842 entitled, "Logical Event Notification Method and Apparatus" which issued on Oct. 13, 1992.

Therefore, there is a need to provide a high degree of flexibility and control in providing remote, support for a host system.

Accordingly, it is a primary object of the present invention to provide a highly modular and configurable remote support system for a host system.

Accordingly, it is a more specific object of the present invention to provide a remote support system which can be customized to meet user requirements for controlling how remote support is to be performed on a host system.

It is a further object of the present invention to provide a remote support system in which an administrator has greater control over the host system during the performance of remote support operations.

SUMMARY OF THE INVENTION

The above objects and advantages are achieved in a preferred embodiment of the present invention by a remote service facility (RSF) unit which is integrated into the operating system of the host system being supported. The RSF unit utilizes a standard generic menu interface system (GMIS) unit which is included as a standard part of the host operating system. Through this interface, a user can enter different types of commands which results in the display of a number of menu sequences for configuring how the different independently controllable components of the RSF unit will operate in performing remote support functions.

In the preferred embodiment, the RSF unit comprises three major components for carrying out the basic functions required for performing remote support. These are a problem detection and reaction component, a system action component and a callback component, each of which operatively couple to the GMIS unit. Each component is independently configurable and includes configuration means for storing configuration information accessed by the component which establishes how the component is to perform its particular function. The components are integrated in a predetermined manner so that collectively, they carry out remote support according to the way in which they were configured.

The problem detection and reaction component performs the function of monitoring a number of host error log file sources for determining when an error message over threshold condition occurs and initiating a specified action. In the preferred embodiment, the system action component includes modules for performing different types of support modification actions in response to the detection of a source over threshold condition. However, any defined action program module can be specified as the action to be performed when an overthreshold condition occurs. The callback component performs the function of processing calls from the response support center made in response to a callout action initiated by the problem detection and reaction component for purposes of conducting remote support operations.

The approach utilized by the present invention is that of defining a minimum number of basic functions required to perform the remote support function and then to utilize a corresponding number of independently operable components for carrying out those basic functions which are operatively coupled in a manner so as to collectively perform remote support function.

This approach makes it possible to maximize the configurability of each component. Additionally, the approach enables different components to be installed within the host system for supporting different host system communication configurations such as standalone and cluster configurations. Further, the arrangement facilitates the addition of new capabilities or improvements to components, new commands and new host system configurations without necessitating a redesign of the basic unit.

In the preferred embodiment, each component operates under the control of a separate daemon or background program which can be enabled or configured for operation through the GMIS unit. The configurations for components can be either preloaded or modified during installation of the unit's components as required for customizing the unit for a given host system configuration.

Considering each component in more particular terms relative to the preferred embodiment of the present invention, the configuring means of the problem detection and reaction component can be used to configure each type of error log source to be monitored. This is achieved by providing different search capabilities which are selected based on source type.

Also, the time interval for monitoring each source can be configured by setting a search time parameter to a desired value. This permits monitoring to be set according to the type of error information being stored by the host system or according to the frequency it is being stored by the host system. For example, where timing is critical to a source, the search time may be set to monitor the source once every second. If another source is used by the host system to store electronic mail messages or occasional messages, the search time for that source may be set to scan it once every hour. The associated daemon process, by accessing the configured search time parameters for each source, is able to schedule events for source monitoring according to such values. This has the advantage of being able to adjust search time values to reduce the amount of system overhead expended in executing the monitoring function.

Additionally, the configuration means of the problem detection and reaction component can be used to set a clean time parameter which establishes the time interval at which the daemon process cleans its associated database files to free them of stale messages. This parameter can be used in conjunction with another parameter (keepmax) for setting an upper limit on how many copies of a given message are to be stored in an associated storage message database file managed by the daemon process for each source being monitored thereby reducing host system storage requirements.

Also, in accordance with the present invention, the configuration means can be used to configure the problem detection and reaction component to enable different actions to be initiated in response to detecting an over threshold condition on a particular source. This decouples the problem detection and reaction component from the operation of the system action component thereby providing greater flexibility in prescribing what actions should be taken in a given case as well as the option to take no action in certain cases. Thus, a variety of different options can be configured. In the preferred embodiment, this includes callout via local or through shared communications facilities and mail notification actions.

The configuration means of the system action component of the preferred embodiment can be used to support the actions mentioned above through the facilities of the host system. Additionally, such means can be used to support the support notification actions for standalone and cluster host configurations (i.e., cluster client and cluster server). In the standalone configuration, the callout function is carried out by a daemon process which manages the execution of callout requests entered into a callout manager queue using the communication facilities (modem) of the host system. In the cluster configuration, the callout function is carried out through shared communication facilities using cluster client/server software facilities installed on the different systems which make up the cluster. An additional daemon process is used to manage such shared communications requests.

Also, the managing of the callout function in terms of how it is executed can also be configured. It is possible to select the type of response center communications protocol to be used in communicating a callout action and provide the appropriate parameters to a response center such as unique host system identification information for enabling the selected such callout remote center to respond properly to such callout request, a comprehensive list of response center phone numbers to be tried in sequence until a successful connection is made, remote password information to be used by the center in responding to the callout and an electronic mail address to which notification of the callout action is to be sent.

Also, in accordance with the present invention, the configuration means of the system action component can be used in specifying a comprehensive set of communication parameters for establishing a communications link via a large number of different types of modems such as acknowledgment response (OK) byte strings and connection byte strings which can vary from link to link. The configuration means further enables configuring other parameters such as the number of tries to be made for each phone number, the delay between busy tries and communications (modem) delays. This capability provides an effective way of matching the callout action to the type of host system resources to be utilized in making and responding to the callout function in an efficient and expeditious manner.

In accordance with the present invention, the configuration means of the callback component enables remote access by a response center, the establishment of permissions to be granted to a remote user and selection of a number of different types of session scripting or monitoring options for enabling an administrator of the host system to view all of the actions being taken by a remote user. In this way, it is possible to maintain the security and integrity of host system data as well as capturing for later viewing, all actions taken during a given session conducted in the performance of the remote support function. A further feature of the callback component is a hot key capability which allows the administrator to immediately terminate any current session by the remote user thereby providing further security control.

The above and other objects of the present invention are achieved in the illustrative embodiment described hereinafter. Novel features which are believed to be characteristic of the invention, both as to its organization and method of operation, together with further objects and advantages, will be better understood from the following description when considered in connection with the accompanying drawings. It is expressly understood, however, that these drawings are for the purpose of illustration and description only and are not intended as definition of the limits of the present invention.

BRIEF DESCRIPTION OF THE DRAWINGS

FIGS. 5a through 5e illustrate in greater detail, the formatting of the different databases and sources of the problem detection and reaction component of FIG. 4a.

FIG. 7b illustrates in greater detail, the install operation of FIG. 7a.

FIG. 7c illustrates in greater detail, the source configuration operations of FIG. 7a.

FIGS. 7d1 through 7d4 illustrates in greater detail, the callout, configuration operation of FIG. 7a.

FIG. 7f illustrates in greater detail, the configure callback operation of FIG. 7a.

FIG. 7h illustrates in greater detail, the configure diagnostic operation of FIG. 7a.

FIG. 7i illustrates in greater detail, the configure daemons operation of FIG. 7a.

FIGS. 9a through 9c illustrate menus utilized in carrying out the configuration operations of FIGS. 7f and 7g.

FIGS. 10a through 10d illustrate menus utilized in carrying out the configuration operations of FIGS. 7h and 7i.

FIGS. 11a through 11d are flow diagrams used in describing the operation of the problem detection and reaction component of FIG. 4a.

DESCRIPTION OF HOST SYSTEM OF FIG. 1

Figure 1:
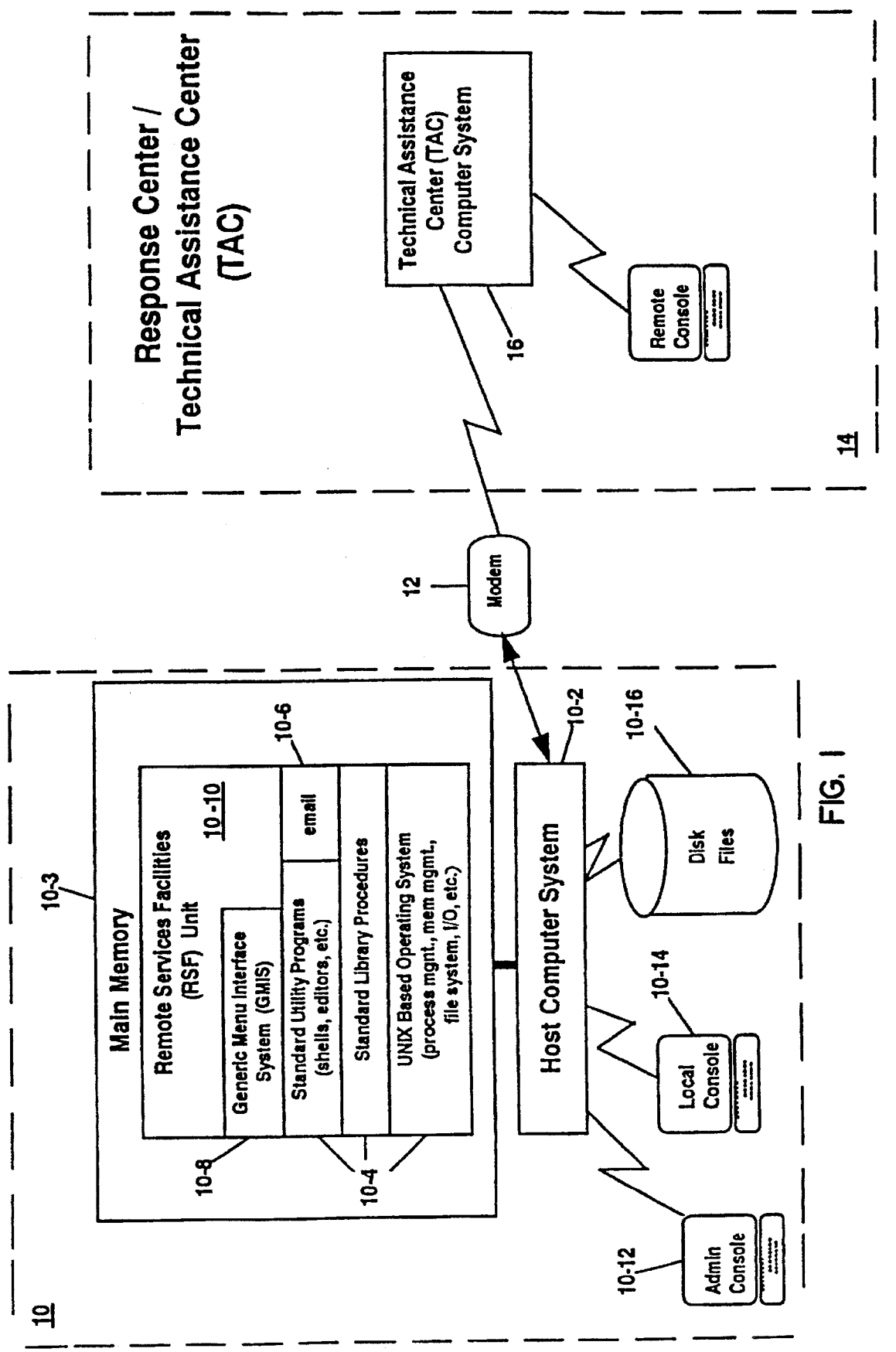
FIG. 1 is a block diagram of a standalone configured host system which incorporates the remote support facility of the present invention.

FIG. 1 illustrates the use of the remote service facility (RSF) unit of the present invention in a standalone system environment. As shown, this environment includes a host system 10 coupled to a communications link via a modem 12 for establishing dial out access to a remotely located response center 14 or a technical assistance center (TAC) as well as dial in access for carrying out support operations. As shown, the host system 10 includes a host computer system 10-2 which operatively couples to a main memory 10-3 and to input/output storage devices, such as disk files 10-16. The disk files 10-16 provide storage for the different files utilized by the RSF unit of the present invention. For the purpose of the present invention, the host computer system is conventional in design and may take the form of the DPX/20 system marketed by Bull HN Information Systems Inc.

A user can directly access the computer system 10-2 through a terminal or local console 10-14 while a system administrator is able to access system 10-2 through a administration terminal or administration console 10-12. As shown, each of the consoles 10-12 and 10-14 includes a display device, keyboard and optionally, a pointing device such as a mouse.

The system 10-2 is operated under the control of a UNIX* based software system 10-4 which includes a UNIX based operating system or kernel which controls the *UNIX is a registered trademark in the United States and other countries, licensed exclusively through X/Open company Limited. computer system 10-2 and provide a system call interface to all of the programs running on the system. The system 10-4 also includes a library for storing procedures for processing such system calls (one procedure per call) and a large number of standard utility programs such as the command processor or shell, compilers, text processing programs and file manipulation utilities. Additionally, the host system includes a generic menu interface system (GMIS) unit 10-8 which operates as a resident command building facility. For the purpose of the present invention, the unit 10-8 can be considered conventional in design. In the preferred embodiment, GMIS takes the form of the System Management Interface Tool described in the publication entitled, "Bull DPX/20 General Programming Concepts" dated April, 1993, published by Bull HN Information Systems Inc., order reference SC23-2205.

In accordance with the present invention, the system 10 includes a remote services facility (RSF) unit 10—10 of the present invention which has an interface to GMIS unit 10-8 and to the UNIX system 10-4. The RSF unit 10—10 operates to detect problems occurring in the host system, to report such problems to a response center via autodial out and to provide a secure operating environment for callback responses made via dial-in access by such response center utilizing the host system facilities.

Figure 2:
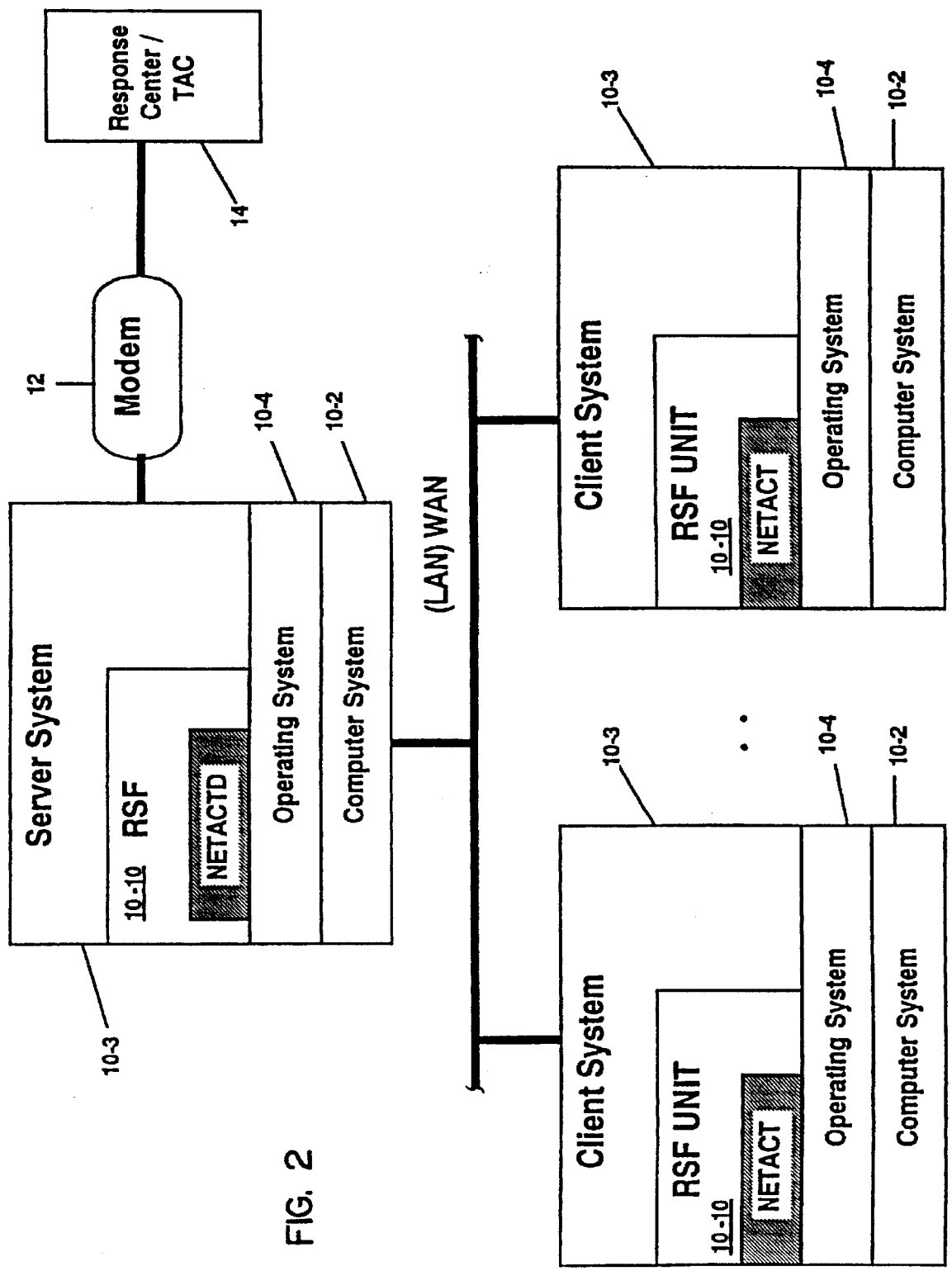
FIG. 2 is a block diagram of cluster configured host systems which incorporate the remote support facility of the present invention.

In addition to operating in a standalone configuration, the RSF unit 10—10 also operates in a cluster configuration of client and server host systems such as that shown in FIG. 2. As shown, each host system connects to a local area network (LAN) or wide area network (WAN) system. In this configuration, the modem 12 is shared among all of the host systems using the network communication facilities of the LAN/WAN system and remote call procedures (RPCs) provided as part of the UNIX system 10-4 utilizing the TCP/IP network software protocol. Each host system also includes its own complement of consoles, disk devices, etc., not shown.

As indicated and described in further detail herein, a different component module (netact/netacd) is configured for client host systems and the server host system directly connected to the modem 12 which is to be shared by the client host systems. In this system configuration, a callout request originating on a client host system is able to utilize the server host system via the LAN/WAN to make the callout request.

DESCRIPTION OF RSF UNIT 10—10

Figure 3:
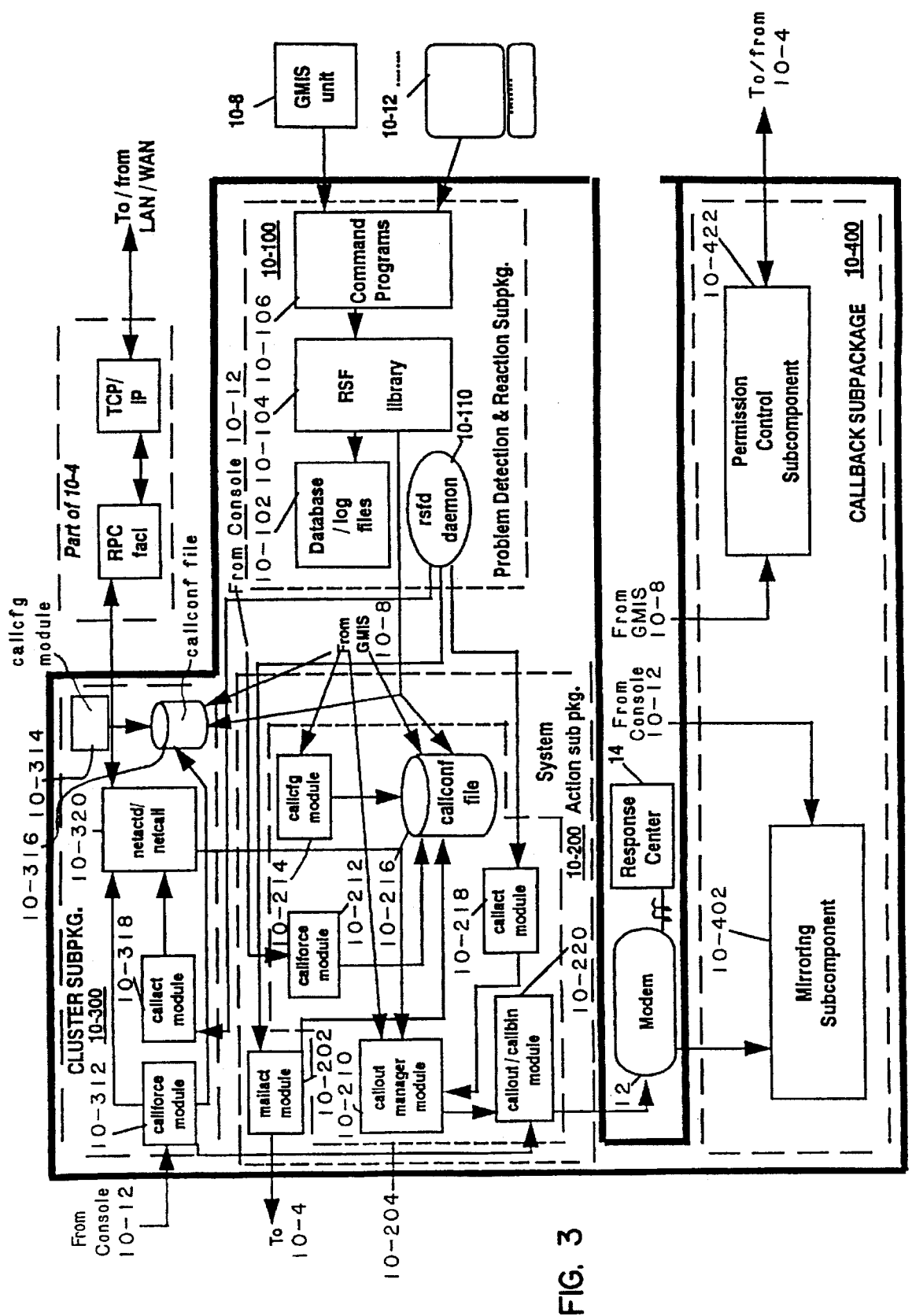
FIG. 3 is a block diagram of the remote support facility of the present invention.

FIG. 3 shows in block diagram form, the packaging structure and major components of the RSF unit 10—10. As shown, the RSF unit 10—10 includes the following four subpackages: a problem detection and reaction subpackage 10-100; a system action subpackage 10-200, a cluster services subpackage 10-300 and a callback environment subpackage 10-400. As a function of the type of system installation, different ones of these subpackages are installed into the host system 10-2. The below table shows which subpackages are installed for the standalone, cluster client and cluster server system configuration illustrated in FIGS. 1 and 2.

TABLE

| Type of System Installation | Problem Detection and Reaction Subpkg. | Callback Subpkg. | System Action (Auto-dial) Subpkg. | Cluster Subpkg. |
| --- | --- | --- | --- | --- |
| Stand alone | X | X | X | |
| Cluster Client | X | X | | X |
| Cluster Server | X | X | X | X |

As indicated by the table, in the standalone system of FIG. 1, subpackages 10-100, 10-200 and 10-400 are installed. In each client system of FIG. 2, subpackages 10-100, 10-200 and 10-300 are installed. In the server system of FIG. 2, all of the subpackages 10-100, 10-200, 10-300 and 10-400 are installed.

Each of the subpackages will now be considered in greater detail. As shown in FIG. 3, subpackage 10-100 includes the problem detection and reaction component of unit 10—10. This component operatively couples to GMIS unit 10-8, to administrator console 10-14 and to local console 10-12 for receiving commands therefrom. As shown, component 10-100 provides output action signals to system action subpackage 10-200 and cluster subpackage 10-300. This component can be configured to monitor different types of sources such as the host system log error file and any ASCII log file generated by any application running on host system 10-2.

The component 10-100 includes a plurality of databases and log files represented by block 10-102 which are accessed via routines contained within a RSF library 10-104. A number of command programs included within block 10-106 execute the different types of commands received from GMIS unit 10-8 and consoles 10-12 and 10-14 utilizing the library routines of block 10-104. Additionally, component 10-100 includes a rsfd daemon 10-110 which also accesses certain routines of library 10-104 for performing certain operations such as diagnostic callout operations discussed herein. The rsfd daemon 10-110 monitors the configured sources to detect when messages reach over threshold conditions and executes those types of actions specified for such sources.

The subpackage 10-200 includes the system action component of RSF unit 10—10. As shown, the system action subpackage 10-200 operatively couples to rsfd daemon 10-100 to modem 12 and to cluster subpackage 10-300. In the preferred embodiment, component 10-200 includes a mail action subcomponent 10-202 and an autodial/callout subcomponent 10-204. The subcomponent 10-204 includes a callout manager module 10-210, a call force module 10-212, a call configuration file 10-216, a call action module 10-218 and a callout/callbin module 10-220 which operatively couple to each other as indicated in FIG. 3. When configured, the mail action subcomponent 10-202 operates to carry out electronic mail notification through the E-Mail facilities of the UNIX-based system 10-4. The callout subcomponent 10-204 when configured operates to carry out callout action operations initiated by the problem detection and reaction component 10-100 through modem 12 via module 10-220.

The cluster subpackage 10-300 includes the cluster services component of RSF unit 10-10. The cluster subpackage 10-300 operatively couples to rsfd daemon 10-110, the RPC and TCP/IP communication facilities of system 10-4 and to callout subcomponent 10-204 as shown. In the preferred embodiment, the component 10-300 includes a call force module 10-312, a callact module 10-318 and the netactd/ netcall modules of block 10-320. To accommodate different installation requirements, modules 10-212, 10-214, 10-216 and 10-218 are also included in component 10-300 and correspond to modules 10-312, 10-314, 10-316 and 10-318. The modules netactd and netcall are used in cluster server and cluster client systems, respectively. When configured, the component 10-300 operates to carry out callout operations for cluster system configurations via the local area network and operating system communication facilities illustrated in FIG. 2.

The callback subpackage 10-400 includes the callback component of RSF unit 10—10. The callback subpackage 10-400 operatively couples to the modem 12, GMIS unit 10-8 and to console 10-12. As shown, component 10-400 includes a mirroring subcomponent 10-402 and a permission control subcomponent 10-422. The subcomponent 10-402 can be configured to carry out a plurality of different mirroring and scripting operations which enable an administrator to observe all of the operations carried out by a remote user who dials into the host system 10-2 from TAC 16. The permission control subcomponent 10-420 can be configured as desired for security purposes to control remote user access to host system facilities.

Figure 4A:
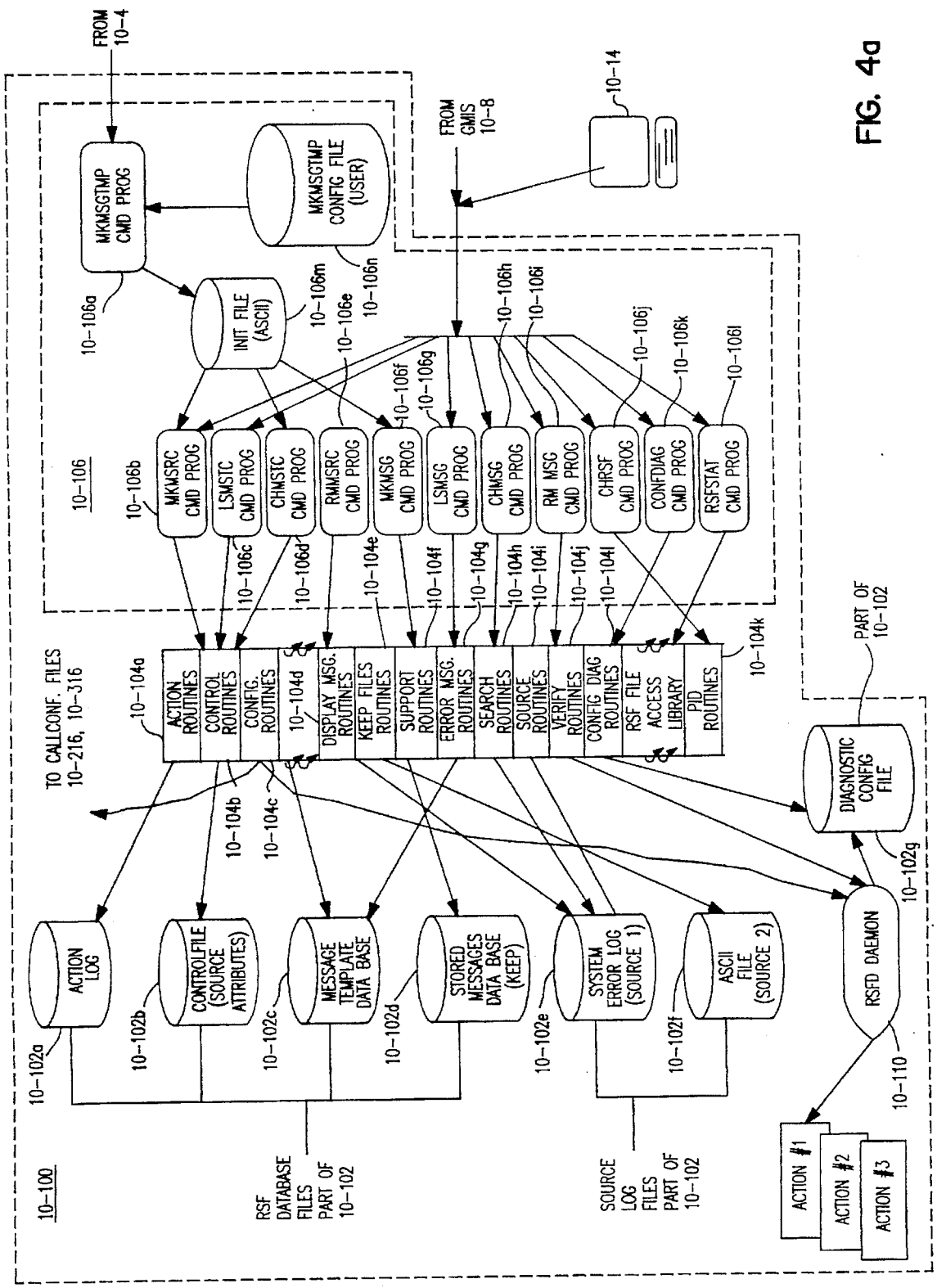
FIGS. 4a through 4d illustrate in greater detail, the different components of FIG. 3.

Problem Detection and Reaction Component 10-100—FIG. 4a

FIG. 4a shows in greater detail, the problem detection and reaction component 10-100 of the present invention. The block diagram indicates the operative coupling between the different programs and files utilized by the component 10-100. As shown, block 10-106 includes command programs 10-106a through 10-106k and files 10-106l and 10-106m. These programs are invoked through a command line generated either via GMIS unit 10-8 or console 10-12. With the exception of command program 10-106a, these programs access one or more routines contained in RSF library 10-104 as a function of the parameters contained in the command line. The program 10-106a also receives an input from the system 10-4 and the user generated configuration file 10-106m. As discussed herein, program 10-106a generates the initialization file 10-106l which can be used by programs 10-106b, 10-106c and 10-106e.

As shown, library 10-104 includes a plurality of routines 10-104a through 10-104k which will be discussed in greater detail herein. The routines 10-104a through 10-104k described in greater detail in the appendix are used to manage the contents of the database files and log files of block 10-102 as indicated in FIG. 4a. As shown, the database files 10-102 include an action log file 10-102a, a control or source attributes file 10-102b, a message template databases file 10-102c and a stored messages (keep) database file 10-102d. The source log files include any number of system error log files 10-102e and ASCII log files 10-102f. Additionally, block 10-102 includes a diagnostic configuration file 10-102g used by rsfd daemon 10-110.

The action log file 10-102a, shown in greater detail in FIG. 5c, is used to maintain a record of actions for one of the system error log files 10-102e designated as "system." As indicated in FIG. 5e, each action includes the data and time theaction was initiated, the path of the action program, the result of the action (successful, unsuccessful) and a description of the particular action performed (e.g. callout).

Figure 5A:
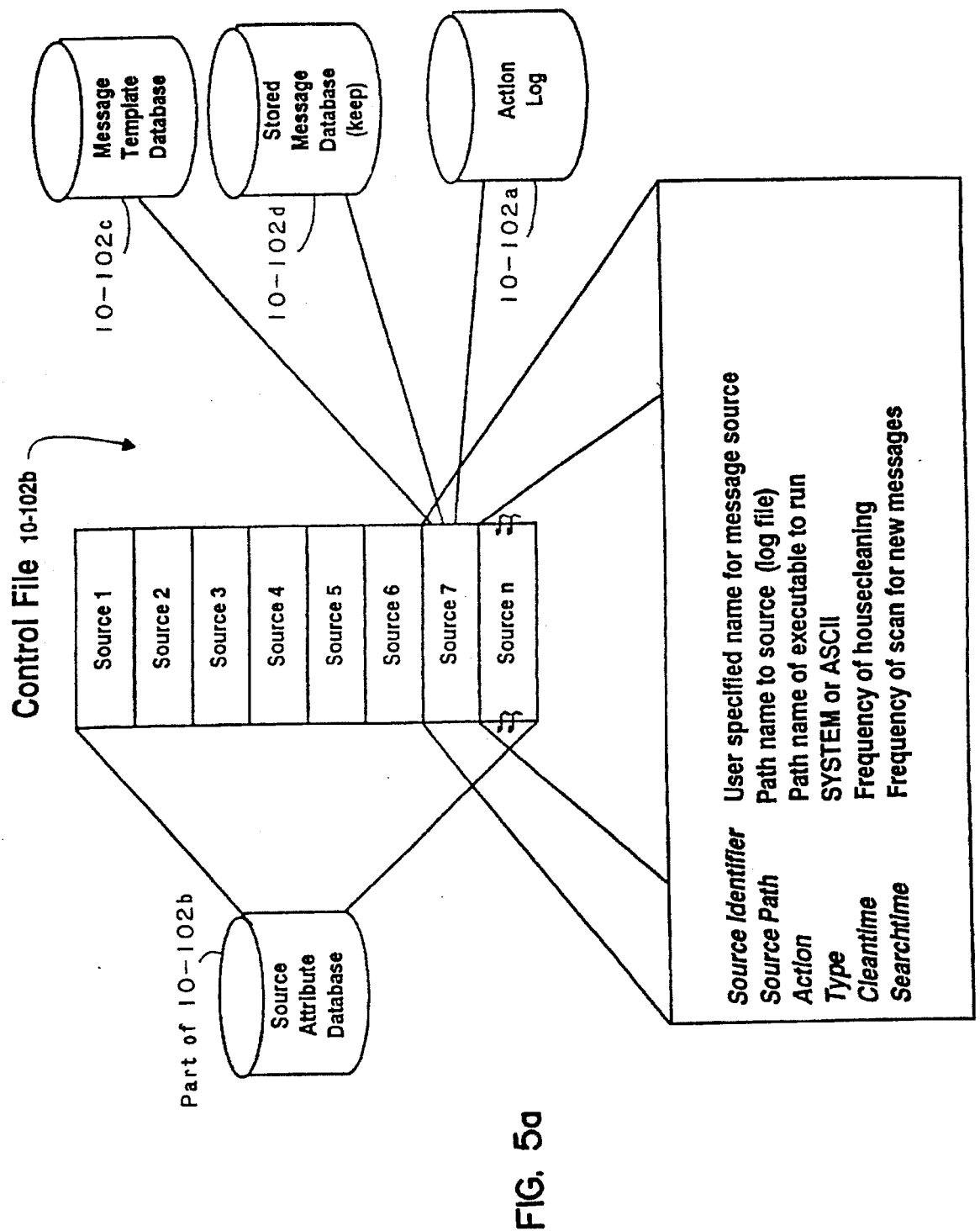

The control or source attributes file 10-102b is shown in greater detail in FIG. 5a. As shown, it contains one record for each source (log file) being monitored by RSF unit 10-8. Each such control record includes an identifier field specifying the user's name for the source, the path for accessing the source, the action to be taken such as identifying the program to be executed upon detection of an overthreshold condition, the type of source, and cleantime and searchtime values.

Figure 5B:
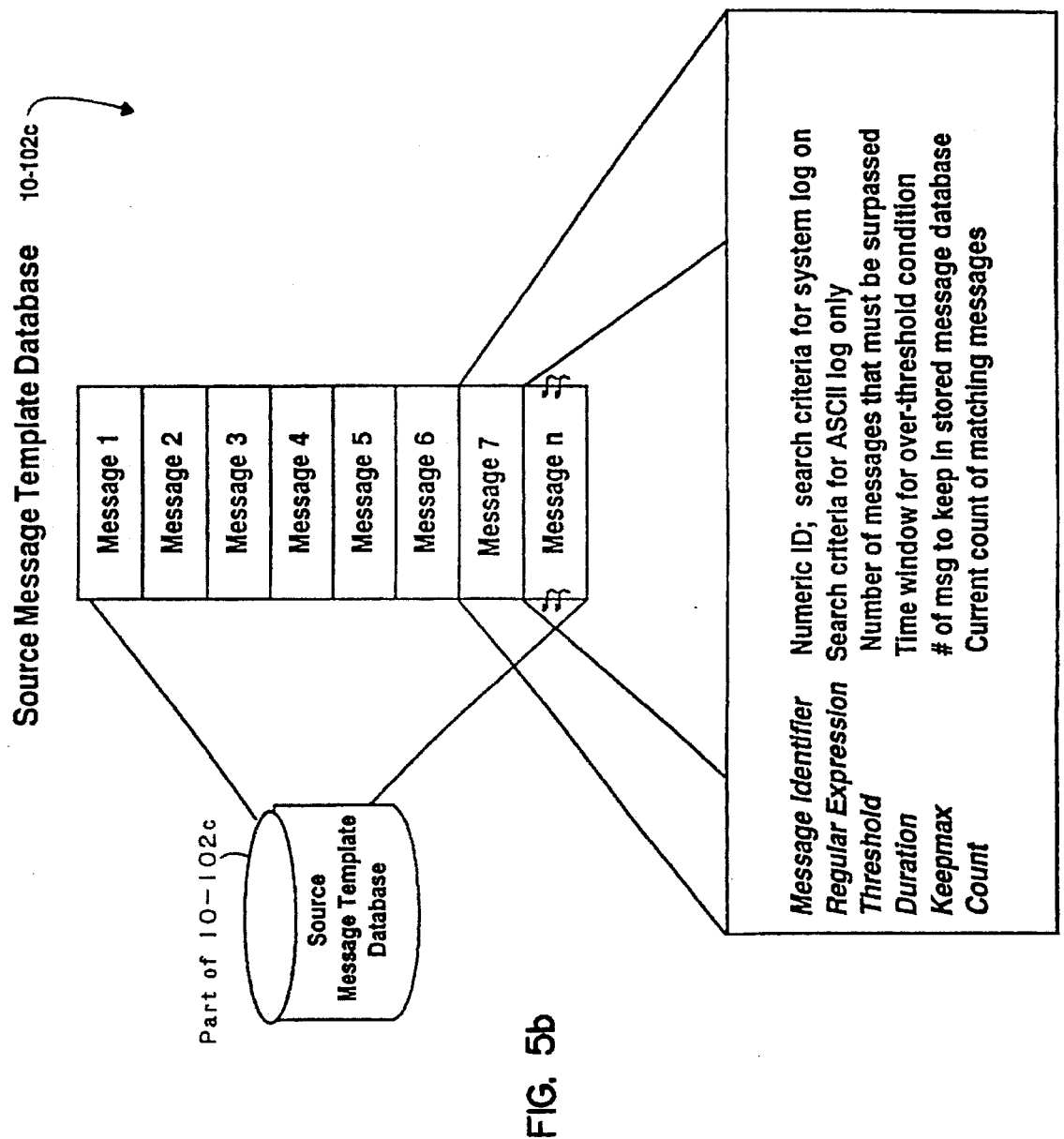

The message template databases file 10-102c is shown in greater detail in FIG. 5b. As shown, it contains information about all potential messages that are being monitored for a particular source. This includes search criteria (message IDs for system error log files or regular expressions for ASCII log files) and information used to determine if the message is overthreshold.

Figure 5D:
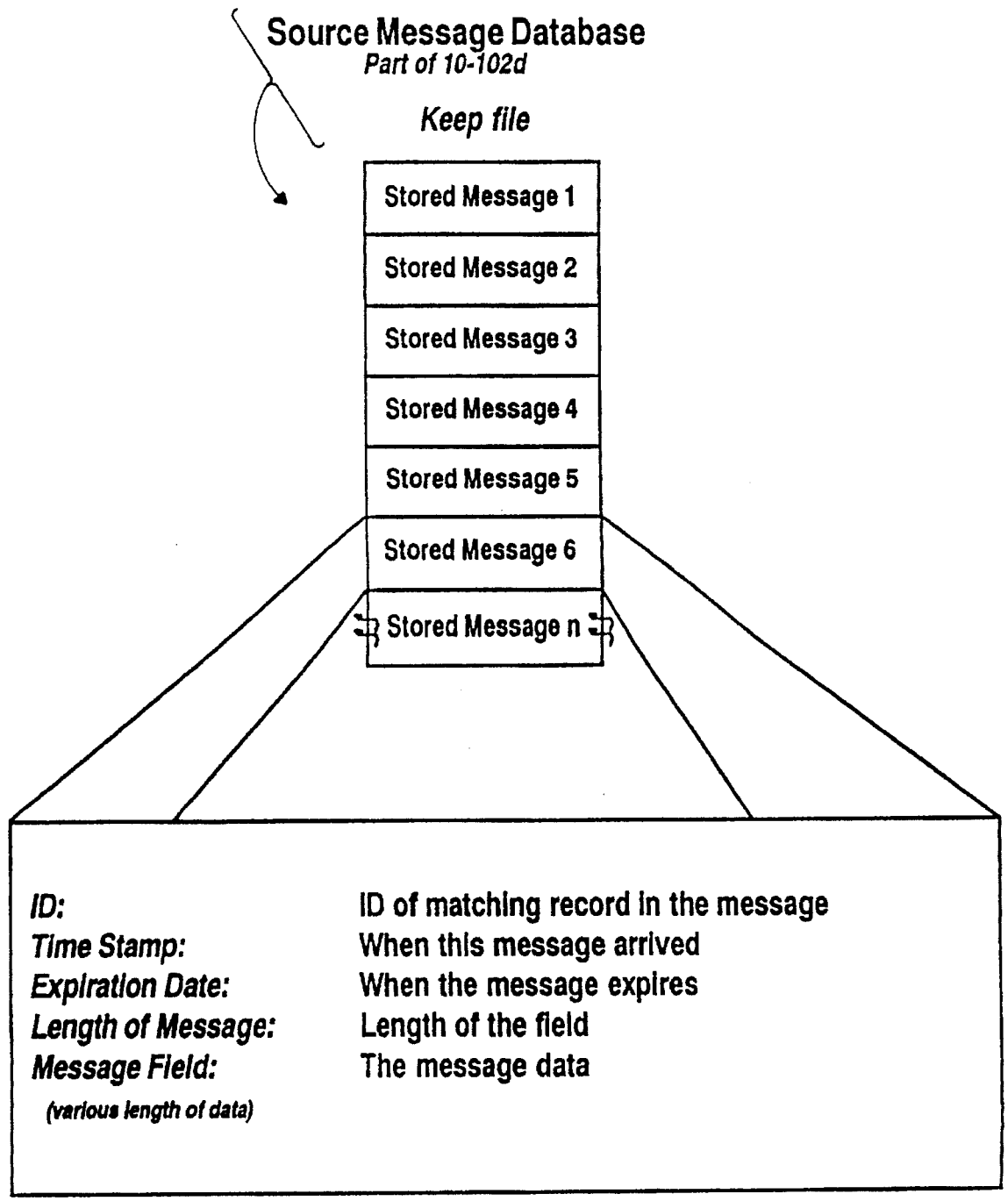

The stored messages (keep) database file 10-102d is shown in greater detail in FIG. 5d. As shown, the file contains messages of variable length, each of which include the following fields: ID, time stamp, expiration data, length of message and message field which store the indicated information. This database is used to carry out threshold detection operations. Since its operation is not pertinent to an understanding of the present invention, it is not described in further detail herein.

Examples of system error log files 10-102e and ASCII log files 10-102f are shown in FIG. 5e. The system error file of FIG. 5e is shown in human readable form as generated by system 10-4 of FIG. 1. Each entry includes the following fields: ID, label, type, class and error description. The ID field is an 8-character hexadecimal number which uniquely identifies each of the potential messages in the host system error log. The label field identifies the particular error condition. The type field indicates the type of error such as unknown, temporary (transient) and permanent (hard).

The class field indicates whether the error is a hardware (H) or software (S) error. The error description field provides a description of the error condition.

The ASCII log file includes lines of text separated by new line characters as shown in FIG. 5e. The text lines can take any form. In the case of clock errors, it was convenient to indicate the date, time, source and clock adjustments.

Considering the command programs of block 10-106 in greater detail, the make message template (mkmsgtmp) command program 10-106a allows for creation of an initialization file 10-106l which contains groups of messages to be added to the message template database file 10-102c for a particular source by programs 10-106b, 10-106c and 10-106e defining the potential messages to be monitored for over threshold conditions.

In greater detail, the mkmsgtmp program 10-106a reads in the standard input from a host system utility program normally used to print out all of the message templates utilized by the operating system 10-4 which contains information for all possible error messages which can be utilized by the host system 10-2. The user can set up values in tables within the configuration file which specify particular parameters, such as threshold, duration, keepmax values, for certain classes or types of potential error messages. The following is an example of such a configuration file:

| HARDWARE | | | |
|---|---|---|---|
| PEND | 2 | 10-mins | 10 |
| PERF | 5 | 1-hour | 10 |
| PERM | 1 | 1-day | 10 |
| TEMP | 20 | 1-day | 21 |
| UNKN | 1 | 1-hour | 10 |
| SOFTWARE | | | |
| PEND | 7 | 1-day | 10 |
| PERF | 10 | 1-day | 11 |
| PERM | 6 | 1-hour | 10 |
| TEMP | 25 | 1-day | 26 |
| UNKN | 6 | 1-hour | 10 |
| RE | | | |
| X.*25 | −5 | 1-hour | +20 |

When mkmsgtmp program 10-106a is invoked, it reads entries from system 10-4, examines the configuration file tables to determine which parameters the user has specified for that particular potential message and writes a record in the initialization file containing that potential message with the specified parameters. The mkmsgtmp program 10-106a is used for the creation of system source initialization files only. Examples of such initialization files are as follows:

| ASCII SOURCE INITIALIZATION FILE: | | | |
|---|---|---|---|
| #expression | threshold | duration | keepmax |
| "system_error_.*" | 2 | 1-day | 50 |
| "i/o_error_on-device.*" | 5 | 4-days | 20 |
| SYSTEM SOURCE INITIALIZATION FILE: | | | |
| #id | threshold | duration | keepmax |
| 23e44f01 | 2 | 1-day | 50 |
| abcdef11 | 3 | 2-hours | 50. |

As explained herein, the command programs 10-106b, 10-106c and 10-106e can be invoked in a way to use the contents of the initialization file 10-106l to add a group of records at a time containing potential messages to a message template database included within block 10-102c. An example of the type of information written into the message template database is shown in FIG. 5b.

The mkmsrc command program 10-106b in response to an mkmsrc command which is generated by either unit 10-8 or from console 10-14 initiates the operation of defining a new source to be monitored by unit 10-2 (i.e., either a system log file or arbitrary ASCII log file). The mkmsrc command described in greater detail in the appendix provides the necessary parameters in a generated command line. The mkmsrc program 10-106b parses the command line and performs the necessary error checking operations for validating the command line parameters to ensure that source is valid. It then accesses the control routines of library 10-104 for writing a control record with the appropriate source attribute information into the control file database 10-102b.

If the command line includes an initialization file parameter option, this causes mkmsrc program 10-106b to access the search routines of library 10-104 to write the records previously stored in initialization file 10-106l containing all of the potential messages to be monitored for a particular source into the message template database file of block 10-102c. The result is a database such as shown in FIG. 5b.

Continuing with the other commands that can utilize initialization file 10-106l, the chmsrc program 10-106c allows modification of the message attributes of a particular source (e.g. 10-102e or 10-102f) being monitored utilizing the control routines of library 10-104. This program is invoked in response to a chmsrc command with the appropriate command line such as described in the appendix. If the command line includes an initialization file option parameter, then chmsrc program 10-106c accesses the search routines of library 10-104. The program 10-106c causes the record contents of the source's message template database to be replaced with the messages previously stored in initialization file 10-106l. It will be appreciated that with few exceptions, the information contained in initialization file 10-106l and information contained in the source's message template database is the same information, except for the following differences. The initialization file is in human readable format, while the message template database is in binary format. The message template database also contains count information which is initialized to zero when the messages are added.

The last command program which utilizes initialization file 10-106l is mkmsg program 10-106e. This program enables a message to be added to a source's message template database utilizing the search routines of library 10-104. This program is invoked in response to a mkmsg command with the appropriate command line such as described in the appendix. If the command line includes an initialization file option parameter, then mkmsg program 10-106e via the search routines adds the messages previously stored in initialization file 10-106l to the source's message template database.

The lsmsrc program 10-106b allows information pertaining to one or more identified sources being monitored by unit 10—10 to be displayed or printed using the control routines of library 10-104. This program is invoked in response to a lsmsrc command which generates an appropriate command line such as described in the appendix. The program 10-106c invokes various routines contained in library 10-104 for accessing information contained in action log 10-102a and control file 10-102b, to be displayed or printed as specified by the command line parameters.

The rmmsrc program 10-106d allows the removal of a source being monitored. This program is invoked in response to a rmmsrc command with an appropriate command line such as described in the appendix. When invoked, program 10-106d utilizing the applicable routines of library 10-104 removes the appropriate record from control file 10-102b, removes the source's message template database, removes the appropriate keep-base information pertaining to the source and action log information for the specified source.

The lsmsg program 10-106f allows the listing of messages being monitored for a particular source. This program is invoked in response to a lsmsg command with the appropriate command line parameters such as described in the appendix. The program 10-106f invokes the appropriate routines in library 10-104 for accessing information contained in control file 10-102b, and the source's message template database used in listing such messages.

The chmsg program 10-106g allows modification of the attributes of messages being monitored. This program is invoked in response to a chmsg command with the appropriate command line parameters such as described in the appendix. The program 10-106g invokes the appropriate routines in library 10-104 accessing the control file 10-102b to obtain the record specific to the identified source and uses the specified message ID to locate the message to be changed in the message template database. It then updates the message template database with all the changes made to the message. It also updates the keep database 10-102d as required so as to properly reflect and be consistent with such changes (e.g. if a new threshold value is less than the current count, the appropriate keepbase record entry for that message is cleared).

The rmmsg program 10-106h is used to remove a record from a message template database thereby stopping RSF unit 10—10 from monitoring a particular message for a particular source. This program is invoked in response to a rmmsg command with the appropriate command line parameters such as described in the appendix. The program 10-106h in turn invokes the appropriate routines in library 10-104 which remove the message from the message template database of block 10-102c identified by the command line parameters, in addition to removing all messages stored in the keep database of block 10-102d having the same message identifier.

The chrsf command program. 10-106 is used to start and stop/shut down the operation of rsfd daemon 10-110 and netactd daemon of cluster service component 10-300. This program is invoked in response to a chrsf command with the appropriate command line parameters described in the appendix. When invoked, the program 10-106 accesses the PID routines in library 10-104 for accessing the RSF PID file to determine if the rsfd daemon is running. The program 10-106i then initiates the appropriate action to start or stop the daemons as specified by the command line parameters. For the purposes of the present invention, the daemons are started and stopped in a conventional manner using the facilities of system 10-4.

The confdiag program 10-106j allows configuration of a diagnostic callout feature which enables callout action to be initiated at selected intervals such as daily, weekly, biweekly, monthly or bimonthly. This program is invoked in response to a confdiag command with the appropriate command line parameters described in the appendix. When invoked, the program accesses the appropriate routines in library 10-104 which enter the frequency at which a diagnostic message is to be injected into the system error log 10-102e as designated by the command line parameters into the diagnostic configuration file 10-102g add the diagnostic message to the system log source's message template database.

The rsfstat program 10-106k allows the status or configuration of the daemons utilized by RSF unit 10—10. This program is invoked in response to a rsfstat command with the appropriate command line parameters described in the appendix. When invoked, this program accesses the appropriate routines in library 10-104 which determine through the PID files which daemons are running and displays such status on host system 10-2. There is one PID file for each daemon.

Description of RSF Daemon 10-110

The rsfd daemon 10-110, for the purpose of the present invention, operates in the background like any standard daemon running in a UNIX-based operating system. As discussed herein, rsfd daemon 10-110 performs checks on message sources and when necessary executes preconfigured actions. It also maintains the message template search database, keepbase and action log files 10-110a, 10-101a, 10-102c and 10-102d. Accordingly, daemon 10-110 maintains a list of such managed message sources including information such as the control record and open file descriptors for the template search database and keepbase. In addition to using certain ones of the library routines, the rsfd daemon also uses a number of its own routines. These include event routines, action routines, signal routines, initialization routines, source search routines, keepbase and diagnostic message routines. The event routines are used to schedule events by creating new event structures which are placed on an event list, described later herein.

The action routines are used to free and allocate space for action data structures, calculate arguments for action process and place them in an argument list in the action data structure.

The signal routines perform waits for the finished child processes and get the PIDs. It looks up the action records and adds the records to the action log of the associated source.

The initialization routines read the control file and initialize the source list. It reads entries from the control file and for each entry it opens all associated files, creates a new source item and places it on the list. It opens the message template database, the keepbase and source files. It initializes the action list to NULL. As discussed herein, the initialization routines schedule initial events.

The source search routines perform message scanning of a particular source. That is, they read messages from the source, compare messages against the message template database, manipulate counts, manage the keepbase and perform actions if necessary. If a match between the source file message template database is detected, it adds the message with time stamp information to the keepbase. If a message template (search) database entry for a message is already overthreshold, this is noted and the message count is updated.

The keepbase cleaning routines delete excess messages and search for overthreshold errors for a source starting at the beginning of the keep database. The diagnostic routine writes a specified message into the system error log file.

Figure 4B:
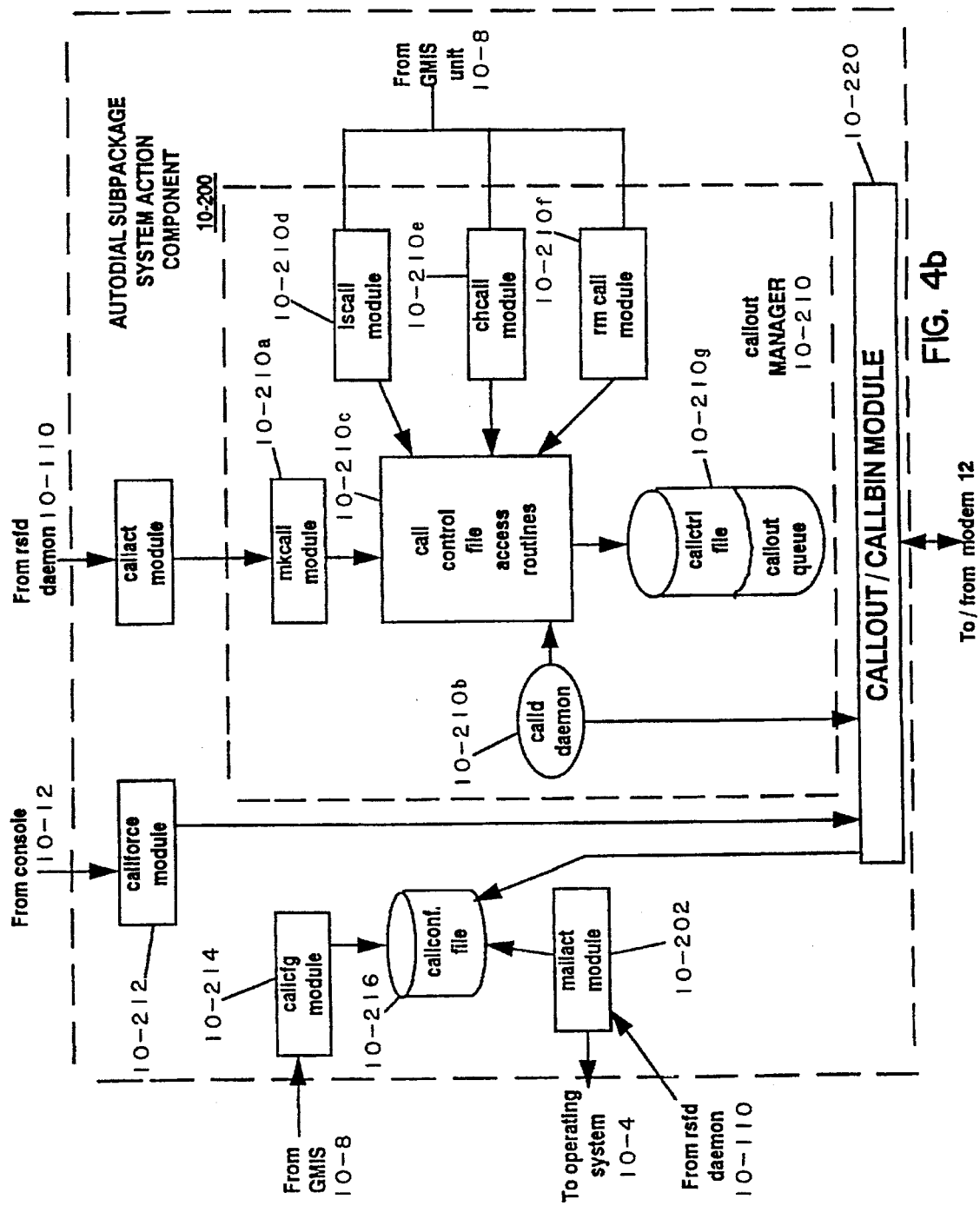

System Action Component 10-200 Detailed Description—FIG. 4b

FIG. 4b shows in greater detail, a portion of the system action component 10-200. More specifically, it shows the modules which make up the callout manager module 10-210. These modules correspond to a make call (mkcall) module 10-210a, a calld daemon 10-210b, a file 10-210c containing a set of call control file access routines, a list call (lscall) module 10-210d, a change call (chcall) module 10-210e, a remove (rmcall) module 10-210f and a call control (callctrl) file 10-210g which are operatively coupled as shown. The lscall module 10-210d allows callout requests stored in a callout queue in file 10-210g by the callout manager 10-210 to be listed. As discussed, callout manager 10-210 controls the timing and sequencing of callout requests made to a response center. It manages the callout requests stored in the callout queue. The callout queue is serviced by calld daemon 10-210b and parameters relating to the queue can be set by chcall module 10-210e. This queue also can be manipulated by mkcall module 10-210a and rmcall module 10-210f.

The lscall module 10-210d is invoked by a lscall command with the appropriate command line parameters described in the appendix. When invoked, module 10-210d accesses the call control file access routines of block 10-210c to read out queued callout requests for listing as specified by the command line parameters.

The chcall module 10-210e is invoked by a chcall command with the appropriate command line parameters described in the appendix. When invoked module 10-210e enables configuration of the delay and max calls parameters stored in file 10-210g and used internally by the callout manager 10-210 in controlling the processing of queued callout requests.

The rmcall module 10-210f is invoked by a rmcall command with the appropriate command line parameters described in the appendix. When invoked, module 10-210f utilizing the call control file access routines of block 10-210c removes callout requests from the callout queue as specified by the command line parameters.

The calld daemon 10-210b, as indicated, services the queue by scanning it for waiting callout requests and executing the requested callout action by transmitting a callout record created by callact module 10-218 via callout/callbin module 10-220 and modem 12 to the response center.

The mkcall module 10-210a in response to receipt of a call action request from callact module 10-218 sets up a new record entry after determining that there are not too many callout requests waiting. It uses the command line parameters received from module 10-218 to be added to the callout queue of call control file 10-210g. It then updates its callout count and next sequence number in a call control header used to identify the sequence of callout requests.

The other modules of FIG. 4b will now be discussed in greater detail. The call configuration (callcfg) module 10-214 allows the display and modification of all of the various parameters in configuration file 10-216. The module 10-214 is invoked in response to the callcfg command with the appropriate command line parameters as described in the appendix. When invoked, module 10-214 accesses the callconf file 10-216, reads it, verifies that the specified subpackages are installed and modifies the applicable configuration structure according to the command line parameters. Also, module 10-216 displays the different configuration parameters as specified by the command line parameters.

The callforce module 10-212 performs a forced callout operation with a user defined free form record of data. This module 10-212 is invoked in response to a callforce command with the appropriate command line parameters described in the appendix. When invoked, module 10-212 determines which editing facility in system 10-4 to use to create the free form record, gets the user generated callout message from a user file and generates a callout record containing the required information. The module 10-212 then performs the callout operation via callout module 10-220 in the case of a standalone host system or via the netact module 10-320 in a cluster system.

Figure 4C:
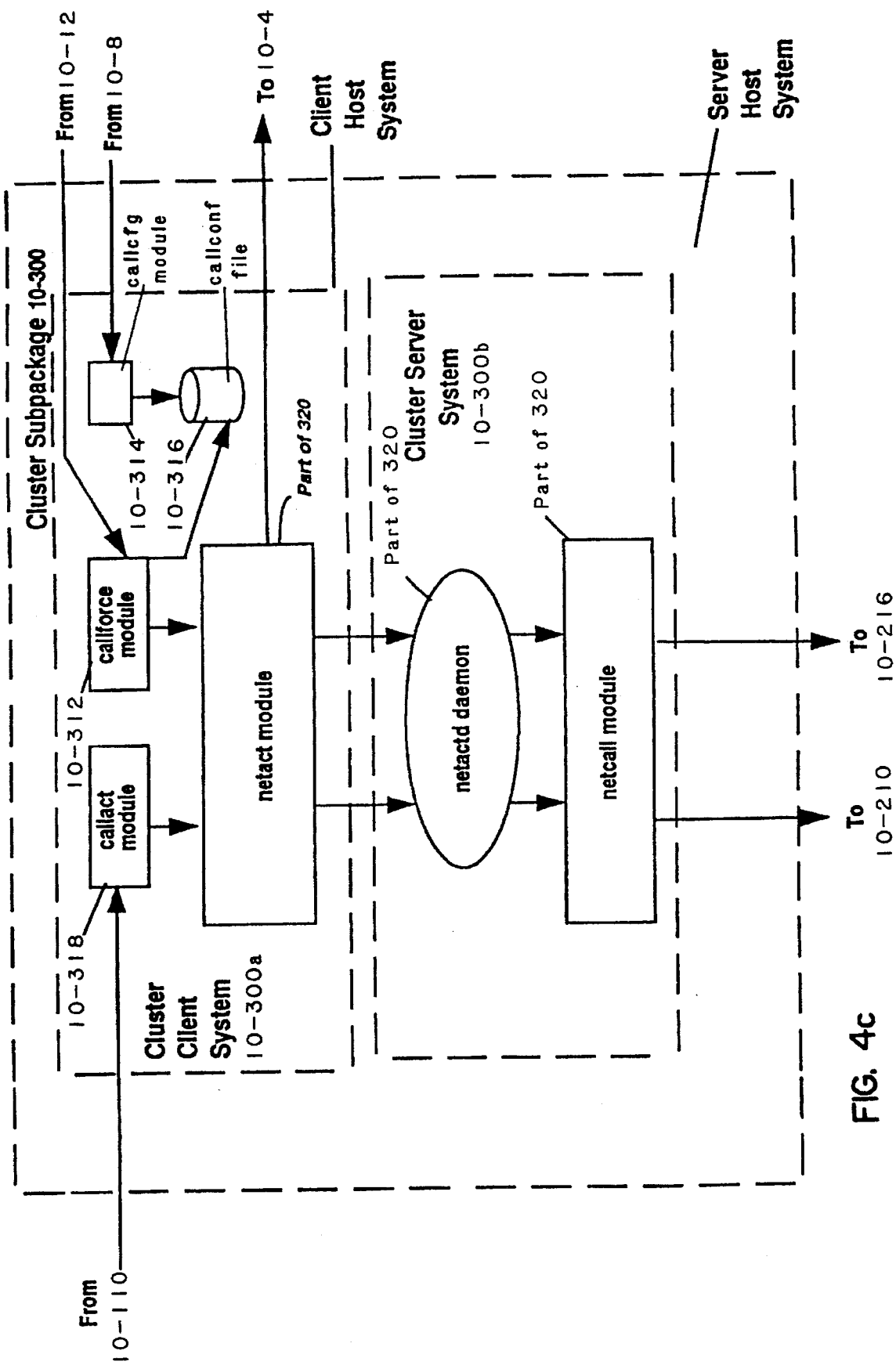

Cluster Services Component 10-300—FIG. 4c

FIG. 4c shows in greater detail, the cluster services component 10-300 can be viewed as having a cluster client subcomponent 10-300a and cluster server subcomponent 10-300b. Callcfg module 10-314, callconf file 10-316, callact module 10-318, callforce module 10-312 and netact module 10-320 make up the cluster client subcomponent 10-300a. The netact daemon 10-320 and netcall module 10-320 make up the cluster server subcomponent 10-300b. The callact module 10-318 and callforce module 10-312 perform the same functions as described in connection with system action component 10-200. The netact module 10-320 when invoked by either module 10-312 or 10-318 in response to receipt of command arguments, contacts the cluster server system subcomponent 10-300b via the operating system network facilities and sends the command arguments to netactd daemon 10-320. The daemon 10-320 in turn calls netcall module 10-320 which sends out a callout record to the response center 16 via callout module 10-220 in the case of callforce module 10-312 or through the callout manager in the case of callact module 10-312.

Figure 4D:
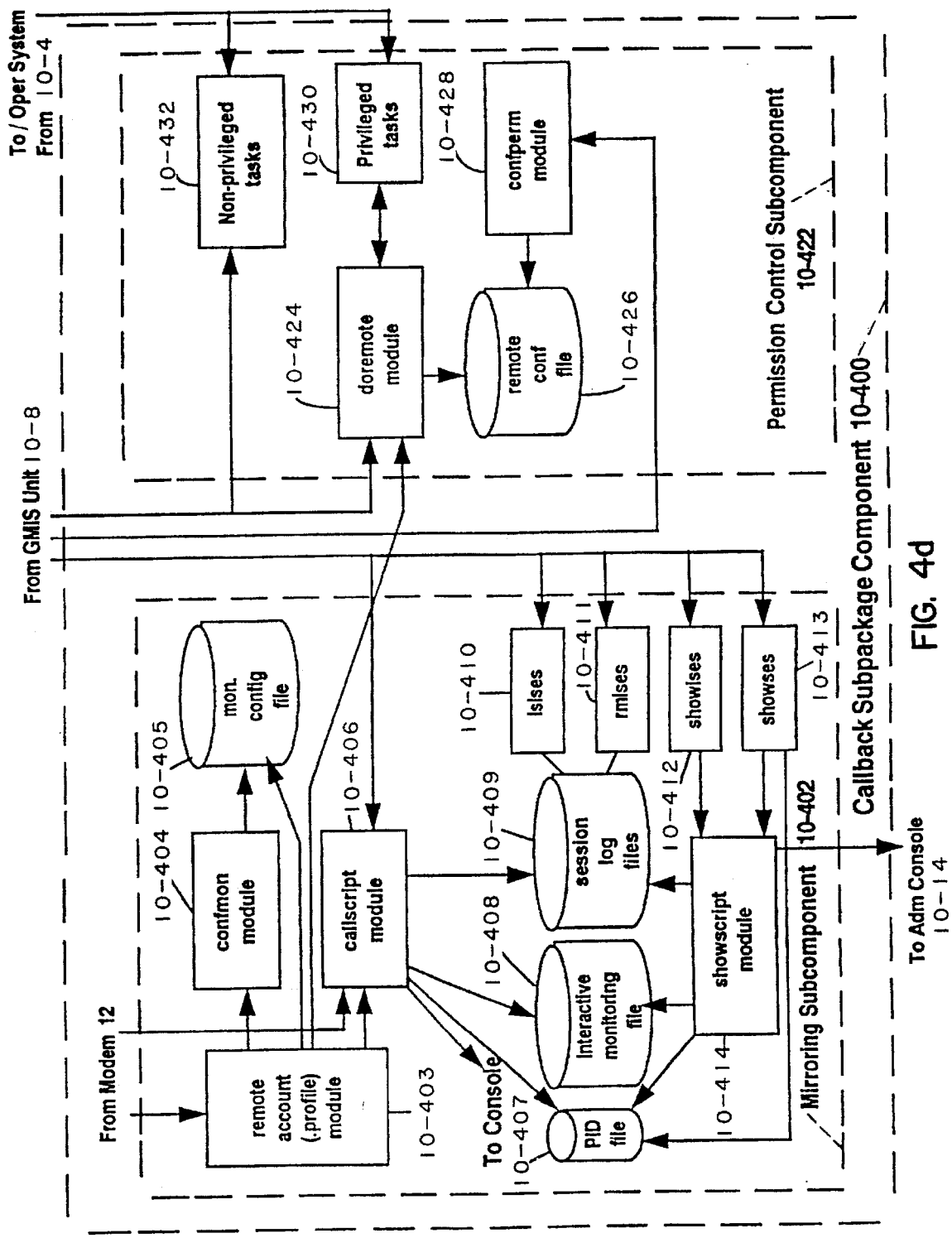

Callback Component 10-400 FIG. 4d

FIG. 4d shows in greater detail, the mirroring subcomponent 10-402 and permission control subcomponent 10-422 of callback component 10-400. As shown, subcomponent 10-402 includes a remote account module 10-403, a command for configuring monitoring options (confmon) module 10-404, a monitoring configuration file 10-405, a callscript module 10-406, a PID file 10-407, an interactive session monitoring file 10-408, a session log file(s) 10-409, a lsles module 10-410, a rmlses module 10-411, a showlses module 10-412, a showses module 10-413 and a showscript module 10-414. These modules and files are operatively coupled as shown in FIG. 4d. The profile module 10-403 is operatively coupled to receive the remote login from the TAC 14 via modem 12. The login is received and processed by host system 10-2 in a conventional manner through the remote login facilities of UNIX based system 10-4. However, the profile module 10-403 causes the remote login session to be executed in a predetermined manner under control of callback component 10-400 as described herein.

The confmon module 10-404 allows the configuration of the callback monitoring sessions by mirroring subcomponent 10-402. The confmon module 10-404 is invoked in response to a confmon command with the command line parameters described in the appendix. When invoked, module 10-404 reads the existing configuration from configuration file 10-405, processes the command line parameters, performs any necessary checks and writes the new configuration into configuration file 10-405.

The callscript module 10-406 performs the required operations necessary to carry out the scripting operations in response to a callscript command with the command line parameters described in the appendix. When invoked, module 10-406 opens up the appropriate file(s) into which data from modem 12 is to be written, then sets the terminal modes and routes the data into the designated files (i.e., 10-408, 10-409). Additionally, the module 10-406 also accesses PID file 10-407 as required for recording the process ID of the child process it creates to carry out the operation specified by the command line parameters. The child process alos poerforms other functions such as closing those files opened by the parent process not needed by the child process.

The showscript module 10-414 operatively couples to administrator console 10-14. The module 10-414 allows display or playback of the monitoring output captured by callscript module 10-404 and stored in one or more of the files 10-408 and 10-409 during a scripting session. The module 10-414 is invoked in response to a showscript command with the command line parameters described in the appendix. The command may be initiated by GMIS unit 10-8 through showlses module 10-412 and showses module 10-413 as indicated in FIG. 4d. When invoked, module 10-414 reads the files-created by callscript module 10-406 and enables playback of the session files on console 10-14 in two modes. In one mode, module 10-414 shows complete session and terminates operation. In another mode, it shows the current session as it is being created and where the end of the file is reached it waits for more data to be added to the file.

The first mode is carried out under control of showlses module 10-412 while the second mode is controlled by showses module 10-413. The showlses module 10-412, as mentioned, allows the playback of a completed or logged session. The module 10-412 is invoked in response to a showlses command with the command line parameters described in the appendix. When invoked, module 10-412 performs the necessary checks (i.e., access permission and valid command line argument). It obtains the designated or named logged session(s) to be reviewed and provides the required parameters to showscript module 10-414 for displaying the session file(s).

The showses module 10-413, as mentioned, allows the playing of a currently active session, if available. The module 40-413 is invoked in response to a showses command described in the appendix. When invoked, showses module 10-413 performs the necessary checks and verifies that there is a current session taking place (i.e., callscript module 10-406 is running). If there is current session running, module 10-413 passes the required parameters for displaying the current session to showscript module 10-414.

The lslses module 10-410 allows listing of logged sessions. This module is invoked in response to a lslses command described in the appendix. When invoked, module 10-410 accesses the directory of session log files 10-409 and lists the logged sessions using the facilities of system 10-4.

The rmlses module 10-411 allows removal of logged sessions. This module is invoked in response to a rmlses command which generates command line parameters described in the appendix. When invoked, module 10-411 performs permission and command argument checks and then accesses the directory of the session log files 10-409 and removes the specified session.

The permission control subcomponent 10-422 includes a doremote module 10-424, a remote configuration (remote conf) file 10-426, a configure permissions (confperm) module 10-428, a privileged tasks function module 10-430 and nonprivileged tasks function module 10-432. The modules are operatively connect as indicated in FIG. 4d.

The doremote module 10-424 performs operations for the "remote" user that require a certain level of permission. The module 10-424 is invoked in response to a doremote command which generates command line parameters described in the appendix. When invoked, module 10-424 accesses remote config file 10-426 for determining if root access is allowed. When it is, the module spawns a root subshell.

The confperm module 10-428 allows the configuration of permissions to be granted to remote users who have logged onto the host system 10-2 through remote account module 10-403 and operating under the control of callback component 10-400. This module is invoked in response to a confperm command with the command line parameters described in the appendix. When invoked, module 10-403. It accesses the permissions configuration file through access routine, not shown, similar to those described above and reads the existing configuration from file 10-426. It then processes the command line parameters and writes the new configuration into file 10-426.

The privileged tasks module 10-430 and the nonprivileged tasks module 10-432 provide the appropriate interface call parameters to the operating system 10-4 required for carrying out their respective tasks.

Figure 6:
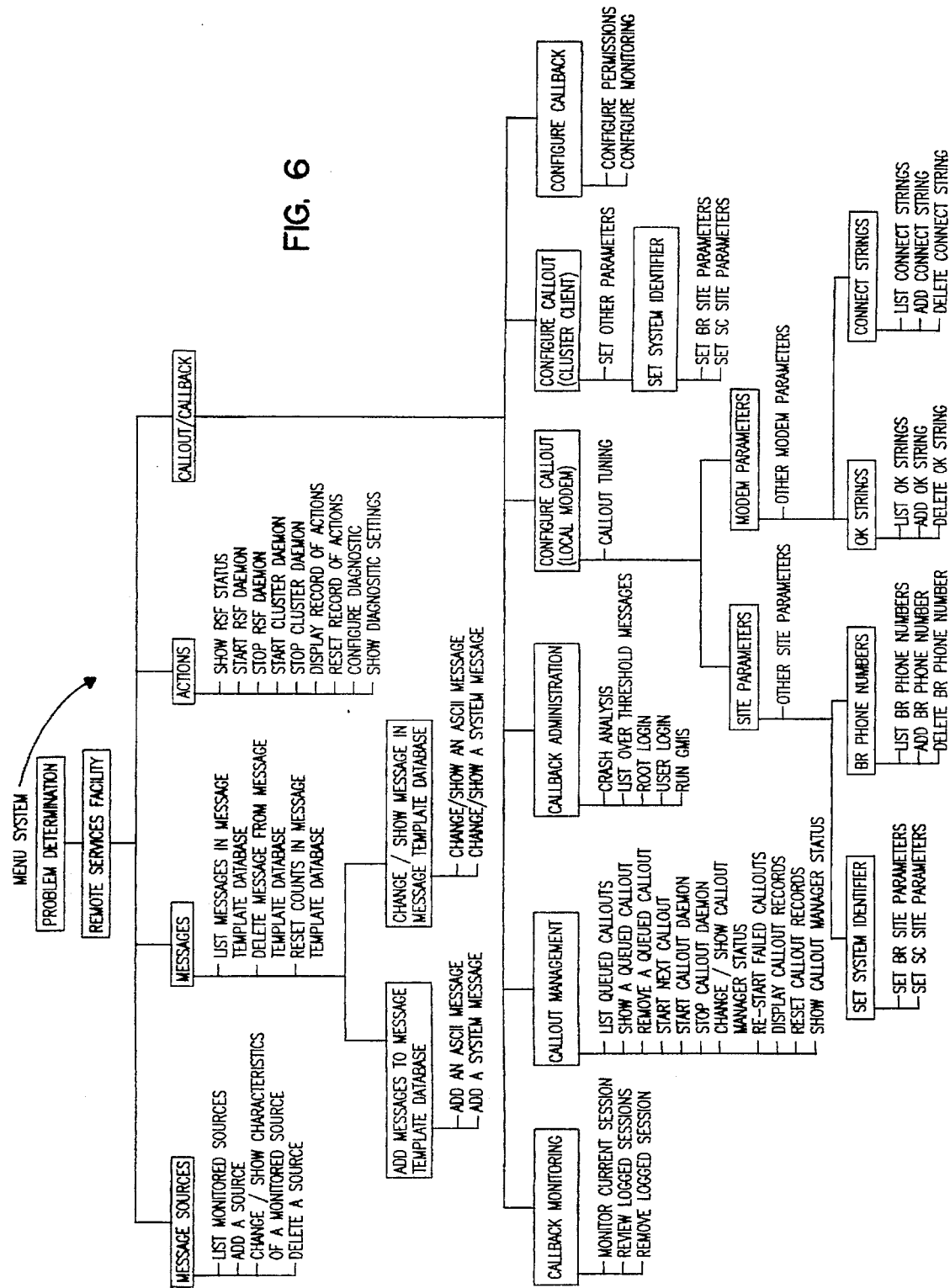
FIG. 6 illustrates the organization of the menu system utilized by the, generic menu interface system of FIG. 1 in accordance with the present invention.

RSF Unit Menu System—FIG. 6

As discussed above, the RSF unit 10-10 utilizes the generic menu interface system (GMIS) unit 10-8 which provides a graphic interactive screen oriented command interface. This interface in the preferred embodiment uses a hierarchical screen organization which includes menu, selector and dialog screen to generate the required command line parameters for causing RSF unit 10-10 to perform a specific task. FIG. 6 illustrates the relationships between the different menu, selector and dialog screens utilized by unit 10-10 according to the present invention. As indicated, RSF unit 10-10 is accessible from the top level of the menu system which corresponds to a problem determination submenu. This submenu includes four selection items corresponding to message sources, messages, actions and callout/callback. All four menu items lead to submenus and all traversals down through the menu structure eventually lead to dialogs for each RSF command associated with the menu selection. Therefore, the different command line operations described above in connection with FIGS. 4a through 4d are normally carried out using this interface.

Description of RSF Configuration Process FIGS. 7a Through 7i

Figure 7A:
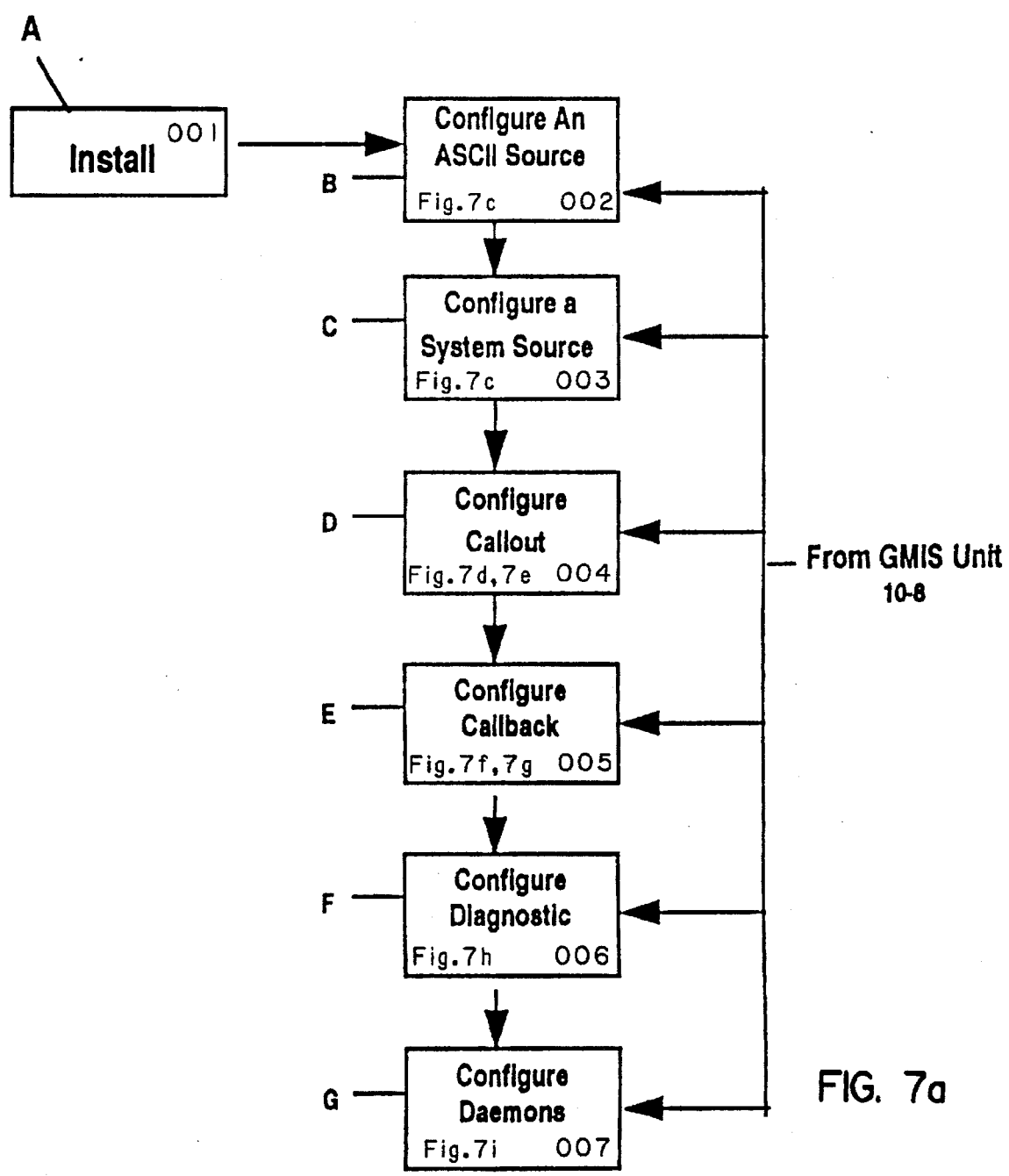
FIG. 7a illustrates a sample sequence of configuration steps.

FIG. 7a illustrates a sequence of configuration operations which have been chosen only for the purpose of explaining by way of example, how the different components of RSF unit 10—10 can be configured to operate according to the present invention. In many instances, the parameters being configured in the example would normally have been preconfigured within unit 10—10 and the user or customer running the host system 10-2 would only need to modify such parameters if there was a need to do so.

Considering FIG. 7a, it is seen that to integrate RSF unit 10—10 into host system 10-2, an install operation is performed as indicated by block A. This operation is initiated by a user through GMIS unit 10-8. The install operation proceeds in a conventional way relative to placing the diskettes containing the RSF subpackages into an available disk drive device. The user next selects the device name for the drive device to be used for installing RSF (e.g. /dev/fd0) contained in an initial dialog menu. The user upon indicating to unit 10-8 to continue the install operation, is next presented with the dialog menu of FIG. 8a.

Figure 7B:
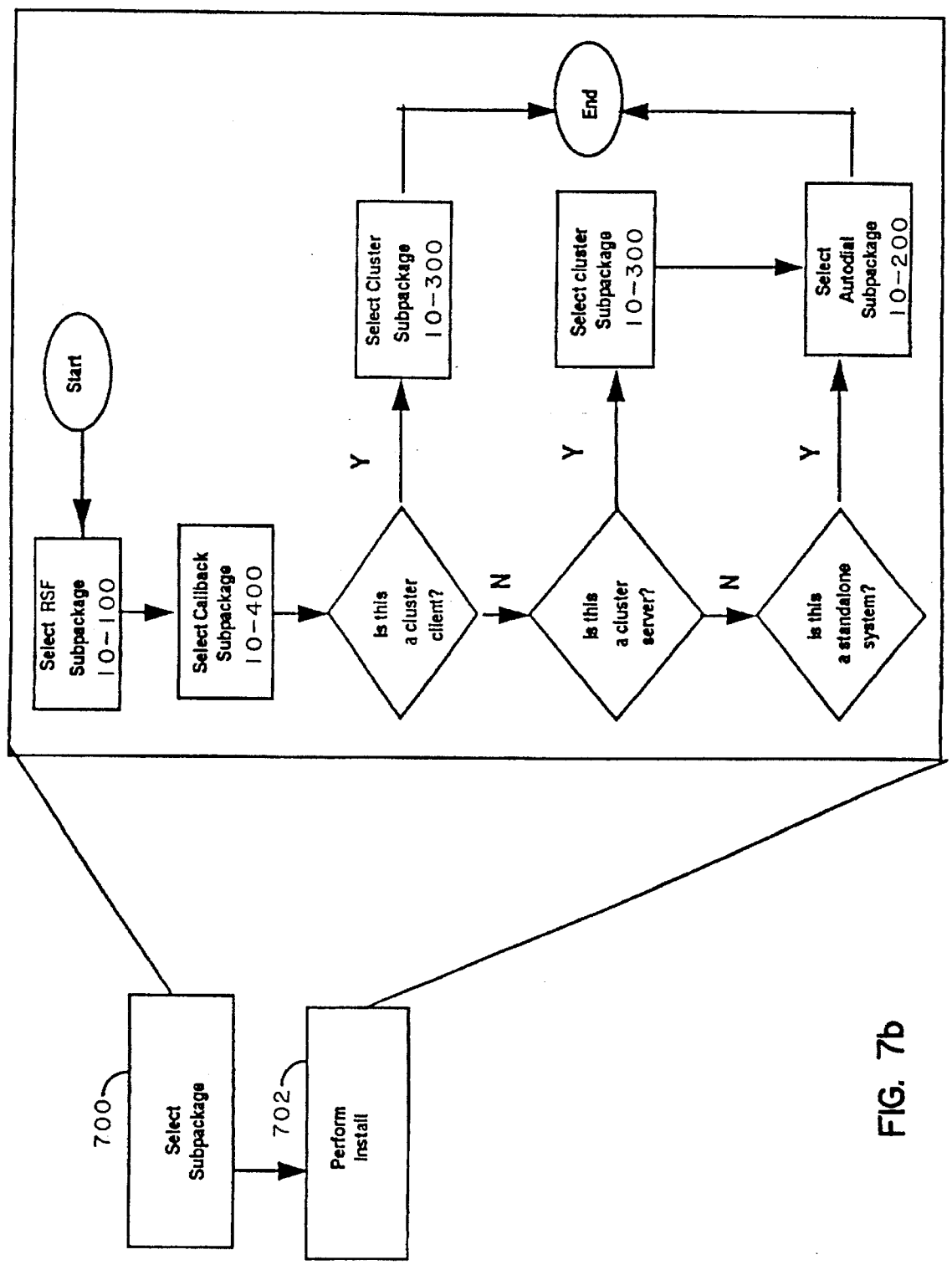

As shown, the menu indicates that the previously named device is the device being used to install the RSF subpackages. The user changes the "SOFTWARE to install" menu item to select only the subpackages that are required for the type of host system configuration which is going to use RSF unit 10—10. Assuming that the host system is configured as a standalone system, the user would make the selections as shown in FIG. 7b. This is carried out by selecting the "List" button next to the "SOFTWARE to install" field. This causes the unit 10-8 to display the selector menu of FIG. 8b. Next, the user selects both the "obj" and "data" parts for each subpackage which is to be installed. Such selections are made according to FIG. 7b. After each subpackage selection is made, the user causes the dialog to be executed according to the instructions displayed on the menu screen. As indicated in FIG. 7b, after completing the selection process of block 700, the user causes the dialog to be executed which begins the installation operation of block 702. During this operation, the host system 10-2 prompts the user for the disks to be swapped during the installation. In the present example, the result is that subpackages 10-100, 10-400 and 10-200 will be installed in host system 10-2.

Figure 7C:
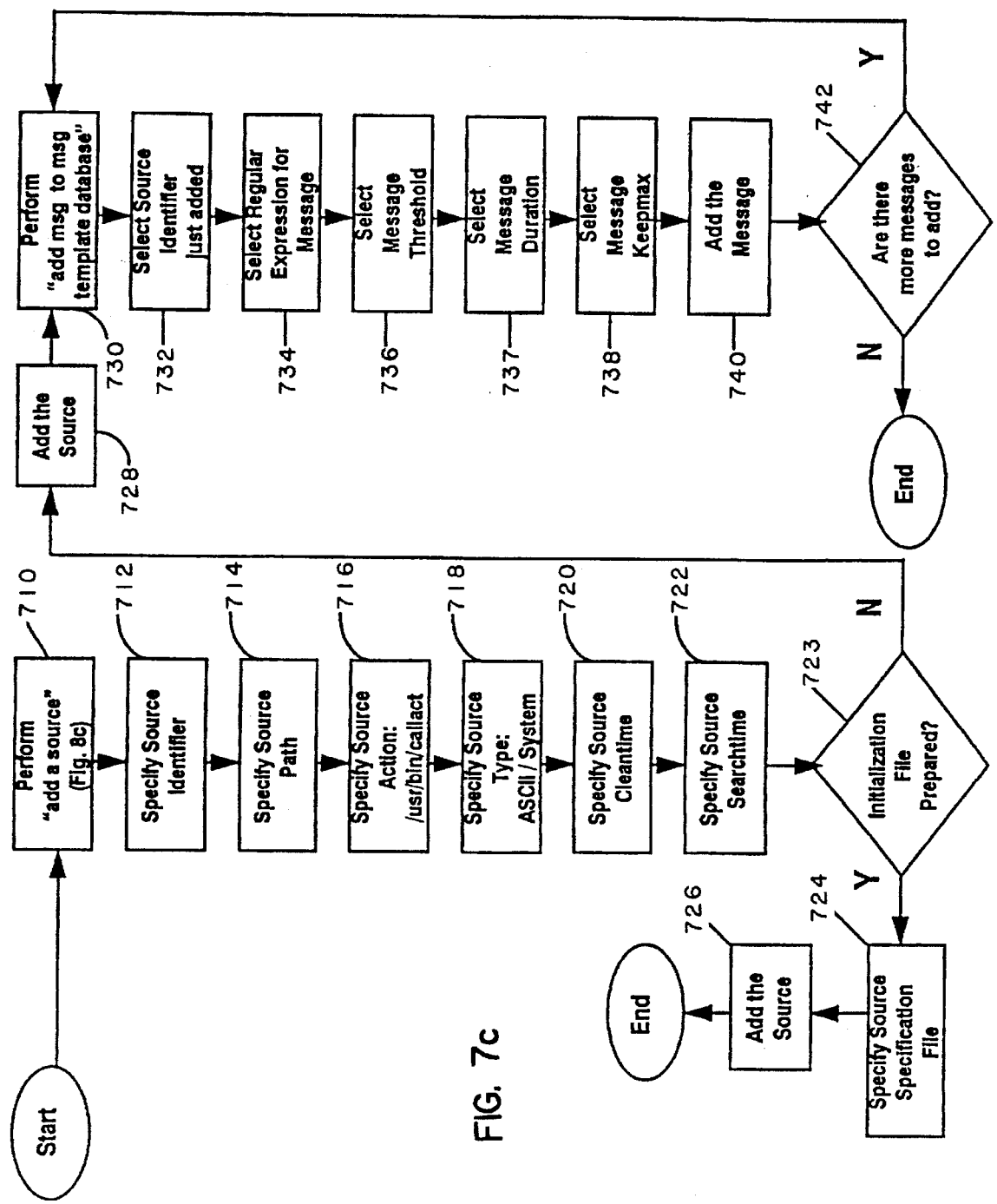

As indicated in FIG. 7a, by way of example, the user performs the operation of configuring a host system source such as ASCII source 10-102f of FIG. 4a. The sequence of operations for configuring the source is shown in detail in FIG. 7c. Referring to FIG. 7c, it is seen from FIG. 6 that the User selects the "message sources" submenu from which can be run, four tasks, one of which is labeled "add a source." The submenu can be selected directly through a fast path. For this submenu, the user types GMIS msg__sources. This results in the display of the first submenu of FIG. 8c as indicated by block 710 of FIG. 7c.

The user by selecting the "add a source" menu item causes the display of the dialog screen shown in menu #2 of FIG. 8c.

As indicated by blocks 712, 714 and 716, the user enters information such as the source identifier, source path name and the pathname of the action to be executed such as a callout action indicated as/usr/bin/callact. Next, as indicated by block 718, the user enters information specifying the source type as an ASCII source which is indicated as "ASCII." Also, the user specifies the source's cleantime and searchtime parameters as indicated by blocks 720 and 722.

In adding the source, the user also needs to specify the potential messages which are to be monitored by the source being added. This can be done in two ways. One way is to prepare an initialization file ahead of time either manually or by using the mkmsgtmp program 10-106a in the manner previously discussed. In that case, the user need only specify the initialization file as indicated by block 724 and then perform the indicated dialog. The block 106 of FIG. 4a will cause these messages to be added to the message template database for the specified ASCII source 10-102f when the source is added. The GMIS unit 10-8 generates a command line for the mkmsrc command with the user supplied information. Mkmsrc program 10-106b causes the source to be added by establishing the appropriate control record for the ASCII source within control file 10-102b in the manner discussed above.

If an initialization file has not been prepared ahead of time, the user can add messages one at a time by selecting the "add messages to message template database" submenu. As shown in FIG. 6, this submenu is displayed By selecting the "add messages to message template database" item of the messages submenu as indicated in block 730. Selecting this item results in the display of a selector screen containing the identifiers of all sources currently being monitored by RSF unit 10—10. The user selects the source identifier that was Just added as indicated in block 732. Once the desired source is selected, the dialog screen of FIG. 8d is displayed by GMIS unit 10-8.

Next, as indicated in block 734, the user selects the regular expression value for the message which is the parameter used to match messages read from ASCII log file 10-102f. The user next performs the operations of blocks 736 through 738 for selecting the message threshold, the duration and keepmax parameters for that message. This results in the generation of a mkmsg command line by GMIS unit 10-8 which invokes the mkmsg program 10-106e of FIG. 4a. As previously discussed, this program causes the message having the user specified parameters to be added to the message template database of the added ASCII source as indicated by block 740. If there are more messages to be monitored for the source, then the user repeats the sequence defined by blocks 730 through 740 for each message to be added.

Following completion of adding an ASCII source, the user by way of example, next configures a system source as indicated by block C in FIG. 7a. This operation is performed in the same way as configuring an ASII source. The only differences are when the user specifies the source type, "SYSTEM" is selected instead of ASCII. Also, instead of selecting a regular expression value, the user selects a message identifier (ID) which uniquely identifies each of the potential messages in the host system error log 10-102e of FIG. 4a (see FIG. 5e). The above described arrangement facilitates the addition of other types of binary log files having specific structures.

Figure 7E:
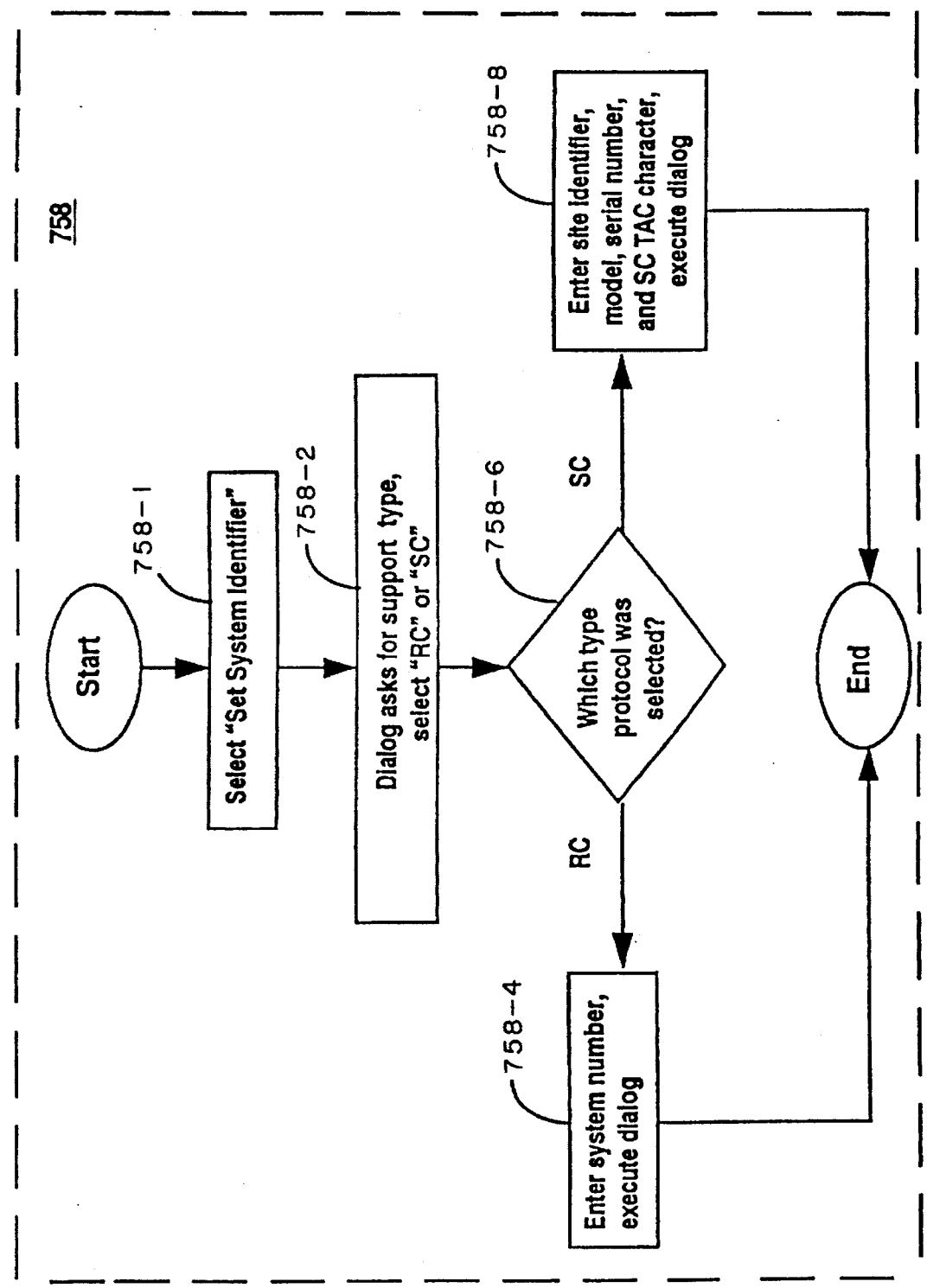
FIG. 7e illustrates in greater detail, the set system identifier operation of FIG. 7d.

As seen from FIG. 7a, the user by way of example, next performs the configure callout operation of block E for configuring the system action component 10-200 of FIG. 4b. The sequence of operations performed relative to block E are shown in FIGS. 7d and 7e.

As indicated by block 750 of FIG. 7d, it is necessary to determine if the host system utilizing RSF unit 10—10 is a cluster client system since the operations for configuring the callout component are different for the cluster client system than those for configuring a cluster server or standalone system. The reason is that the cluster server or standalone system includes a directly connected modem. Since the cluster client system performs the callout function through a cluster server system over the LAN/WAN, the user of a cluster client system does not have to configure all of the parameters which relate to such modem connection.

Since the host system 10-2 is a standalone system, the user performs a "configure callout (local modem)" selection of block 752 which results in the display of the submenu of FIG. 8e by GMIS interface 10-8 as indicated in block 753. The menu path is as indicated in FIG. 6.

The submenu of FIG. 8e contains a set of selections that allows customization of the autodial function of component 10-200. These selections include site parameters, modem parameters and callout tuning. Selecting the "site parameters" item of block 754 results in the display of another submenu such as shown in FIG. 8f. As indicated in block 756, this submenu contains further selections for manipulating local operator and system information.

When the user selects the "System Identifier" menu item of FIG. 8f, this causes GMIS unit 10-8 to generate submenus requiring further user actions. The set system identifier operation of block 758 is shown in greater detail in FIG. 7e. Upon selection of the "set system identifier" item on the displayed submenu, GMIS presents a dialog screen which asks the user to select what type of support center protocol will be used as indicated by block 758. This allows the host system 10-2 to communicate with response centers in different geographical areas which may use different standard protocol sequences/procedures for processing support calls. As indicated by block 758-2, the user selects either "RC" or "SC." This results in the user performing the operations of either block 758-4 or block 758-8. For block 758-5, the user only enters the system number information. In the case of block 758-8, the user enters several items of information which are the site identifier, the model, the serial number and a TAC character all of which have some specific meaning to the SC site processing the host system call. In either case, upon completing the entering the required information items, the user executes the dialog according to the instructions on the menu to execute the procedure for storing the system identifier parameters (i.e., "execute dialog in blocks 758-4 and 758-8"). This causes GMIS unit 10-8 to generate a callcfg command. The callcfg command is provided with a command line containing all of the required system identifier parameters defined by the user which are provided or passed in the proper form to callconfig module 10-214 for causing the storage of the user selected system identifier parameters in callconfigfile 10-216. Independent of which procedures are executed, both lead to the operation of block 760 of FIG. 7d.

When the user selects the "BRC Phone Numbers" menu item according to block 760, this results in the display of the submenu of FIG. 8g. This submenu allows the user to list, add or delete response center telephone numbers sequentially as indicated in block 762. When the user selects the item "Add a BRC Phone Number," this allows the user to enter or configure each of the proper phone numbers as indicated by blocks 764 and 766. The GMIS unit 10-8 generates a callcfg command to carry out the required "execute dialog" of block 766.

As described above, callcfg command is provided with a command line containing the appropriate phone number parameters based upon user selections which are provided to the callconfig module 10-214 for causing storage of the user selected parameters in callconfig file 10-216.

As indicated by block 768 in FIG. 7d, the user repeats the operations of blocks 764 and 766 until all of the proper phone numbers have been entered. Next, the user returns to the "site parameters" submenu as indicated by block 770. This involves following the path indicated in FIG. 6 for again displaying the submenu of FIG. 8f. This time, the user selects the "other side parameters" menu item which results in the displaying of the submenu of FIG. 8i.

As indicated by block 774, the user enters other site parameters such as those illustrated in FIG. 8i. As shown, these include operator name and phone number, system phone number, remote password, the path name of the terminal (TTY) utilized in making the callout operation and the E-Mail address of the local system operator or to the person whom notification of the callout attempt should be sent. The operator name and phone number enables the TAC 14 to contact the local system operator to arrange for a problem determination session. The remote password enables access to the remote account module 10-403 of callback component 10-403 of FIG. 4d. When the local administrator or user does not wish to allow remote access, this item is left blank. It will be appreciated that the actual password is set by using the "passwd" command facilities of system 10-4. The user then executes the dialog according to the instructions displayed by the submenu of FIG. 8i to execute the procedures for processing the entered information. As described above, it causes GMIS unit 10-8 to generate a callcfg command. The callcfg command is provided with a command line containing all of the required user entered other site parameters which are passed in the proper forms to callconfig module 10-214 for causing the storage of such parameters in callconfig file 10-216.

Figure 8J:
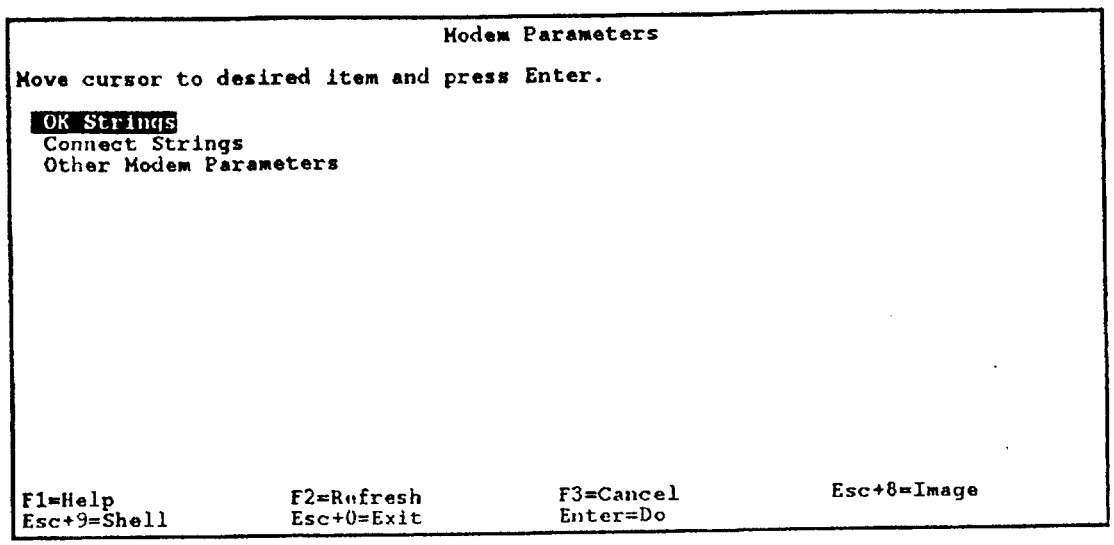
FIGS. 8a through 8t illustrate menus utilized in carrying out the configuration operations of FIGS. 7a through 7d.

As indicated by block 776, the user backs out to the "configure callout (local modem)" menu of FIG. 8e. This is done by sequencing back through the path indicated in menu system of FIG. 6. As indicated by block 780, the user determines if the modem being used by host system 10-2 is the normal preconfigured (default) modem connection. If it is not, the user selects the "modem parameters" menu item of FIG. 8e (i.e., block 782). This causes GMIS unit 10-8 to display the submenu of FIG. 8j as indicated by block 782.

The user performs the sequence of operations of blocks 786 through 810 for certifying that the correct modem communication string parameters are provided for configuring callout communications for both standone alone and cluster server system configurations.

Figure 8K:
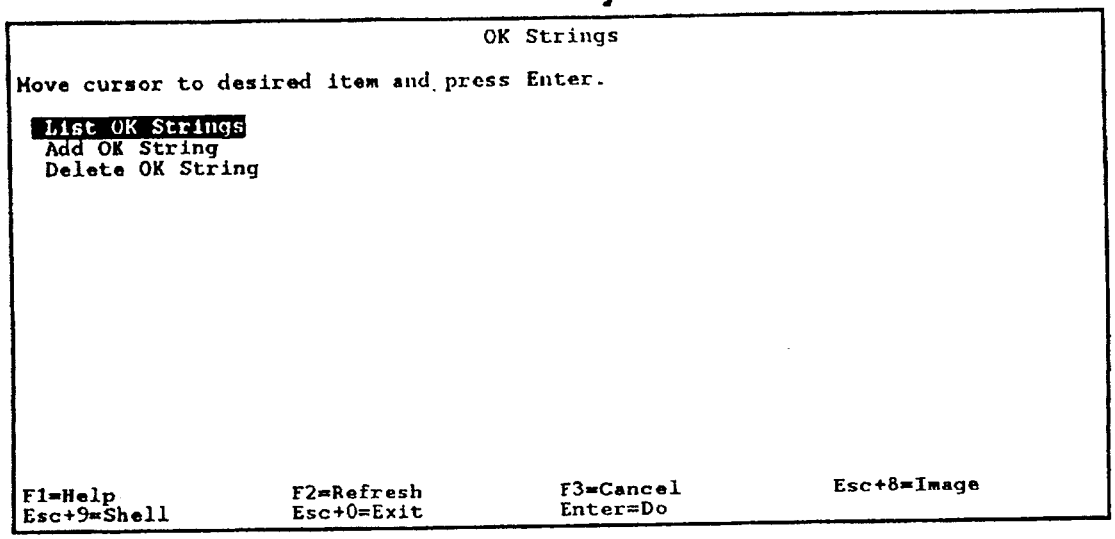
Figure 8L:
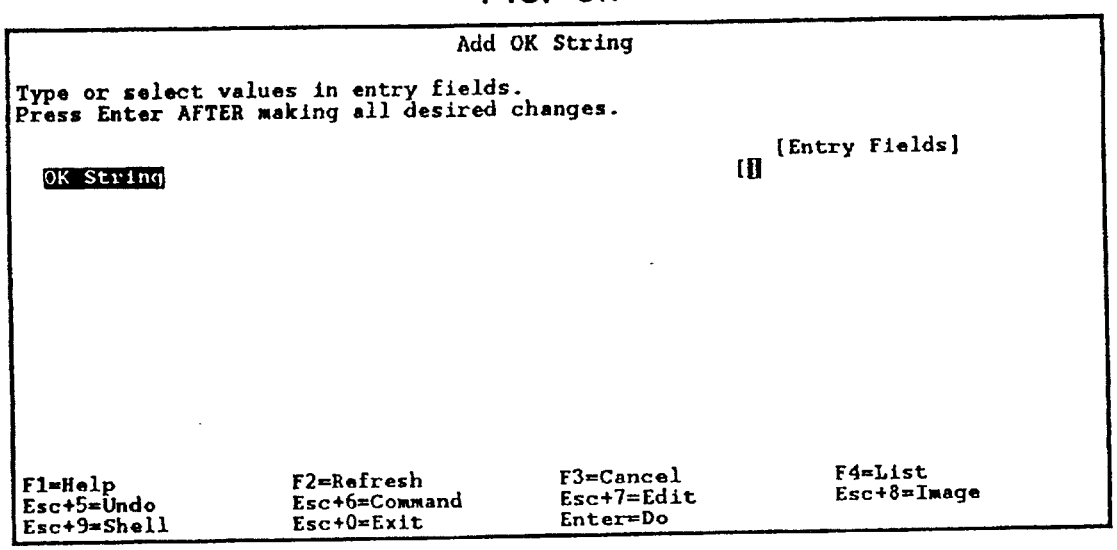

As shown, the user selects the "OK strings" menu item on the display submenu of FIG. 8j. This causes GMIS unit 10-8 to display the submenu of FIG. 8k as indicated by block 788. As seen from FIG. 8k, the user can list, add or delete OK strings. OK strings are the messages sent by the modem indicated the successful completion of a modem command. A list of modem OK strings can be displayed by having the user selecting the "list" menu item of the submenu of FIG. 8k as indicated in block 790 of FIG. 7d.

in response to block 790, GMIS unit 10-8 displays the current list of modem OK strings without any user dialog. As indicated by block 792, if the user determines that an OK string needs to be added, the user then selects the "ADD OK string" item from the menu of FIG. 8k. This causes GMIS unit 10-8 to display the dialog screen of FIG. 8l.

Next, the user enters the OK string which for most modems corresponds to the default of "0" and "OK" and presses the enter key. This causes GMIS unit 10-8 to execute the required procedure (i.e., execute dialog) as indicated in block 795. That is, this causes GMIS unit 10-8 to generate another callcfg command. The callcfg command is provided with a command line containing the user entered OK string and command parameters which are passed in the proper format to callconfig module 10-214 for the storage of such parameters in call config file 10-216.

If an OK string does not need to be entered, the user determines if an OK string needs to be deleted as indicated by block 796. If a string is to be deleted, the user selects the "delete OK string" item on menu FIG. 8l as indicated in block 797. This causes GMIS unit 10-8 to display a dialog screen similar to that of FIG. 8l. This OK string to delete may be entered manually or selected from a list. In this sequence, when a string is selected by the user and the dialog is executed to carry out the procedure (execute dialog) indicated in block 798, GMIS unit 10-8 causes the removal of the selected string from the list. That is, this causes unit 10-8 to generate a callcfg command containing a command line which includes the selected string and command parameters. These parameters are passed in the proper format to call config module 10-214 which accesses config file 10-216 and deletes the specified string from such file.

As indicated in FIG. 7d, the user can carry out a similar sequence of operations relative to connect strings. Connect strings are the messages sent by a modem to indicate that a successful communication connection has been established. The operations of blocks 801 through 809 are carried out in the same manner as the list, add and delete operations for the OK strings described above. As shown in block 799, the user backs out to the "modem parameters" menu screen shown in FIG. 8j. This is done by following the path indicated in FIG. 6.

Figure 8M:
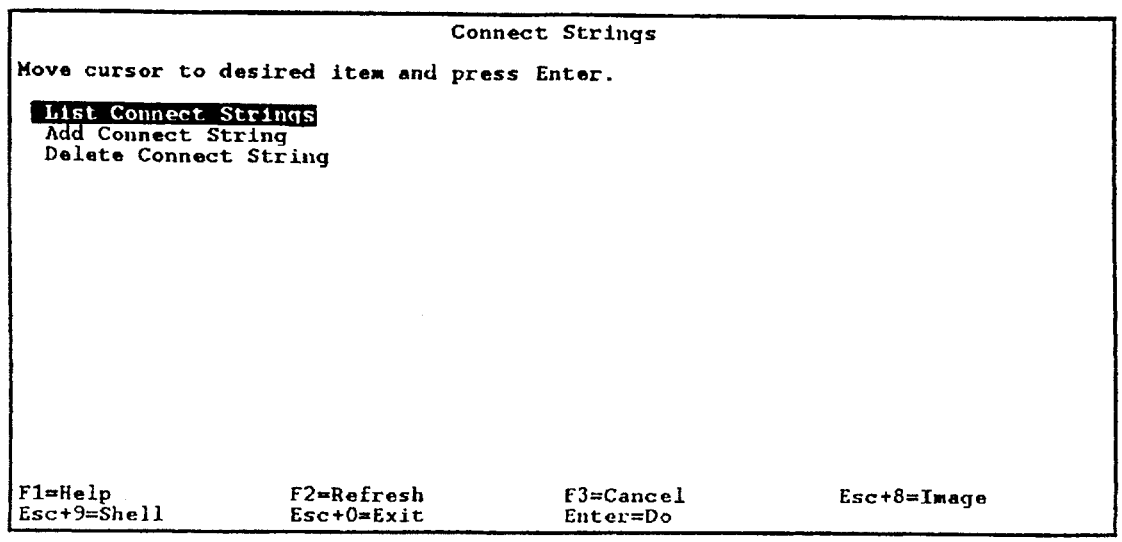
Figure 8N:
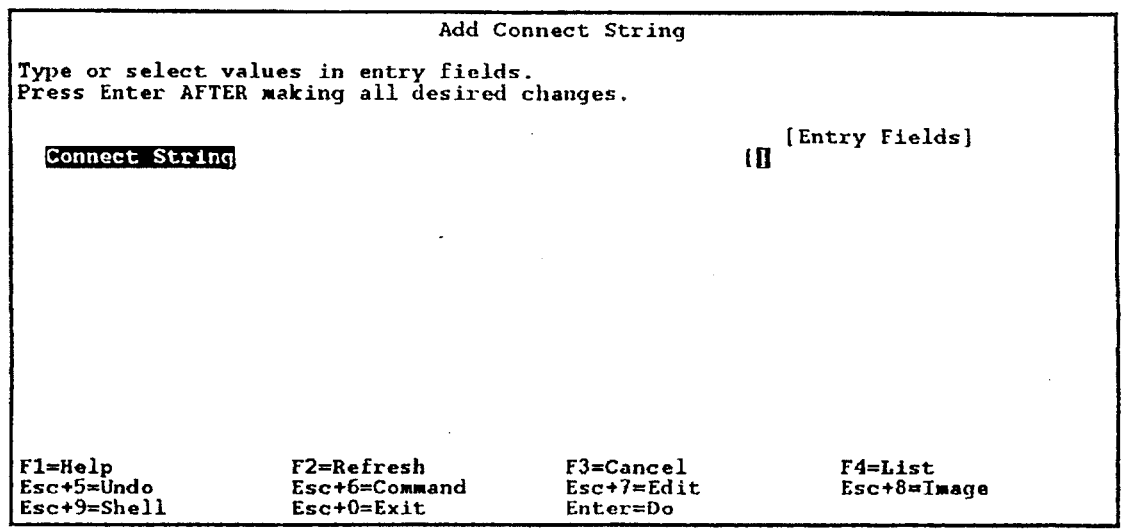

As indicated in FIG. 7d, the user, by selecting the "connect strings" menu item of FIG. 8j, causes GMIS unit 10-8 to display the submenu screen of FIG. 8m. If a connect string needs to be added, the user selects the "ADD Connect String" submenu item as indicated in blocks 804 and 805. This causes GMIS unit 10-8 to display the dialog menu screen of FIG. 8n. Again, the user enters the connect string to be added and executes the dialog. As indicated in block 806, this causes GMIS unit 10-8 to execute the procedure for adding the user entered connect string. That is, GMIS unit 10-8 generates a callcfg command containing a command line which includes user entered "connect string" and command parameters. These parameters are passed in the proper format to call config module 10-214 which accesses config file 10-216 and stores the specified connect string. If a connect string needs to be deleted, the user selects the "Delete Connect String" menu item from the submenu screen of FIG. 8m, enters the string to be deleted and executes the dialog as indicated in blocks 807 through 809. This sequence causes GMIS unit 10-8 to execute the procedure for deleting the user selected connect string. That is, GMIS unit 10-8 generates a callcfg command containing a command line which includes the user selected connect string and command parameters. These parameters are passed in the proper form to call config module 10-214 which accesses config file 10-216 and deletes the specified connect string from the file.

After completing this sequence, the user is able to enter additional modem parameters by backing out to the modem parameters submenu screen of FIG. 8j. As indicated by blocks 810, 812 and 814, the user upon selecting the "other modem parameters" menu item on the menu screen of FIG. 8j causes GMIS unit 10-8 to display the menu screen of FIG. 8o. As indicated in FIG. 7d, the user can enter several other modem parameters.

Figure 8O:
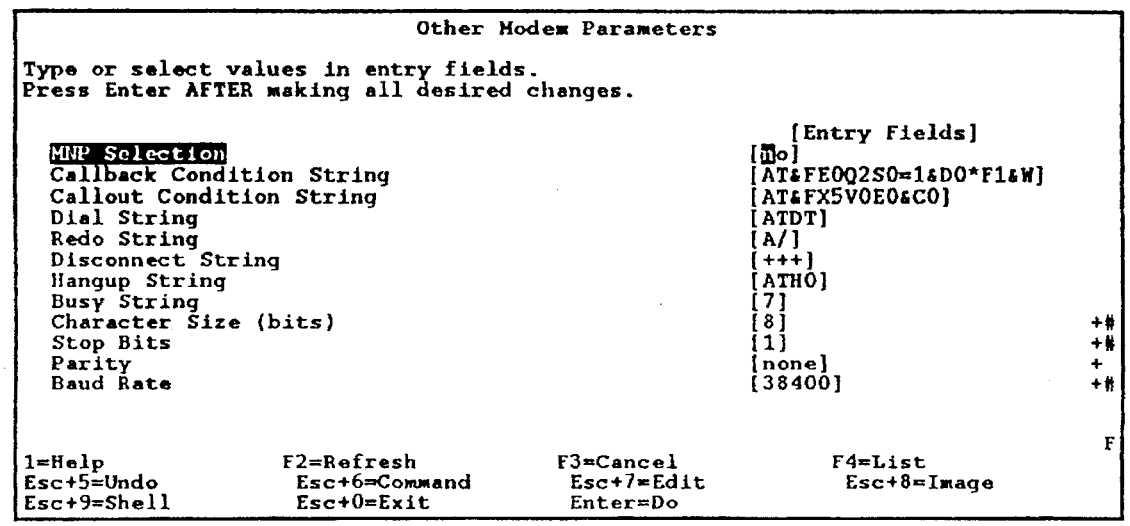

As illustrated in FIG. 8o, these include selection of modem network protocol (yes or no), a callback condition string which defines the modem callin conditioning string, a callout condition string which defines the modem callout conditioning string, a dial string which is the modem command string that is used to execute modem-dialing operation, a redo string which is a modem command string used to execute a modem dial repeat operation, a disconnect string which is a modem command string used to execute a modem disconnect operation, a hang-up string which is a modem command string used to execute a modem hang-up operation, a busy string which is a modem reply string for indicating when the dialed number is busy, character size (bits) parameter defining the number of bits in a character (5–8), a stop bit parameter indicating the number of stop bits in a character, a parity parameter for indicating odd, even or no parity and a baud rate parameter defining the baud rate of the modem. Upon completing the entering of the parameters, the user executes the dialog which causes GMIS unit 10-8 to execute the required procedure for adding the user entered modem parameters. That is, GMIS unit 10-8 generates a callcfg command containing a command line which includes the other modem and command parameters. These parameters are passed in the proper form to call config module 10-224 which accesses config file 10-216 and stores the other modem parameters in the file.

The final menu item appearing in the "Configure Callout (Local Modem)" menu screen if FIG. 8e is "Callout Tuning." The selection of this menu item causes GMIS unit 10-8 to display the callout timing parameters menu dialog screen of FIG. 8u. Although not shown in FIG. 7d, this sequence would be represented similar to block 776 and 782. A user via the screen of FIG. 8u can fine tune several callout parameters to satisfy the host system modem performance requirements. More specifically, the user can fine tune the following parameters: a try condition parameter specifying the number of retries when conditioning the modem, a retry for each number parameter specifying the number of retries to be attempted for each TAC phone number, a delay between busy retries parameter specifying the delay between attempts for retrying a TAC phone number, a modem intercommand delay parameter specifying the delay between items of data sent to TAC 12, and a remote time-out parameter specifying the time-out period for waiting for data from TAC 12. Upon completing the entering of the parameters, the user executes the dialog which causes GMIS unit 10-8 to execute the procedure for adding the callout tuning parameters to config file 10-216 similar to the manner described above.

As indicated in FIG. 7d, the user next performs the "perform callout management sequence" of block 830. As indicated in FIG. 7d, this sequence would be performed in the case where the host system modem is the same as the preconfigured modem as indicated by block 780. Again, the user would backup to the configure callout (local modem) menu by following the path indicated in FIG. 6. The user, by selecting the "callout management" menu item on the menu screen of FIG. 8e, causes GMIS unit 10-8 to present the menu screen of FIG. 8p. As seen from FIG. 8p, the user is able to configure different callout manager operating parameters as required for controlling the manner in which the callout manager processes incoming callout requests received from the host system and any cluster clients. This is done by blocks 832 through 839.

As indicated when the user selects the "change/show callout manager status" item on the menu screen of FIG. 8p, this causes GMIS unit 10-8 to display the dialog screen of FIG. 8q. The user can enter the amount of time that the callout manager module 10-204 of FIG. 3 will delay between consecutive callout requests. Additionally, the user can configure the maximum number of callout message requests that callout manager module 10-204 will queue at one time. After entering the values in the fields of FIG. 8q, the user executes the dialog to cause GMIS unit 10-8 execute the procedure for storing the configured values. This causes GMIS unit 10-8 to generate a chcall command containing a command line including the selected callout manager values and command parameters. These parameters are passed to the chcall module 10-210e of FIG. 4b which using the call control file access routines of block 10-210c, stores the user selected callout manager parameters in callctrl file 10-210g.

Also, the user may also want to establish when calld daemon 10-210b of FIG. 4b is to be started. As indicated by block 837, this is done by selecting the "start callout manager daemon" menu item on the menu screen of FIG. 8p. This causes GMIS unit 10-8 to generate the dialog menu screen of FIG. 8r. As shown, the user can choose to start daemon 10-210b now, at reboot time or now and at reboot time. Upon completing the selections, the user executes the dialog to cause GMIS unit 10-8 to carry out the procedure of storing the daemon configuration values. This causes GMIS unit 10-8 to generate a chcall command containing a command line which includes the user configuration and command parameters. These parameters are passed to the chcall module 10-210e which starts the calld daemon and/or uses conventional system commands to configure boot time behavior. As shown in FIG. 7d, this ends the illustrated "callout management" sequence.

It will be appreciated that the user could make other changes or view the status of the callout manager module 10-204 by selecting other parameter items on the menu screen of FIG. 8p. For example, the "List Queued Callouts" shows all of the callout requests stored in the callout manager queue. The "Show a Queued Callout" item allows an item from the queue to be shown including the callout contents when a queue index value is supplied. The "Remove Queue Callout" item allows a callout request to be removed from the queue. The "Show Callout Manager Status" item allows the current callout manager configuration and status to be displayed. The "Start Next Callout" item causes the next callout request to start. The "Restart Failed Callouts" causes the status of all failed callout requests to be changed to "Waiting." The "Display and Reset Callout Records" items allow the callout manager's callout log included within file 10-210g to be viewed and erased.

As indicated in FIG. 7d, if at block 750 the user determined that the host system was configured to operate a cluster client system then the configure callout (cluster client) sequence of blocks 850 through 858 would be performed. This involves first selecting the "configure callout (cluster client)" submenu. As indicated in FIG. 6, this involves selecting the "configure callout (cluster client) menu item of the callout/callback submenu. This causes GMIS unit 10-8 to display the submenu of FIG. 8s as indicated in block 852. These operations are carried out in the same manner as that described in connection with blocks 758 and 752. The user selects the "System Identifier" menu item of FIG. 8s which causes GMIS unit 10-8 to display a dialog screen similar to FIG. 8f. The user enters the system identifier parameters as a function of the type of support protocol being provided (i.e., "RC" or "SC" ) and executes the dialog causing GMIS unit 10-8 to execute the procedure. This causes GMIS unit 10-8 to generate a callcfg command including the user selected system identifier and command parameters. These parameters are passed to callcfg module 10-214 of FIG. 4b which stores them in call config file 10-216.

Figure 8S:
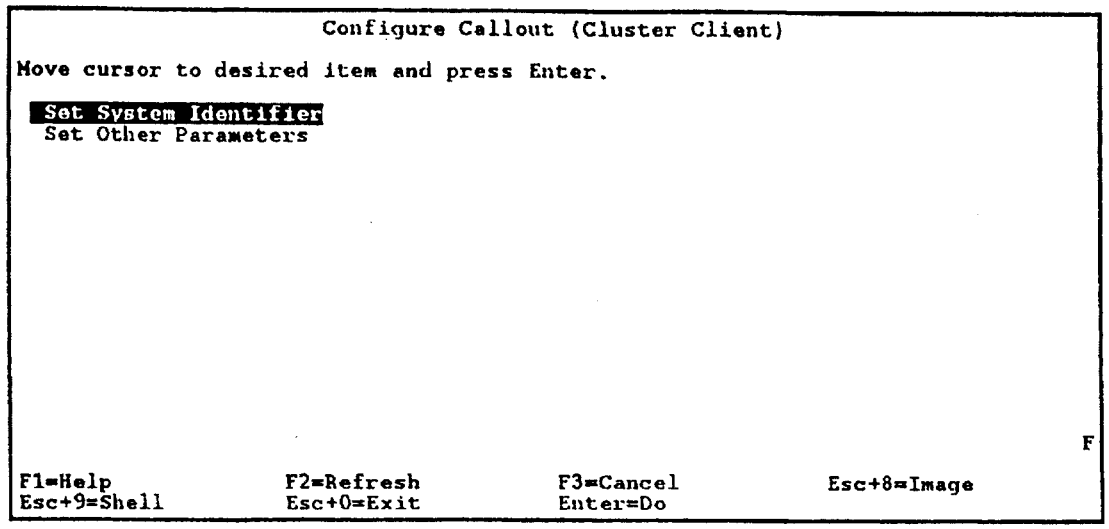
Figure 8T:
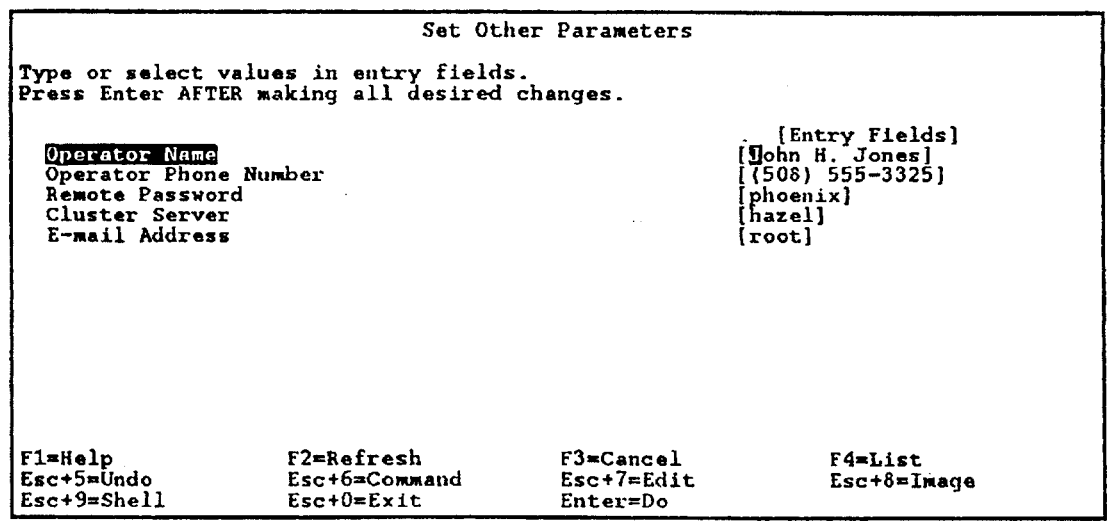

In the case of block 856, the user selects the "set other parameters" menu item on the configure callout (cluster client) menu screen of FIG. 8s. This submenu allows the user to configure the host client system to make network callout requests to the cluster server system rather than via a directly connected modem. This is done by specifying the host name of a cluster server system rather than response center phone numbers. In response to such selection, GMIS unit 10-8 displays the dialog menu screen of FIG. 8t. As shown, the user enters local system specific parameters such as operator name, operator phone number, remote password, cluster server and E-Mail address. After entering the appropriate parameters, the user executes the dialog causing GMIS unit 10-8 to execute the procedure for storing the user selected parameters in call config file 10-216 of FIG. 4b. Again, this is done via a callcfg command.

Following completion of the configure callout operation of block D, it is assumed by way of example, that the user next configures the callback function for establishing how callback component 10-400 of FIG. 4d is to process callback requests made by TAC 12. Specifically, this refers to how such processing is performed in terms of configuring the level or extent of TAC user access allowed by permissions subcomponent 10-422 and configuring how TAC login sessions are to be monitored by mirroring subcomponent 10-402.

Figure 7F:
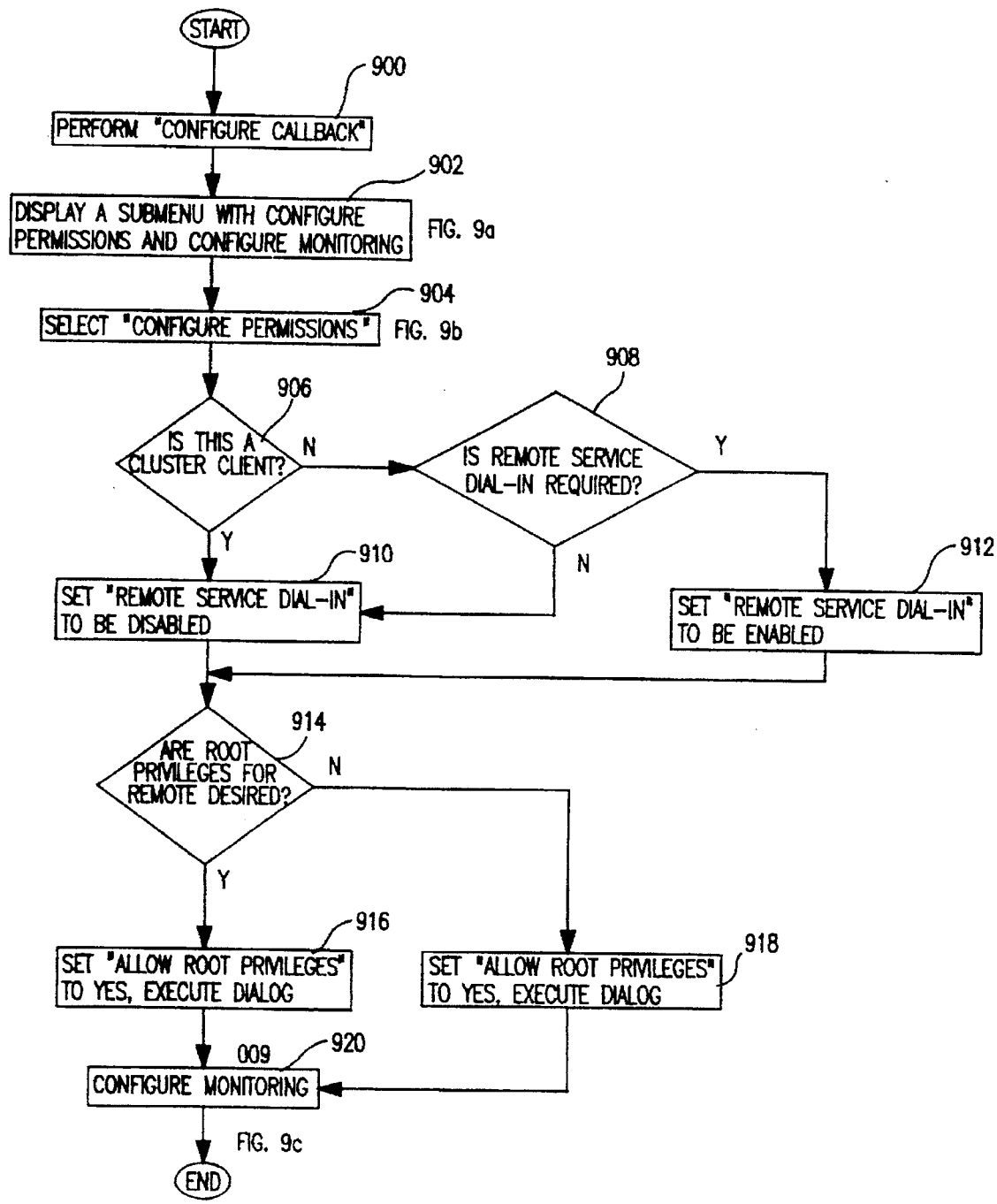
Figure 7G:
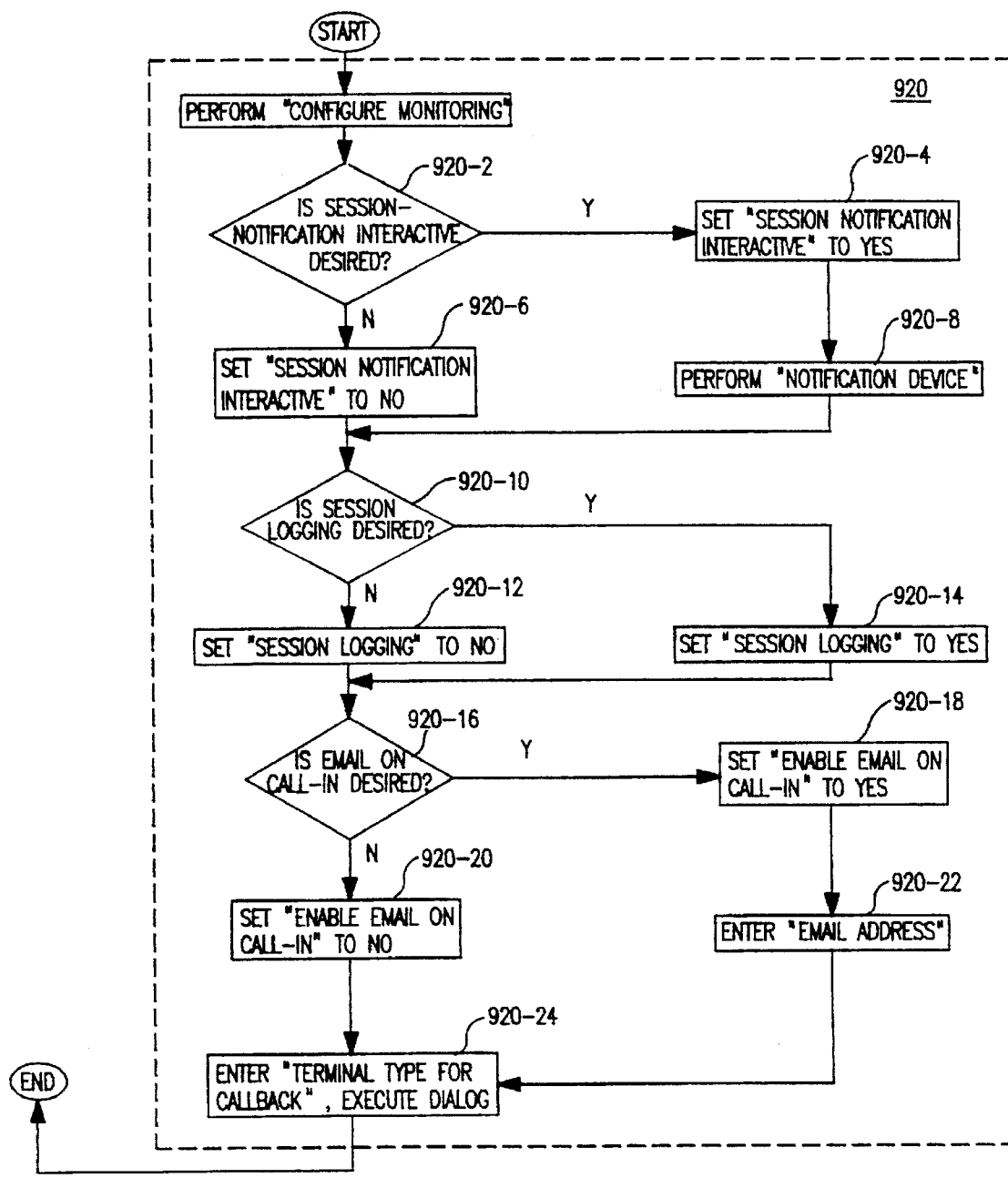
FIG. 7g illustrates in greater detail, the configure monitoring/mirroring operation of FIG. 7f.

The configuration operation is shown in detail in FIGS. 7f and 7g. Referring to FIG. 7f, it is seen in block 900 that the user selects the "configure callback" menu item on the callout/callback submenu screen which is accessed by the path indicated in FIG. 6. The user executes the dialog which causes GMIS unit 10-8 to display the submenu screen of FIG. 9a. As indicated by block 904, the user selects the "Configure Permission" menu item which causes GMIS unit 10-8 to display the dialog screen of FIG. 9b. In accordance with blocks 906 through 912, if the system is a standalone or cluster server system, the user can choose whether or not remote dial-in access is to be permitted by specifying enabled or disabled. If the system is configured as a cluster client system, such access will always be disabled since dial-in is done by the cluster server system. Next, the user can then set remote user privileges to allow or deny root access to local host system 10-2 in the manner indicated by blocks 914 through 918. This selection is done by entering either a YES or NO command.

After entering the appropriate configure permission parameters, the user executes the dialog. This causes GMIS unit 10-8 to generate a confperm command with a command line containing the user selected permission and command parameters. GMIS unit 10-8 provides these parameters in the proper format to the confperm module 10-428 of FIG. 4d which accesses remote configuration file 10-426 for storage of the user configured parameters.

As indicated in FIG. 7f, the user configures the monitoring functionality of subcomponent 10-402. As indicated in FIG. 7g, this operation is begun by the user selecting the "configure monitoring" menu item of the menu screen of FIG. 9a through the path indicated in FIG. 6 and executes. This causes GMIS unit 10-6 to the dialog menu screen of FIG. 9c.

In accordance with blocks 920-2 through 920-24, the user enters the appropriate values. The selection of the "session notification interactive" menu item enables session notification. This is used to alert the system operator in real time that the TAC has connected to the local host system 10-2. Using this type of monitoring allows a local administrator to immediately log the remote user off the host system by pressing the "K" key while running showses module 10-413 of FIG. 4d. The selection of the "Notification Device" menu item allows the user to specify the device on which session notification will appear when session notification is enabled. The selection of the session logging menu entry enables session logging to be written into a session database file for later viewing. The selection of the Enable E-Mail on call-in menu item enables electronic mail notification to the local system operator that the TAC has connected to the local host system. The "E-Mail address" menu item is used to specify where such notification is to be sent. The Terminal Type for Callback" menu item enables the user to specify the terminal type necessary for making the TAC callback to the host system. As previously indicated, this parameter requires the TAC to use the selected terminal type to ensure that such callback sessions can be viewed on terminal type available within host system 10-2.

After all the parameters have been configured, the user executes the dialog to cause GMIS unit 10-8 to execute the procedure for storing the user selected monitoring parameters. Specifically, this causes GMIS unit 10-8 to generate a confmon command containing a command line which includes the monitoring and command parameters. These parameters are provided to confmon module 10-104 which stores the parameters in mon config file 10-405. This completes the configure monitoring operation of block E of FIG. 7a.

Next, the user performs the configure diagnostic operation of block F. This operation sequence allows configuring the rsfd daemon 10-110 of FIG. 4a to periodically test the end-to-end connectivity between the host system and the TAC. This diagnostic configuration will check to make certain that a callout request is made by daemon 10-100 when the specified message exceeds threshold by periodically injecting system error log 10-102e with a diagnostic message.

Figure 7H:
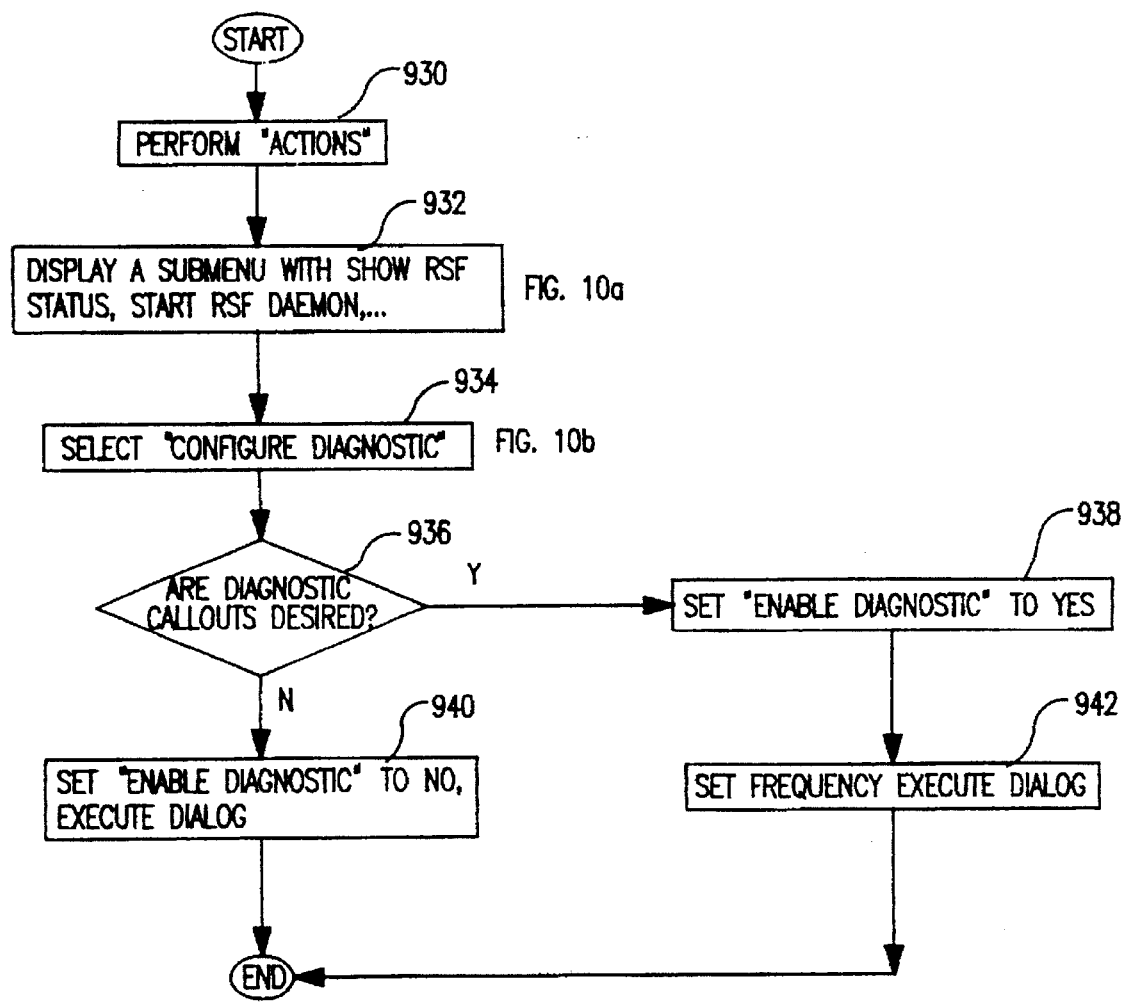
Figure 10D:
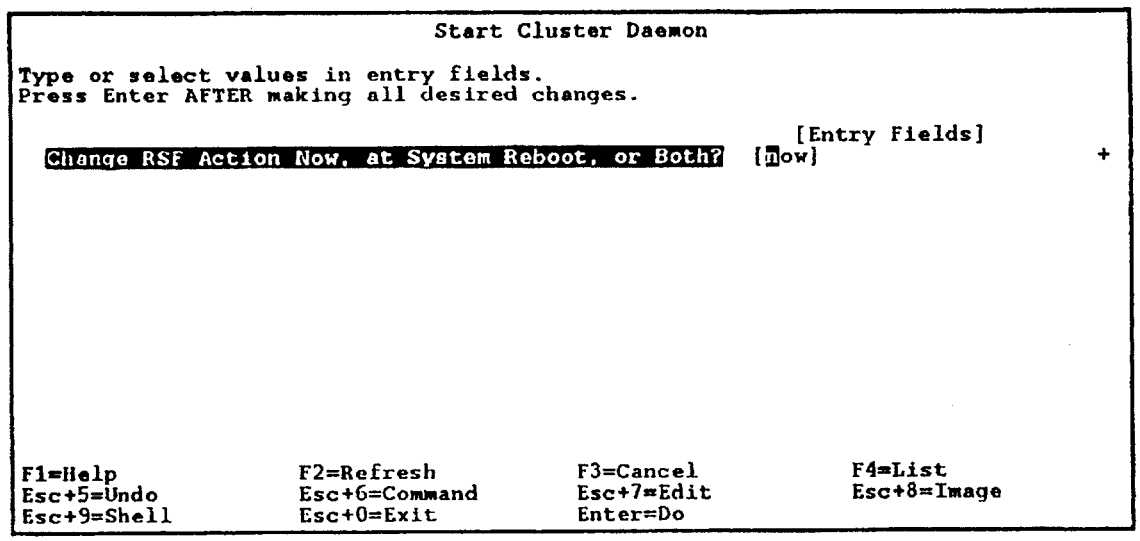

This operation is shown in greater detail in FIG. 7h. Referring to FIG. 7h, it is seen that the operation involves execution of blocks 930 through 942. As indicated by block 930, the user selects the "actions" menu item on the remote services facilities menu obtained by following the path specified in FIG. 6. This results in GMIS unit 10-8 displaying the submenu of FIG. 10a. The user next selects the "configure diagnostic" menu item and executes the dialog. In response to such selection, GMIS unit 10-8 displays the dialog menu screen of FIG. 10b. As indicated in FIG. 10b, the user enters the appropriate parameters according to blocks 936 through 942 and executes the dialog. This causes GMIS unit 10-8 to execute the procedure for storing the user selected parameters for accessing by daemon 10-110. That is, GMIS unit 10-8 generates a confdiag command which includes the user selected command parameters. These parameters in the proper form are passed by GMIS unit 10-8 to the confdiag program 10-106 of FIG. 4a. The program 10-106j utilizing the configuration routines of RSF library 10-104 enables storage of the specified parameters within diagnostic configuration file 10-102g.

Figure 7I:
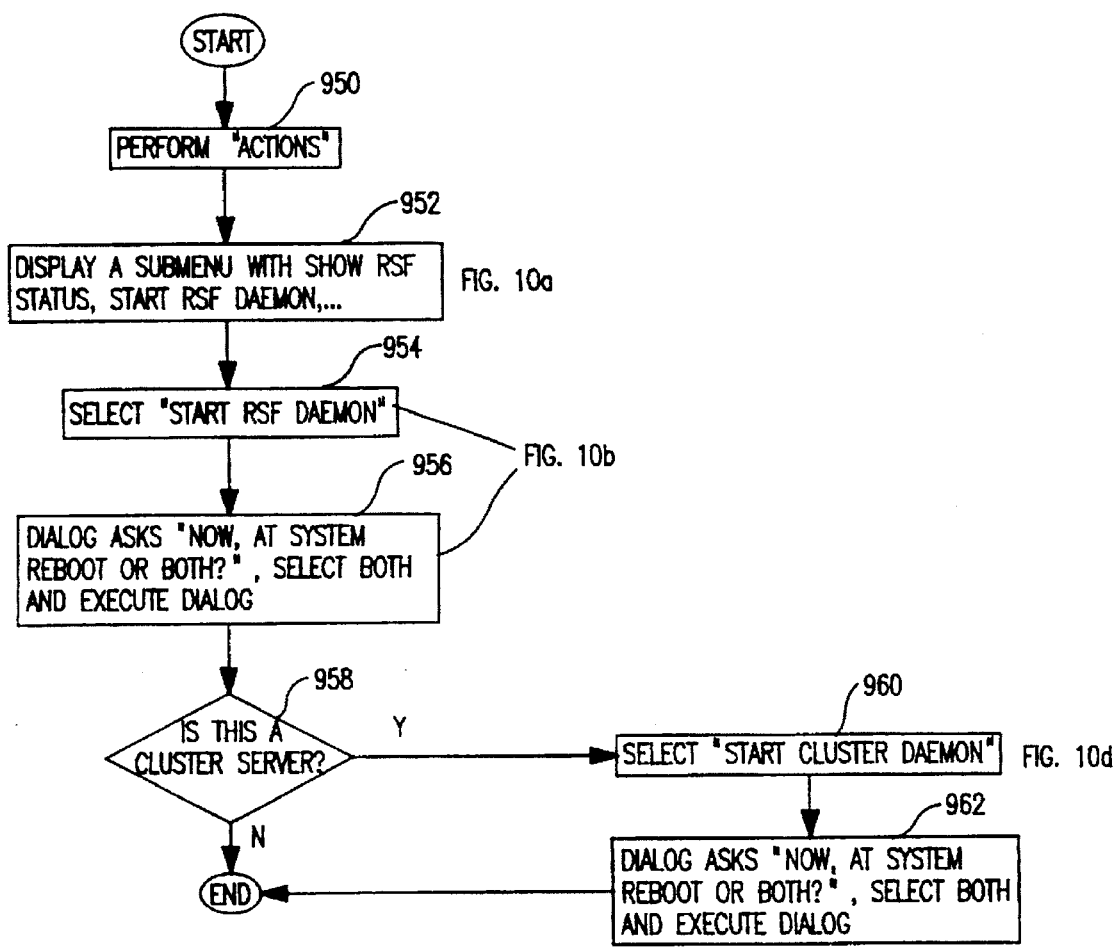

Upon completing the operations of FIG. 7h, next the user performs the configure daemons operation of block G of FIG. 7a. The operation involves the execution of blocks 950 through 962 as shown in FIG. 7i. Referring to FIG. 7i, it is seen that the user again selects the "actions" menu item on the remote services facilities menu. This results in GMIS unit 10-8 displaying the submenu of FIG. 10a. The user next selects the "start RSF daemon" menu item and executes the dialog. This causes GMIS unit 10-8 to display the dialog menu screen of FIG. 10c. As indicated by block 956, the user is asked to specify if the RSF daemon 10-110 is to be started now, at system reboot or both. The user enters the selection and executes the dialog. This causes GMIS unit 10-8 to execute the procedure for storing the user selected parameters. Specifically, it generates a chrsf command line containing the specified command parameters. These parameters in the proper form are passed to the chrsf program 10-106i. Program 10-106i utilizing the appropriate routines of library 10-104 starts the rsfd daemon and/or uses conventional system commands to configure boot time behavior.

Next, the user specifies when the cluster server daemon netactd of block 10-320 is to be started. As indicated in block 960, the user selects the "start cluster daemon" menu item of dialog menu screen of FIG. 10a and executes the dialog. This causes GMIS unit 10-8 to display the dialog menu screen of FIG. 10d. The user is asked to specify if the cluster daemon 10-320 is to be started now, at system reboot or both. The user enters the selected choice and executes the dialog. This causes GMIS unit 10-8 to generate another chrsf command line containing the specified command which are passed in the correct form to chrsf program 10-106i. The program utilizing the appropriate routines of library 10-104 starts the netactd daemon 10-320 and/or uses conventional system commands to configure boot time behavior. This completes the configure daemon's operation of block G of FIG. 7a. At this point, the user will have completed configuration of each of the RSF components of FIG. 3 preconditioning RSF unit 10-10 as desired.

DESCRIPTION OF OPERATION

FIGS. 11a through 13d illustrate how certain ones of the RSF components of FIG. 3 operate as configured to carry out the remote support function.

Figure 11B:
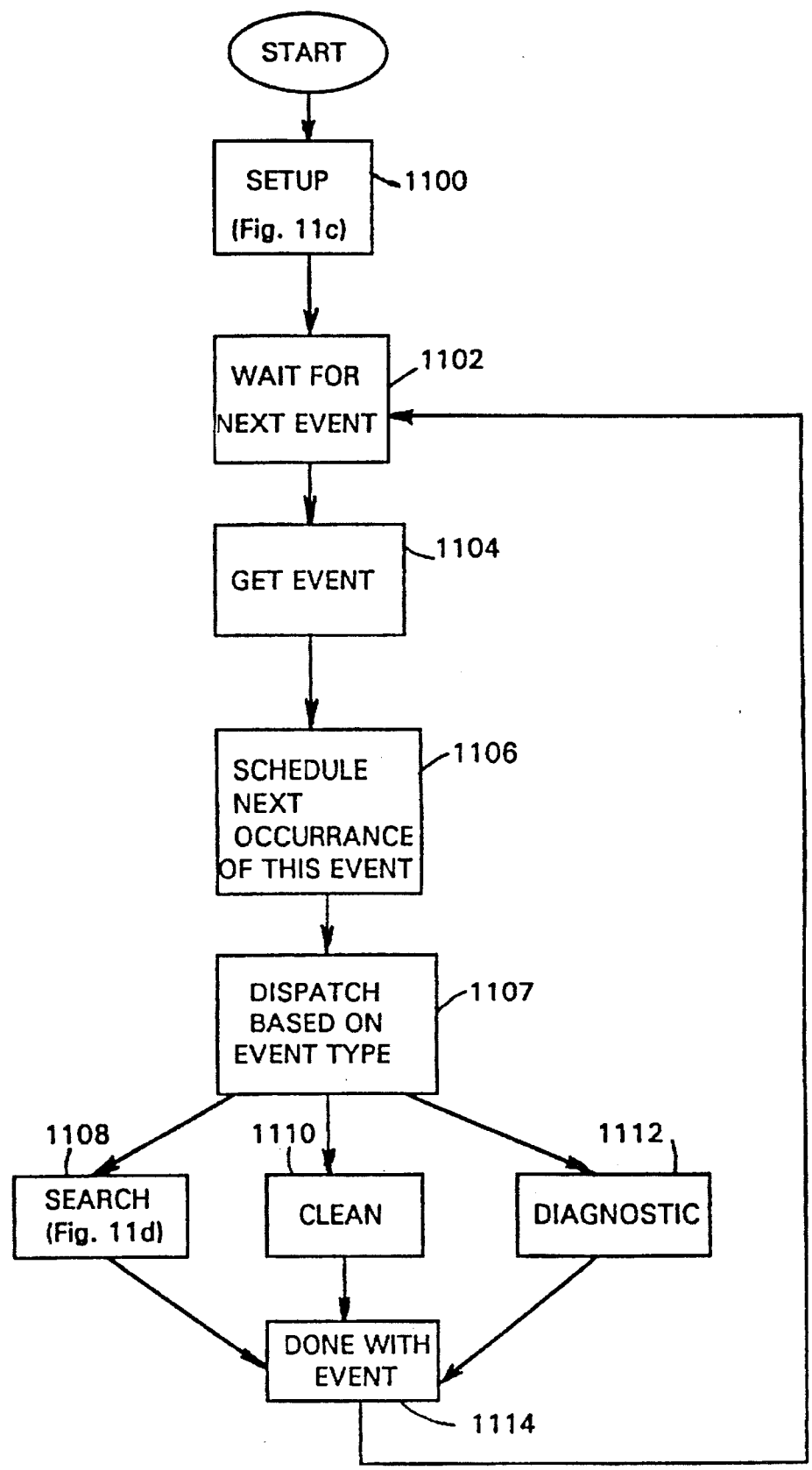
Figure 11C:
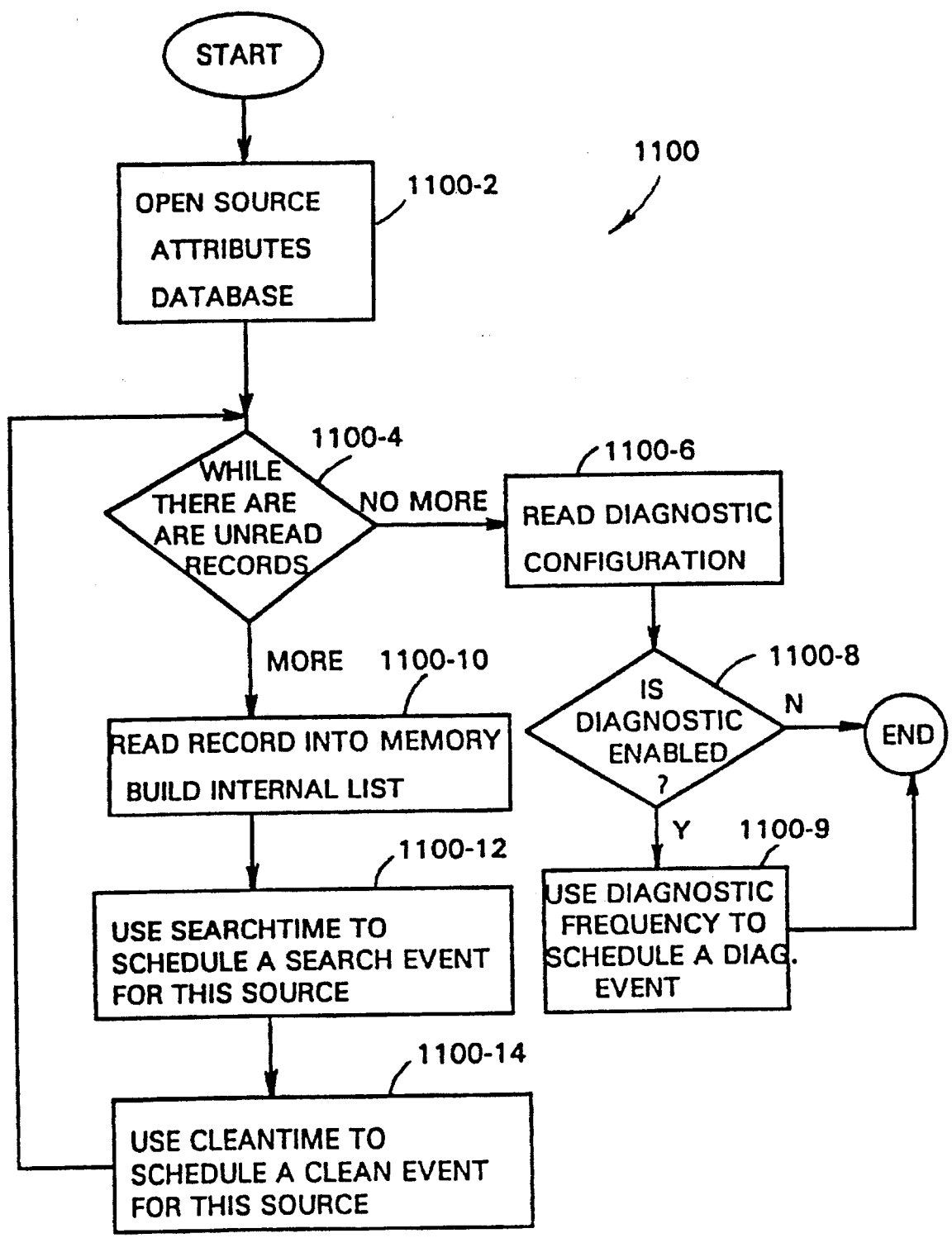

Referring first to FIGS. 11a through 11c, these figures are used to explain the operation of problem detection and reaction component 10-100 of FIG. 4a. This component operates under control of daemon 10-110. As discussed, rsfd daemon 10-110 detects problems by scanning the system error log 10-102e and ASCII file 10-102f in addition to any other configured source for specific messages and keeping count of how many messages of each kind it finds and determining whether or not a message is overthreshold. If a message is overthreshold, rsfd daemon 10-110 executes an action.

As previously described, for each configured source, there is a record stored in control file 10-102b containing assigned attributes, such as how often to scan the source for new messages, how often to clean its database and what action to execute if one of the messages in the source goes over threshold. Also, rsfd daemon 10-110 maintains the message template database for each source containing the search criteria for each message which it uses to scan for particular messages and to count the messages that are being searched for on the source. Also, rsfd daemon 10-110 also performs diagnostic callouts. As discussed, it can be configured to generate a callout action at specific predefined configured time intervals. These operations are diagramatically illustrated in the simplified diagram of the problem detection and reaction component 10-100 shown in FIG. 11a.

Referring to FIG. 11b, it is seen that first, rsfd daemon 10-110 performs the setup operation of block 1100. This operation is shown in greater detail in FIG. 11c. As indicated by blocks 1100-2 and 1100-4, daemon 10-110 opens the source attributes database 10-102b and begins reading each of the records from the database. Each database record read out is read into an area of main memory 10-3 as indicated in block 1100-10 for building an internal list of such records. The daemon 10-110 uses the search time parameter in each such record to schedule a search event for the specified source as indicated by block 1100-12. It uses the clean time parameter in each such record to schedule a clean event for the source as indicated by block 1100-14.

The daemon 10-110 performs the operations of blocks 1100-10 through 1100-14 for all of the sources having records in the source attributes database 10-102b. Upon completion of this operation, which is signalled by an end of file indication, daemon 10-110 next reads the diagnostic configuration parameters from diagnostic configuration file 10-102g as indicated by block 1100-6. As indicated by blocks 1100-8 and 1100-9, when the parameters indicate that the diagnostic feature has been enabled, daemon 10-110 uses the diagnostic frequency parameter to schedule a diagnostic event. This completes the setup operation of block 1100. At this time, the daemon 10-110 will have scheduled all of the different events in an event queue which will control its operation from that time.

Following setup, daemon 10-110 will enter a loop wherein it will wait for the occurrence of the next event as indicated by clock 1102. When the event occurs, daemon 10-110 gets the event from the event queue and schedules the next occurrence of that event as indicated by blocks 1104 and 1106. Next, daemon 10-110 performs a dispatch operation of block 1108 based on the type of event to one of the routines of blocks 1108, 1110 and 1112 (i.e., search type, clean type and diagnostic type). When it is done processing the event, daemon 10-110 returns to block 1102 to wait for the occurrence of the next scheduled event.

Figure 11D:
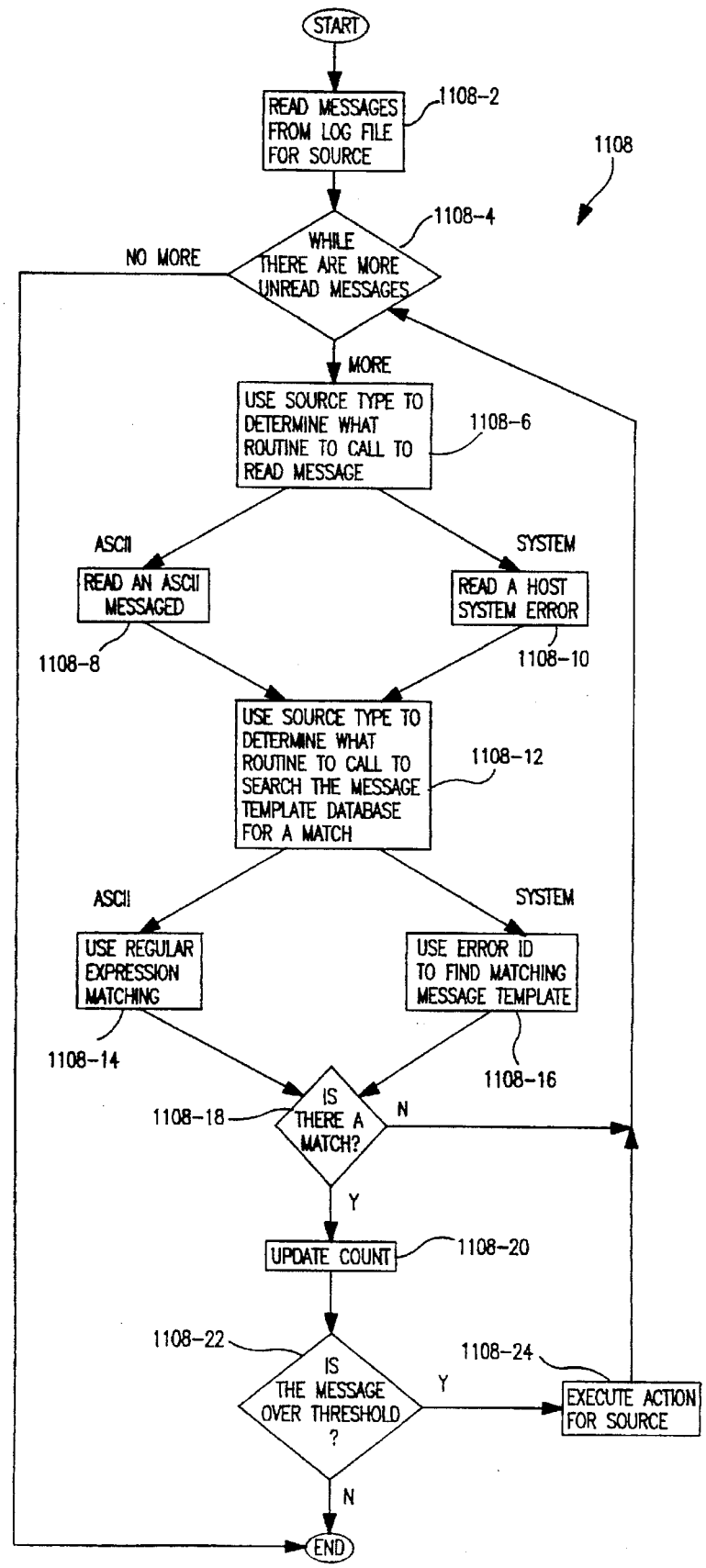

FIG. 11d shows in greater detail, the search operation of block 1108. As seen from FIG. 11d, in processing the search event, daemon 10-110 reads messages from the log file for that source as indicated by block 1108-2. It will continue to process any new messages that are in that log file as indicated by block 1108-4. In order to read each message from the log file, it performs a dispatch operation based upon the log type as indicated by block 1108-12 (i.e., constructs a dispatch call based on log type). The daemon 10-110 uses the source type parameter to determine which routine to call to read the message. In the present host system, there are two types of search routines, one for reading ASCII log file 10-102f and another for reading system log file 10-102e. As indicated by block 1108-12, once a message has been read, daemon 10-110 again uses the source type parameter to determine which routine to call to search for a match through the message templates for that source. In the case of ASCII log file 10-102f, daemon 10-110 calls the regular expression matching search routine which looks for regular expressions in records in the source's message template database which match the record just read from the ASCII log file as indicated by block 1108-14. In the case of system log file 10-102e, daemon 10-110 calls the error ID search routine which looks for error ID parameters in the source's message template database which match the error ID parameter contained in the record just read from the system log file as indicated by block 1108-16.

As indicated by block 1108-18, when a match is detected, daemon 10-110 updates the count parameter in the template database message for the message in which the match was found. Daemon 10-110 then checks for an overthreshold condition as indicated by block 1108-22. This is done by determining if the count in the template database message exceeded the configured count value previously obtained from source attribute control file 10-102b. When the count has been exceeded, daemon 10-110 executes the action configured for that particular source as indicated by block 1108-24. As previously discussed, in the preferred embodiment, there are two supplied actions, a mail notification action and a callout action. This results in daemon 10-110 invoking the mailact module 10-202, the callact module 10-218/10-312 of FIG. 3 or whatever action has been selected.

Following that, daemon 10-110 continues on with reading messages. When there are no more messages to be read from the source log file by an end of file, daemon 10-110 returns to block 1114 of FIG. 11b.

Figure 12A:
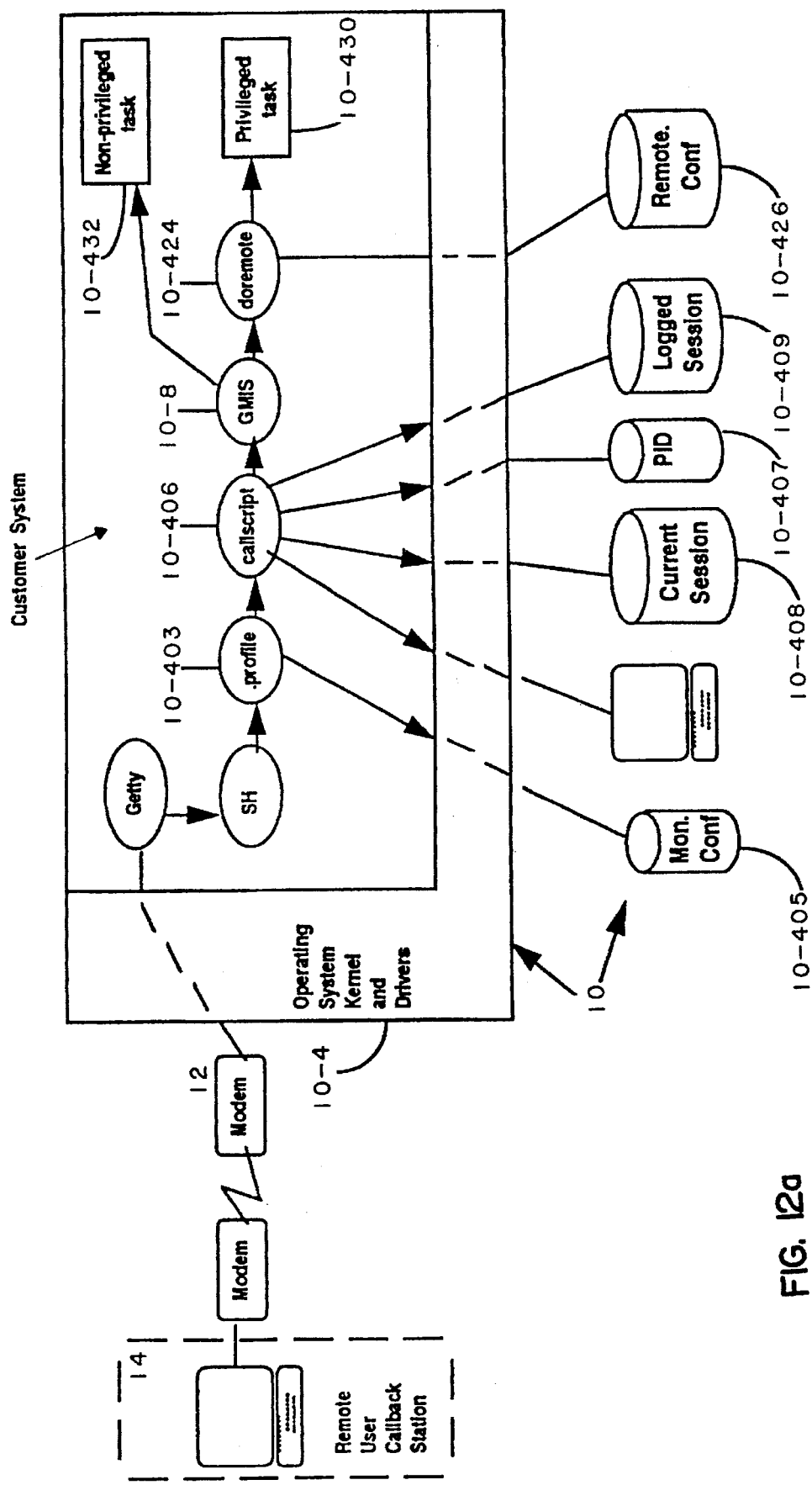
FIGS. 12a through 12d and 13a through 13d are flow diagrams used in describing different functions performed by the callback component of FIG. 4c.
Figure 12B:
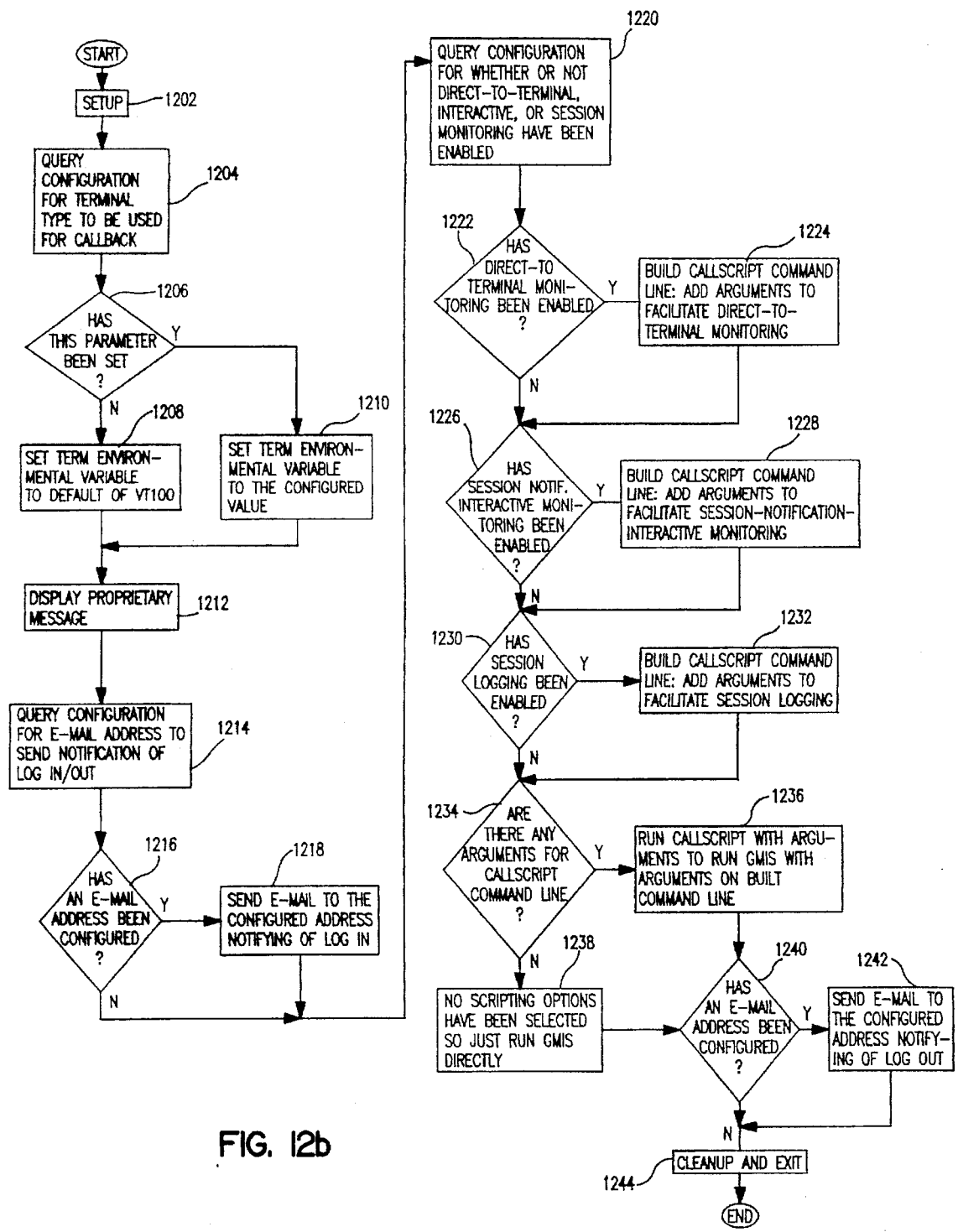
Figure 12C:
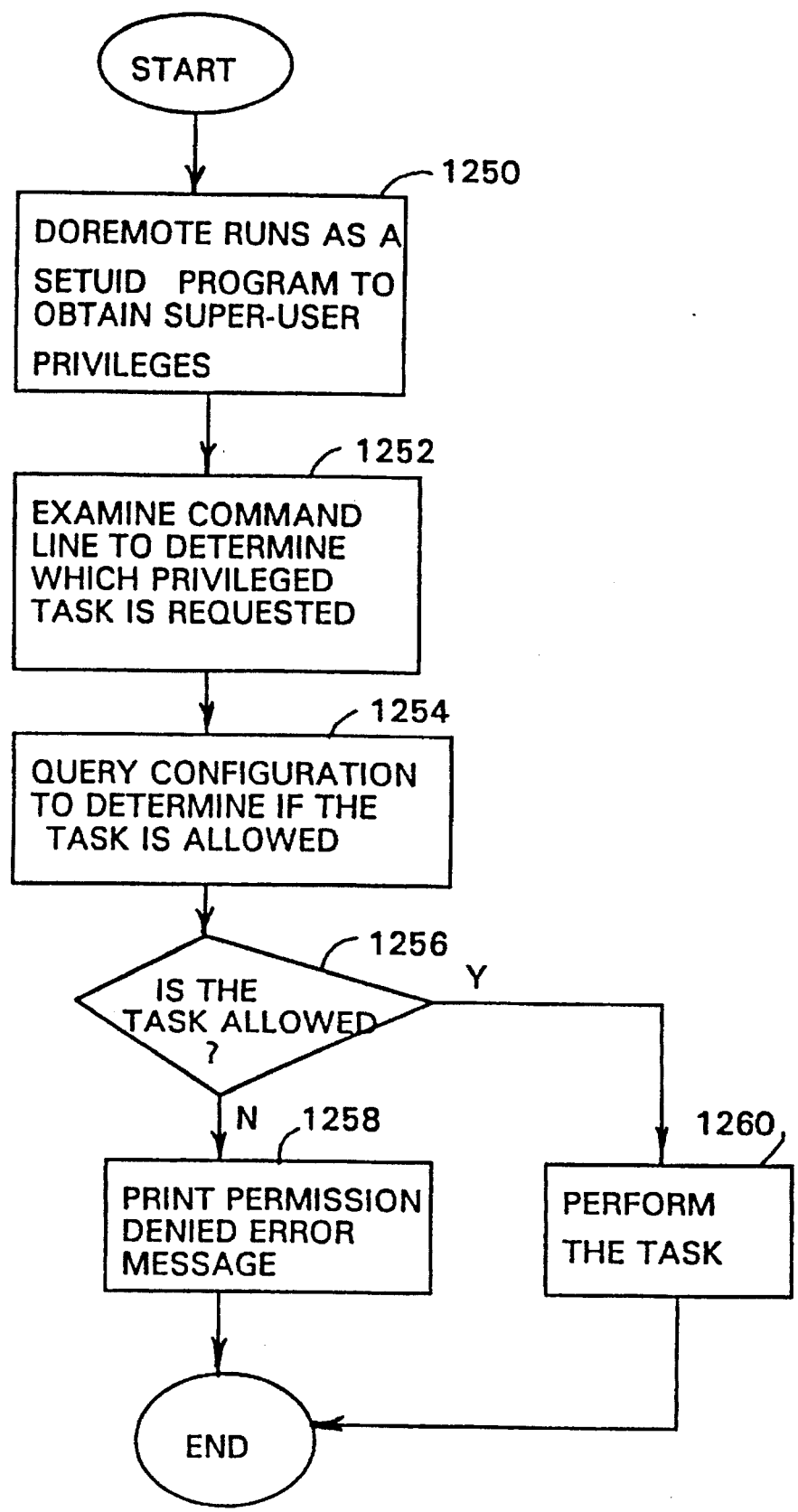

FIGS. 12a through 12c are used to illustrate the operation of callback component 10-400 relative to how the configured parameters as used to control its operation. FIG. 12a illustrates diagramatically, the operational flow through the different configured subcomponents of callback component 10-400 when a remote user at TAC 14 dials into the host system 10. As shown, the operating system kernel and drivers of block 10-4 are utilized to allow the remote user called "remote" to dial back into the host system "getty" daemon. The getty daemon will accept the connection to host system 10 and spawn a shell for the user to run the remote user's profile file. In the present invention, the .profile file is a special .profile file corresponding to .profile module 10-403 which is part of RSF unit 10-10. The .profile module 10-403 performs certain functions pertaining to callback component 10-400 such as starting callscript module 10-406.

FIG. 12b illustrates the sequence of operations performed by .profile module 10-403. As indicated in block 1202, module 10-403 performs a setup operation and starts callscript module 10-403. Also, .profile module 10-403 includes means for trapping remote user control signal sequences normally used to gain control of the host system. This operates as a security mechanism.

Next, module 10-403 queries the mon.conf file 10-405 via confmon module 10-404 to read out set configuration parameters to determine what terminal TYPE is to be used for callback as indicated in block 1204. If the TYPE parameter has been set, .profile module 10-403 will set the TERM environment variable in memory to the configured value. If there is no configured TYPE parameter, module 10-403 will use the default value. This completes blocks 1208 and 1210. It then displays any desired proprietary message (e.g. copyright notice) as indicated in block 1212 and then queries the mon.conf file 10-405 via confmon module 10-404 to read out the configuration parameters for the E-Mail address to send notification of remote log-in and log-out operations as indicated in block 1214. If an E-Mail address has been preconfigured, module 10-403 sends notification to the configured address, notifying that a remote user has logged onto host system as "remote" as indicated in blocks 1216 and 1218.

Next, as indicated by block 1220, module 10-403 queries the mon.conf file 10-405 via confmon module 10404 to read out the configuration parameters to determine whether or not any of the scripting options such as direct terminal, monitoring, interactive monitoring or session logging have been enabled. If direct to terminal monitoring has been enabled, module 10-403 builds a command line for callscript module 10-406 containing the argument parameters which will support direct to terminal monitoring as indicated by blocks 1222 and 1224. If session notification-interactive monitoring or session logging has been enabled, module 10-406 will build a command line for supporting the corresponding scripting option as indicated by blocks 1226 through 1232. Upon completing the building of the command line, module 10-403 next determines if there are any arguments on the command line for establishing if any one of the above scripting options has been enabled. If none of the options have been enabled, module 10-403 runs the GMIS unit 10-8 directly as represented in FIG. 12a as a dotted line (i.e., block 1238). However, if a scripting option has been enabled, module 10-403 will invoke the callscript module 10-406 and pass the argument parameters supporting the enabled option to it with a command specifying that callscript module 10-406 also run GMIS unit 10-8 as a subtask (see block 1236).

Figure 12D:
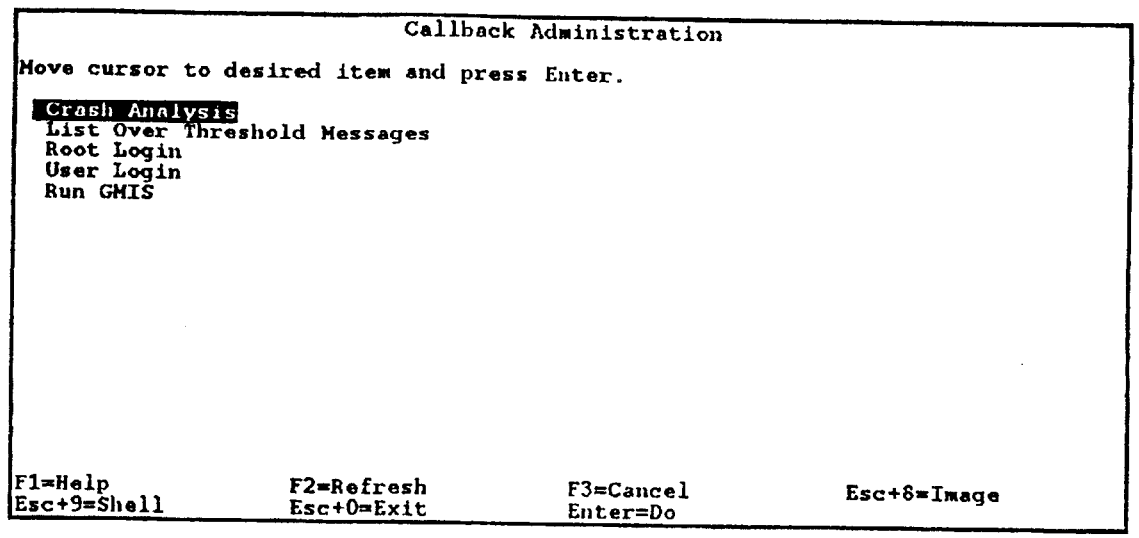

At this point, the GMIS unit 10-8 is running, the "remote" user has logged into the host system and is carrying out the required support operations. More specifically, when the "remote" user has logged into the host system, the callback administration menu of FIG. 12d is presented to the "remote" user. As shown in FIG. 12d, there are several selectable menu items. These include crash analysis, list overthreshold messages, root login, user login and run GMIS. Selecting the crash analysis menu item is a privileged task requiring use of module 10-430. It causes the "crash" command utility of the host system to be run against the host system's primary dump device. The crash command requires "root" access and, therefore, is allowed or not allowed as a function of how permission subcomponent 10-422 has been preconfigured using the confperm command.

The list overthreshold messages menu item when selected causes the generation of a list message command (lsmsg) with appropriate command line parameters. This causes lsmsg command program 10-106f of FIG. 4a to cause a display of a list of all the overthreshold messages and the text of each message tht caused the overthreshold condition.

The root login menu item is a privileged task requiring use of module 10-430. When selected, it spawns a "super user" shell from which the "remote" user can have access to all host system functions. Again, access to this menu item is granted as a function of how permission subcomponent 10-422 has been configured by the local system administrator via the confperm command. The "user login" menu item is a non-privileged task requiring use of module 10-432. When selected, an ordinary user shell is spawned from which the "remote" user can have access to user host system functions.

The run GMIS menu item is a non-privileged task requiring the use of module 10-432. The selection of this menu item causes the GMIS unit main menu to be displayed to the "remote" user and allows ordinary user access to all of the functions available from the GMIS unit 10-8.

When the remote user logs out, control is returned to .profile module 10-403 which performs the operations of blocks 1240 and 1242 before closing. It needs to send E-Mail notification of the logout. Therefore, it queries the mon.conf file 10-405 via confmon module 10-404 to determine if an E-Mail address has been configured (i.e., block 1240). If it has, module 10-403 sends an E-Mail notification message to the configured address notifying the occurrence of the logout (see block 1242). It then will perform the required cleanup operations and exit.

While the remote user is logged into host system 10, the remote user is running the GMIS unit 10-8. From this unit, the user has the option of running several different tasks, some of which are non-privileged and some of which are privileged. The system administrator on the host system is normally responsible for saying whether or not the remote user is allowed to run these privileged tasks. The running of such tasks is under the control of doremote module 10-424 which uses the configuration parameters stored in remote-.conf file 10-426. Anytime the remote user attempts to run one of these privileged tasks, this invokes doremote module 10-424. This module runs as a setuid program on the UNIX based system which means that it is capable of obtaining super user privileges as it reguires. Hence, it is able to bestow such privileges to run such privileged tasks. However, before carrying out such a task, it first examines the command line parameters to determine which privileged task is requested. It then queries the remote conf file 10-426 to determine if the task is allowed. If it is not allowed, module 10-424 will print a permission denied error. If it is allowed, module 10-424 performs the task. This sequence of operations is shown in blocks 1250 through 1260 of FIG. 12c.

Figure 13A:
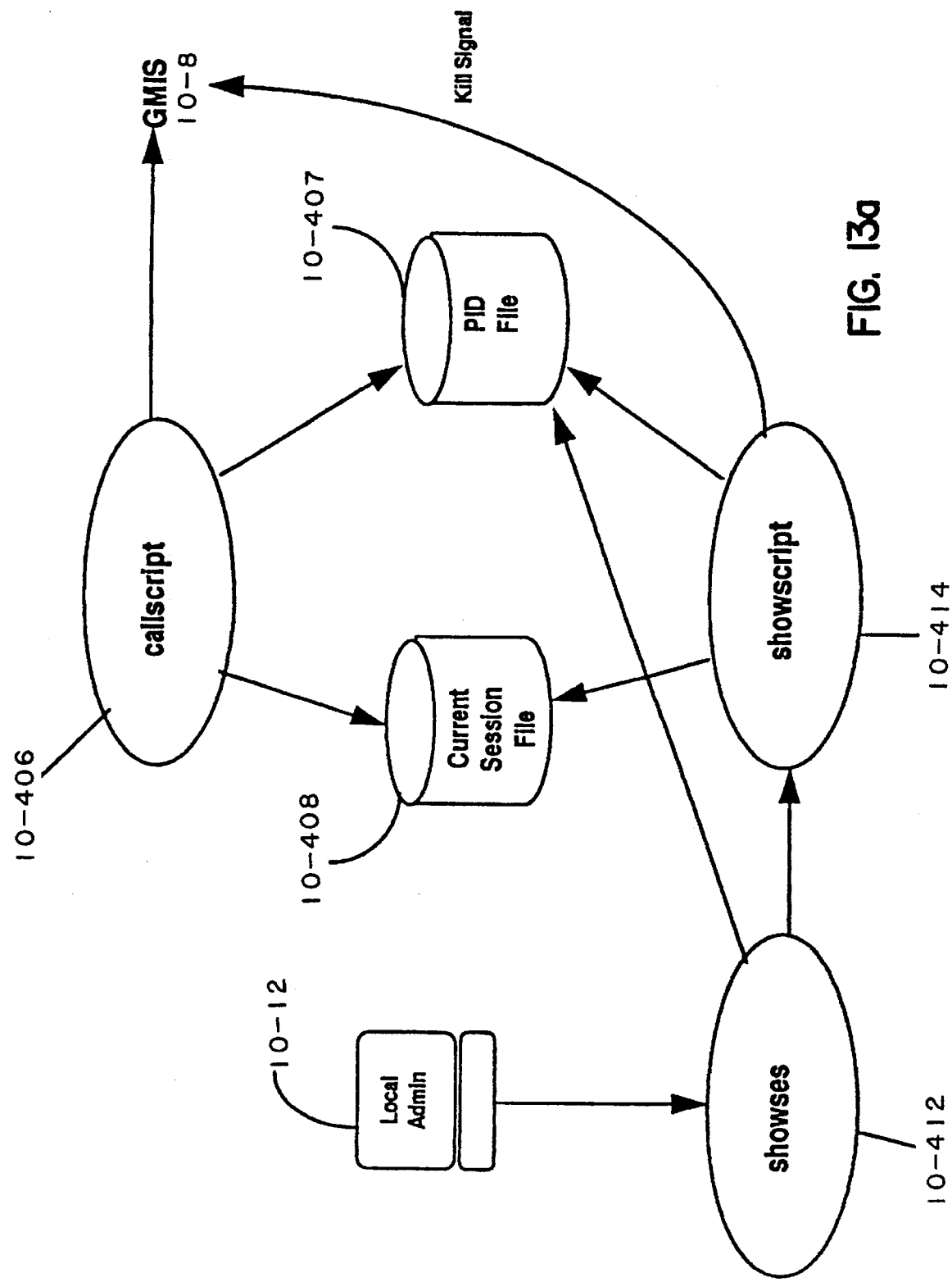
Figure 13B:
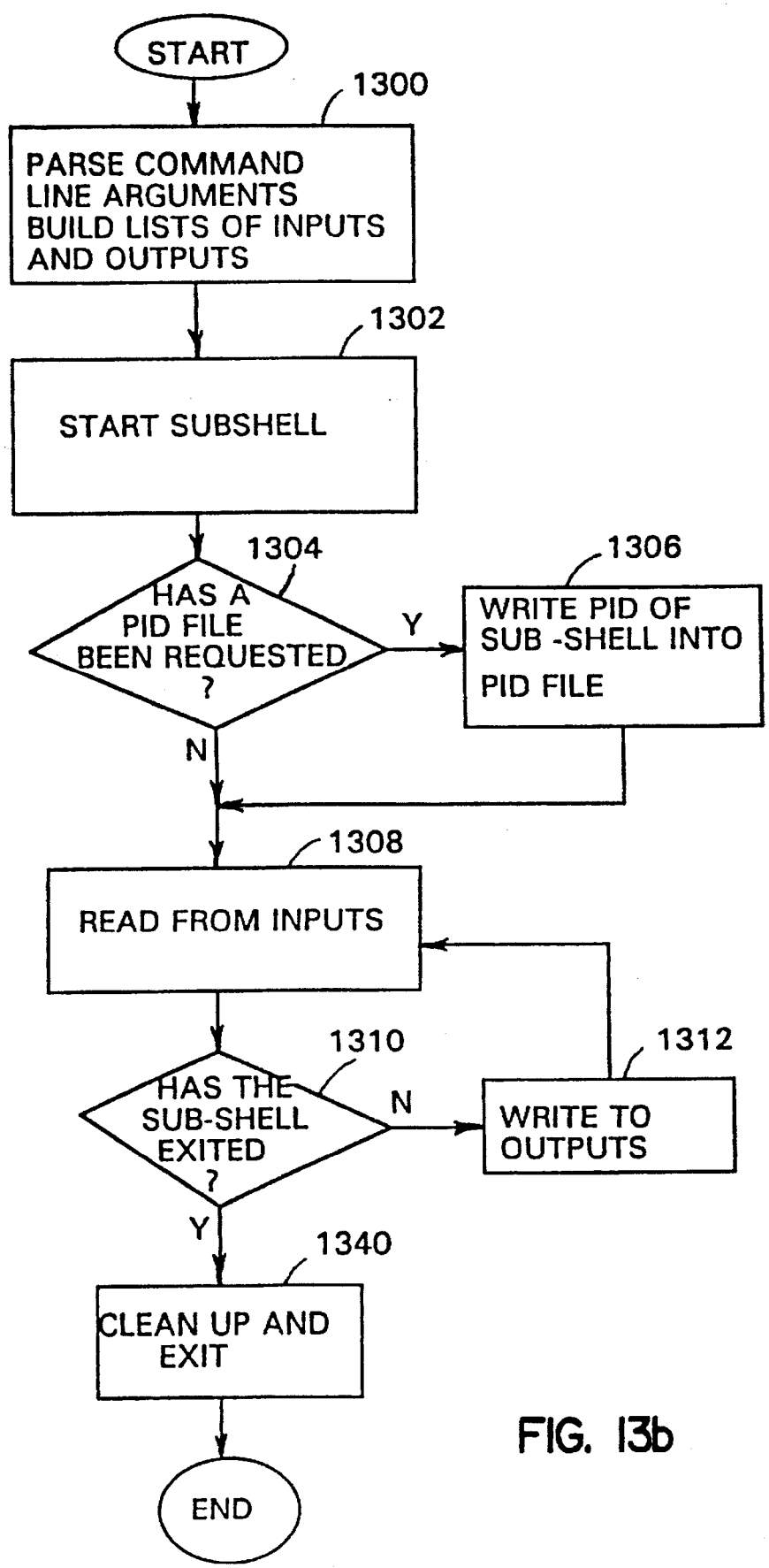
Figure 13C:
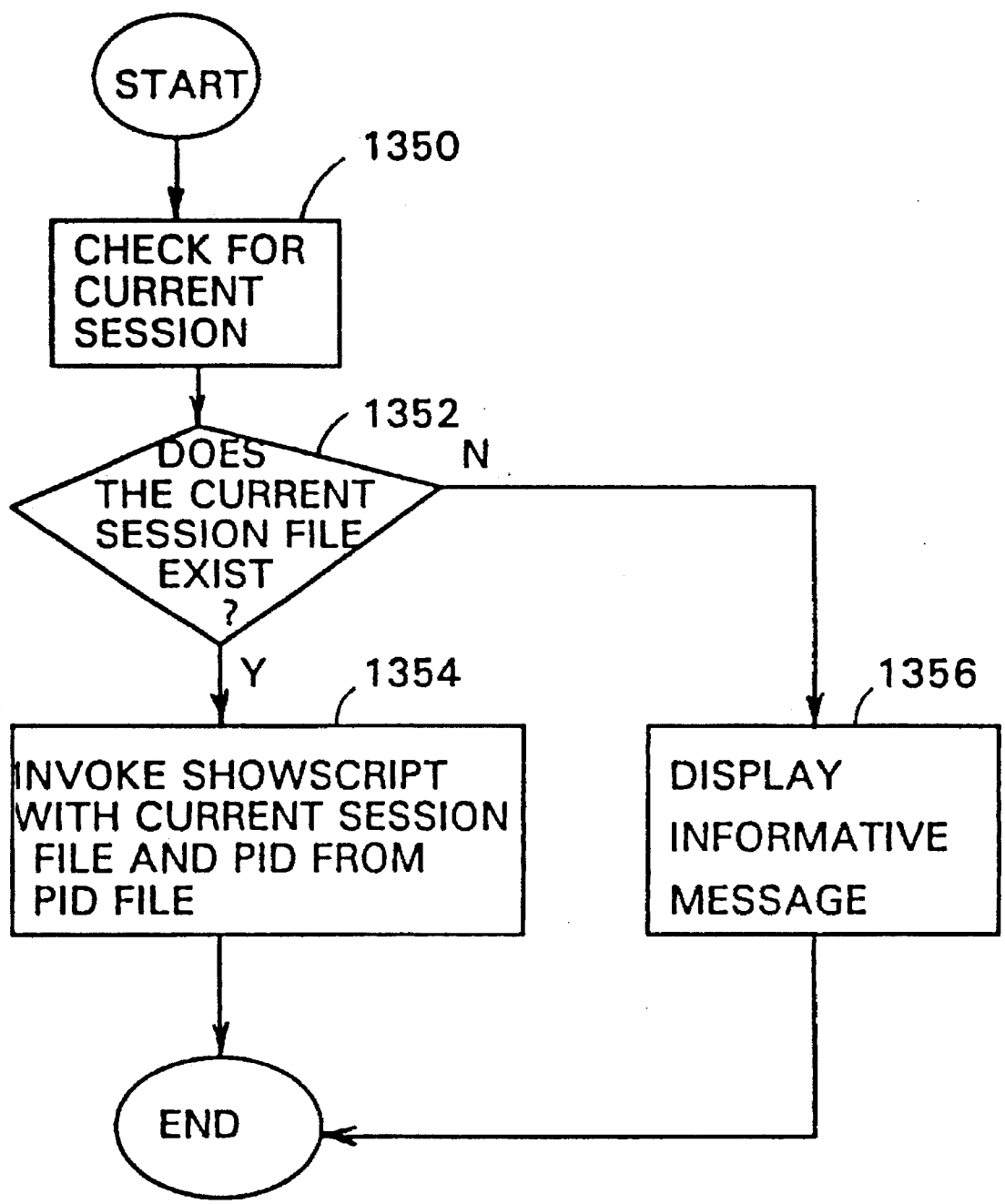

FIGS. 13a through 13d as used to describe the hot key capability of callback component 10-400 according to the present invention. FIG. 13a diagramatically illustrates the operational flow of a hot key operation which will be described in connection with the flow charts of FIGS. 13b through 13d. In order to understand the hot key capability, it is helpful to understand how callscript module 10-406 operates. As previously discussed, callscript module 10-406 performs all of the actual scripting of the session when a remote user logs into host system 10. As indicated in blocks 1300 through 1306, when callscript module 10-406 starts up, it parses its command line arguments and determines what all of its inputs and outputs are. It then starts a subshell. If the provided command line has been set up to request the creation of a PID file, then callscript module 10-405 writes the PID of the subshell into PID file 10-407. As indicated in blocks 1308 through 1340, it will then enter a main loop wherein it reads from its inputs and writes to its outputs. At the same time, it checks to see if the subshell has exited. When the subshell exits, callscript module 10-406 performs cleanup and exits.

While these operations are taking place, the local administrator upon receiving notification of the occurrence of the remote user login may want to monitor the current session initiated by the TAC. The administrator does this by running "showses" module 10-412 via terminal 10-12 as indicated in FIG. 13a. When invoked, showses module 10-412 executes the sequence of operations shown in blocks 1350 through 1356 of FIG. 13c.

As indicated, module 10-412 checks for the current session file in file 10-408. If the current session file does not exist, it displays a message saying there is no current session. If the current session file exists, module 10-412 invokes showscript module 10-414 and passes the proper arguments to it for monitoring that current session file. It also passes to module 10-414, the PID obtained from PID file 10-407.

Figure 13D:
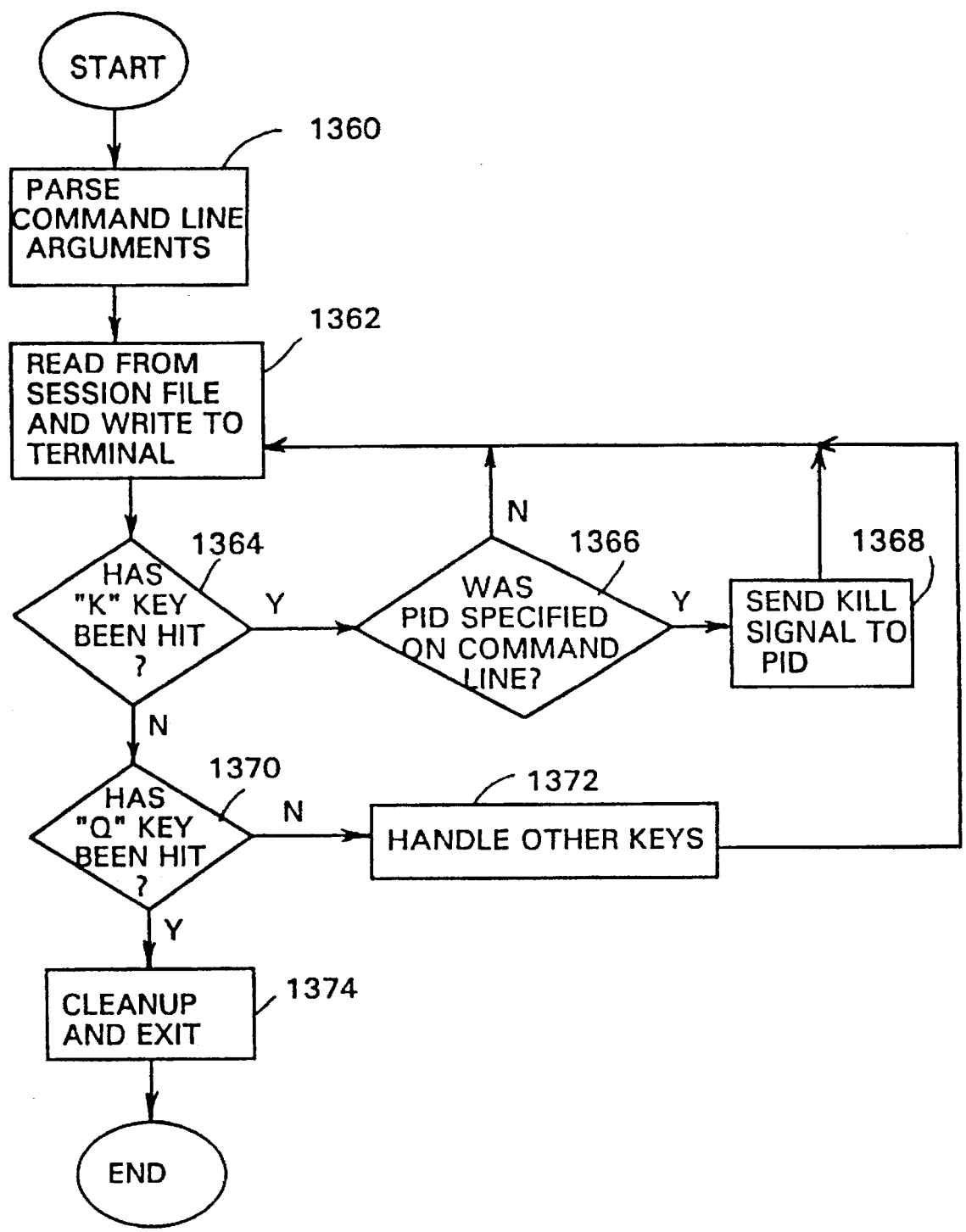

Showscript module 10-414 performs the sequence of operations indicated in blocks 1360 through 1374 of FIG. 13d. As shown, the module parses its command line arguments, reads from session file 10-408 and writes to the local system administrator terminal 10-12. While it is reading from session file 10-408 and writing to terminal 10-12, showscript module 10-414 also checks to see if anyone is typing on the keys of local administrator console 10-12.

Because the administrator can hit a "hot key" to terminate the session, module 10-406 checks to see if any key has been selected. If the "k" key has been selected, this signals showscript module 10-414 that it has to terminate the session. In so doing, module 10-406 first checks if the PID was specified on the command line which it would have been because that is how showses module 10-413 executes. That is, showses module 10-413 is programmed to read the PID from file 10-407 and pass it to showscript module 10-414. Upon seeing that the PID is specified, module 10-414 sends a "kill" signal to GMIS unit 10-8 as indicated in FIG. 13a. If the key selected is not the "k" key but the "Q" key, module 10-414 performs cleanup operations and exits. By having the modules of FIG. 13a operate in the described manner, this provides the local administrator with a hot key capability thereby providing the local user with greater control over callback sessions.

From the above, it is seen how the RSF components of the present invention can be configured and in turn how such configuration information controls the operations of such components. The organization of the RSF unit into such basic components facilitates configuration as well as expansion. According to the teachings of the present invention, each component can be configured with a small manageable set of commands. Also, new sources can be easily added or deleted and any action program can be easily specified to perform any desired type of support notification operation.

-65-
APPENDIX

**SECTION I     DESCRIPTION OF COMMANDS
              AND COMMAND PROGRAMS**

1. callact Module

Syntax:

callact source_identifier description_file
        message_identifier

Description

Callact is a utility which executes an action (i.e., it may be configured as an action that is taken by the RSF unit when an over-threshold condition occurs). The callact action sends a callout record to a response center location according to the parameters configured with the callcfg command.

If configured for a standalone host system which has a modem attached, callact will use the callout manager module (see mkcall) to send a callout record to a response center. In a clustered host environment (where there is one machine with a modem and several other LAN connected machines which share that modem over the network) callact may redirect callout requests to the callout manager on a specified central node which has a modem which is used, in turn, to call a response center.

The callout record that is sent to the response center is created by callact and includes the following items:

Current date and time
    Site callout configuration (phone numbers, system ID, etc.)
    The text of the over threshold message: "description_file"
    Information about the operating system (uname -svr)
    Information about hardware configuration (lscfg -v)

Callact may also be configured to send mail to a given E-Mail address whenever a callout is made.

-66-
This utility is not used from the command line or from GMIS. It is invoked by rsfd daemon process as an action.

Options source_identifier   Which monitored source is involved with this action.

description_file    File containing text of over-threshold message.

message_identifier  ID of the message that is over-threshold.

Related Information:

The following commands/programs: callcfg, callforce, netact, netactd, netcall, mkcall, lscall, rmcall, chcall, calld, callout, callbin.

2. callbin Command Program

Syntax:

callbin -p primary-code -s secondary-code -f file
    -S "site_information"

Description

Callbin uses a modem to communicate with a response center to deliver RSF messages. This is a lower level program, not meant to be run from the command line or from GMIS, but which is called from the "callout" script.

The primary and secondary error codes provide the following high level information about the message being sent.

| Primary Code | Secondary Code | Meaning |
|---|---|---|
| 0x0001 | 0x0000 | Undetermined Error |
| 0x0001 | 0x0001 | Hardware Error |
| 0x0001 | 0x0002 | Software Error |
| 0x0001 | 0x0003 | Operator Message |
| 0x0002 | 0x0000 | Forced Callout |

This command program uses parameters configured with the callcfg command to control telephone numbers dialed, the tty port of the modem used, modem control strings used, -67-
site identification information sent to the response center, and other configurable parameters such as delays, retries, and tracing controls.

This command program relies on its wrapper, "callout", to ensure that the modem is not in use by another application (such as ate, or cu).

The contents of the specified file are sent to the response center as the "free-form buffer" of the callout record. There is an imposed 65 Kilobyte maximum length for the data in this file. If the file is larger, the message will be truncated.

If "site_information" is not provided, the local site information (as configured with callcfg) will be sent in the callout record. The -S option is used to specify site identifier information for LAN connected RSF "cluster clients".

Options

| | | |
|---|---|---|
| -p primary-code | | Hexadecimal Primary Error Code (see above table) |
| -s secondary-code | | Hexadecimal Secondary Error Code (see above table) |
| -f file | | File specifying content of callout record |
| -S "site_information" | | Site identifier (from cluster clients) |

Related Information:

The following commands/programs: callcfg, callact, callforce, netact, netactd, netcall, mkcall, lscall, rmcall, chcall, calld, callout.

3. callcfg Command

Syntax:

```
callcfg [opphone='phone number']
        [opname='operator name']
        [mail='mail addr'] [sysphone='phone number']
        [passwd='password'] [suptype='RC or SC']
        [siteid='SC site'] [model='SC model']
        [serial='SC serial #'] [tac='SC tac char']
        [sysid='RC system ID']
        [calltype='modem or network']
        [server='cluster server'] [tty='tty path']
        [cbits='character bits'] [sbits='stop bits']
        [parity='line parity'] [baud='baud rate']
        [mnp='yes or no']
        [condout='callout conditioning string']
        [condin='callback conditioning string']
        [dial='dial string']
        [{add | del} phone 'phone number']
        [{add | del} ok 'ok string']
        [{add | del} connect 'connect string']
        [redo='redo string']
        [disconnect='disconnect string']
        [hangup='hangup string'] [busy='busy string']
        [tryphone='retries per each phone number']
        [trycondition='retries conditioning modem']
        [comdelay='modem inter-command delay']
        [busydelay='delay between busy retries']
        [remdelay='remote latency delay']
        [remtimeout='remote time out']
        [tracelevel='0-10'] [tracefile='pathname']
        [-s] [-m] [-t] [-a]
```

Description

The callcfg command is used to set and display all of the parameters relating to the autodial function including those used on cluster clients. The various options are explained below. There are GMIS menus for this command. Use the GMIS fastpath "brc_callout" for local modem configuration, or "brc_cluster_callout" for cluster client configuration.

Options opphone=   Sets the phone number of the local system
           administrator. This information is
           included in all callout records set to the
           response center.

opname=    Name of the local system administrator.

|  |  |
|---|---|
|  | This information is included in all callout records set to the response center. |
| mail= | E-Mail address to which notification of all callouts from this system will be posted. No E- Mail will be sent if this parameter is set to "" (the empty string). |
| passwd= | Sets the published password of the "remote" account as it is sent to the response center in a callout record. Setting this parameter DOES NOT actually set the login password on "remote". Setting the login password is a separate operation. This parameter is optional, but should be set to the real password of "remote" if call-back support is desired and should be changed to the current password whenever the password of "remote" is changed. |
| suptype= | This parameter sets the type of response center protocol that will be called when a callout occurs. Set this parameter to "RC" for RC response centers or "SC" for SC response centers. If set to RC, the "sysid" parameter must also be set. If set to SC, the following parameters must also be set: siteid, model, serial, tac. |
| sysid= | This parameter sets the system identifier for this system. This parameter is required only for use with RC response centers. |
| siteid= | This parameter sets the site identifier for this system. This parameter is required only for use with SC response centers. |
| model= | This parameter sets the model name of this system. This parameter is required only for use with SC response centers. |
| serial= | This parameter sets the serial number of this system. This parameter is required only for use with SC response centers. |
| tac= | This parameter sets the Technical Assistance Center (TAC) ID of the responsible TAC. This parameter is required only for use with SC response centers. |
| calltype= | If set to "modem" this configures the autodial facility to work with a local | modem (attached to this machine). If "modem" callout is configured then the following other callcfg parameters must also be set: tty, cbits, sbits, parity, baud, mnp, condout, condin, dial, redo, disconnect, hangup, busy, tryphone, trycondition, comdelay, busydelay, remdelay, remtimeout, tracelevel, and tracefile, BRC phone number(s), OK strings and connect strings. If set to "network" then this machine is assumed to be a cluster client which, lacking a modem of its own, must use a cluster server to perform the callout. If "network" callout is configured then the "server" callcfg parameter must also be set.

server=  This parameter sets the hostname of the cluster server machine. This parameter is required only when calltype=network.

tty=  This parameter sets the TTY device (e.g. /dev/tty1) that will be used for callout and call-back. The port for this device must have a modem attached and should be configured as a shared line if call-back support is desired.

sysphone=  This parameter sets the phone number that may be used to call back to this system. This is the phone number of the modem attached to the port associated with the device specified with "tty=".

cbits=  This parameter sets the number of bits (5-8) per character that are used when communicating with the response center.

sbits=  This parameter sets the number of stop-bits (1/2) that are used when communicating with the response center.

parity=  This parameter sets the parity setting (none, even, odd) that is used when communicating with the response center.

baud=  This parameter sets the baud rate (e.g. 1200, 2400, 4800, 9600) that is used when communicating with the response center.

mnp=  This parameter sets whether or not the modem being used is a modem network protocol (MNP) type of modem. These modems

-71-

|  |  |
|---|---|
|  | require an extra disconnect command when closing a connection. |
| condout= | This parameter sets the modem conditioning string that is used when conditioning the modem for callout. |
| condin= | This parameter sets the modem conditioning string that is used after a callout to make the modem ready to accept calls back. |
| dial= | This parameter sets the modem control string that will be used to dial out. |
| {add \| del} | phone 'phone number'  This syntax is used to add or delete phone numbers from the list of response center phone numbers. During a callout these numbers will be tried in sequence until a successful connection is made. |
| {add \| del} | ok 'ok string'  This syntax is used to add or delete strings from the list of possible "OK" strings that may be returned by the modem. |
| {add \| del} | connect 'connect string'  This syntax is used to add or delete strings from the list of possible "connection achieved" strings that may be returned by the modem. |
| redo= | This parameter sets the modem control string that will be used to retry the dial out command in the event of a failed connection. If the modem being used does not support a redo command then set this parameter to "" (the empty string). In this case the entire dial out command will be re-sent to the modem on a retry. |
| disconnect= | This parameter sets the modem control string that will be used to end a modem connection. |
| hangup= | This parameter sets the modem control string that will be used to hang up after ending a modem connection. |
| busy= | This parameter specifies what string to expect from the modem if the dialed number is busy. |
| tryphone= | This parameter sets how many times to retry |

-72-

```
              making a connection with each telephone
              number if the connection fails for any
              reason.

trycondition= This parameter sets how many times to retry
              conditioning the modem if modem
              conditioning should happen to fail.

comdelay=     This parameter sets the number of seconds
              to pause before sending commands to the
              modem.

busydelay=    This parameter sets the number of seconds
              to wait between retries making a connection
              if the connection failed because the phone
              was busy.

remdelay=     This parameter sets the number of seconds
              to wait before sending data to the response
              center.

remtimeout=   This parameter sets the number of seconds
              to wait for data from the response center
              before giving up.
```

Example

To set the local system administrator's name to "John Smith", add a phone number to the list of response center phone numbers, change the delay between retries on each phone number to 1 minute, and then display the complete configuration:

callcfg opname="John Smith" add phone 5553421 busydelay=60 -a

Files

/var/call/call.conf    A binary file which stores the configuration managed by this command.

Related Information:

The following commands/programs: callact, callforce, netact, netactd, netcall, mkcall, lscall, rmcall, chcall, calld, callout, callbin.

4. calld Daemon Program

Syntax:

-73- calld

Description

The RSF callout manager program controls the sequencing and timing of callouts to a response center. It manages a queue of callout requests. The queue is manipulated with the mkcall and rmcall commands. Requests and parameters are viewed with the lscall command. Configuration parameters are set with the chcall command.

This daemon controls the timing of callout requests according to the parameters configured with chcall. Callout requests are serviced on a first-come-first-serve basis. The calld daemon is started and stopped using the chcall command.

A log of all callout requests executed by the callout manager daemon is kept in /var/call/callout.log.

Files

/var/call/calls/call.ctrl  A binary file which stores the callout manager queue and configuration parameters.

/var/call/callout.log  Log file listing all callouts invoked by the callout management daemon and the results of each.

Related Information:

The following commands/programs: callcfg, callact, callforce, netact, netactd, netcall, mkcall, lscall, rmcall, chcall, callout, callbin.

5. callforce Command Program

Syntax:

callforce [-b] [-f file]

Description

Callforce sends a callout record to a response center according to the parameters configured with the callcfg command.

This command program is normally used for testing

-74-
purposes.

If a file is specified with the -f option then the contents of the file are sent as a part of the callout record, otherwise a text editor is invoked (using the EDITOR environment variable or "vi" as a default) and the message to be sent may be entered.

If configured for a standalone host system which has a modem attached, callforce will use the "callout" program to send a callout record to a response center. In a clustered environment (where there is one machine with a modem and several other LAN connected machines which share that modem over the network) callforce may redirect callout requests to the cluster server configured with callcfg.

The callout manager program is bypassed for forced callouts. This implies a higher priority for forced callouts.

The callout record that is sent to the response center is created by callforce and includes the following items:

Current date and time
    Site callout configuration (phone numbers, system ID, etc.)
    The message to be sent
    Information about the operating system (uname -svr)
    Information about hardware configuration (lscfg -v)

This utility is used from the command line. It is not available from GMIS.

Options

-b    Do the callout in the background.

-f file    Use the contents of the specified file as the message to send.

Example

To send the contents of a file to a response center callforce -f message.file

Related Information:

The following commands/programs: callcfg, callact, netact, netactd, netcall, mkcall, lscall, rmcall, chcall, calld, callout, callbin.

-75-

6. callout Command Program

Syntax:

callout -p primary-code -s secondary-code -f file
        -S "site_information" [-bdr]

Description

This program is a wrapper for the "callbin" program which uses a modem to send a message to a response center.  This wrapper script manages the modem's tty port.

If the tty port is in use by another application (such as ate or cu), callout will either wait until the line becomes free, or put itself in the background and wait for the line to become free, depending on the given arguments.

While callbin is using the line the tty will be disabled and then reset to its previously configured state when callbin is finished.

This program is not meant to be executed from the command line or from GMIS. It is called from the callout manager daemon (calld), the RSF daemon (rsfd), and the netcall and callforce scripts.

See callbin for information about the -p, -s, -f, and -S options.

Options

| | | |
|---|---|---|
| -p primary-code | | Hexadecimal Primary Error Code (see callbin) |
| -s secondary-code | | Hexadecimal Secondary Error Code (see callbin) |
| -f file | | File specifying content of callout record (see callbin) |
| -S "site_information" | | Site identifier (see callbin) |
| -b | | Run callout in the background whether or not the line is currently in use by another application |

-76-

|     |                                                                                                              |
|-----|--------------------------------------------------------------------------------------------------------------|
| -d  | Print a message and run callout in the background if the line is currently in use by another application    |
| -r  | Remove the file specified by -f when callbin is finished.                                                    |

Files

/etc/locks/LCK..*   Lock files used to synchronize access to serial lines

Related Information:

The following commands/programs: callcfg, callact, callforce, netact, netactd, netcall, mkcall, lscall, rmcall, chcall, calld, callbin.

7. callscript Command Program

Syntax:

```
callscript [-c command] [-f file] [-t tty]
           [-s session_file]
           [-l ctrl_file]
```

Description

This command program is used to support the RSF callback environment's remote session scripting/mirroring features.

The standard script command program allows only a user shell to be scripted. This command program allows a command to be specified on the command line. When the specified command exits the scripting session completes. If no command is given, callscript uses the current user's $SHELL, or /bin/sh.

The -f, -t, and -s options allow files/devices to be specified as destinations for scripted data. Each option represents a different form of scripting (see below). Any of these options may be specified multiple times with different destinations (e.g. callscript -f file1 -f file2).

This command program is not used directly by RSF users and is not available from GMIS.

Options

-77-

| | | |
|---|---|---|
| | -c command | Runs the specified command instead of user's shell. |
| 5 | -f file | Standard "script" command style output. Verbatim copy of all data sent to, received from the user's terminal including control codes and carriage returns. |
| 10<br><br>15 | -t tty | Mirrors the session on the terminal associated with the specified tty device. The tty may be a real tty (e.g. "/dev/tty1") or a pseudo-tty (e.g. "/dev/pts/4"). The specified tty will be put into "raw" mode for the duration of the mirroring and will be put back to its original state when the session is over. |
| 20 | -s session_file | Writes a file in a special format that includes timing information. This kind of file can be played back like a movie using the "showscript" command. The showscript command program can also be used to strip the timing information out. This results in a regular script file. |
| 25 | -l ctrl_file | If this option is given, the PID of the command program being scripted is written to the specified file. |

Example

To script a curses GMIS session to a session file named "session".

callscript -c smitty -s session

Related Information:

The following commands/programs: confperm, doremote, confmon, callscript, showscript, showses, lslses, showlses, rmlses

8. chcall Command

Syntax:

chcall [-d delay] [-m maxcalls] [-n] [-r]

```
[-s {now | reboot | both}]
[-x {now | reboot | both}]
```

Description

5   The RSF callout manager controls the sequencing and timing of callouts to a response center. It manages a queue of callout requests. The queue is manipulated with the mkcall and rmcall commands. Requests and parameters are viewed with the lscall command. The queue is serviced by the callout manager daemon (calld).

10  This command is used to configure parameters that are used by the callout manager daemon (calld) to control when callouts will be taken off of the callout manager queue and sent to a Bull Response Center.

15  The delay specified with the -d option controls the time interval between sending callouts when there are multiple callouts in the queue. This delay keeps the modem from being "hogged" when there are many callout requests that occur within a small period of time. The delay allows a remote service representative to log in
20  (if configured). If the delay is set to "Infinite" then the callout manager daemon will not start another callout until the "chcall -n" command is run. If the delay is set to "None" then callouts will always be started the moment they are enqueued. Other valid
25  delays are of the form {1-999}-{hours | mins | secs}.

The maxcalls parameter specified with the -m option sets an upper limit on the length of the callout manager queue. If the number of items in the queue reaches this number then no more callout requests may be enqueued
30  until items are taken off the queue by rmcall or calld.

The -n option will cause the next callout request on the queue to be started. This is normally used when the delay parameter is set to "Infinite" and manual intervention for callout request processing is desired.

35  The -r option will re-start callouts that have failed. When calld executes a callout request and the "callout" command fails, the callout remains in the callout manager queue with a status of "F". These callouts may be tried again (presumably after the problem that caused
40  the callout failure has been rectified) by running "chcall -r".

The -s and -x options are used to start and stop the callout manager daemon (calld) and to configure whether or not this daemon should be started automatically at -79-
boot time. The -s option starts calld and the -x option stops calld.

This command is available from within GMIS. The fastpath is "brc_callman".

5   Options

```
    -d delay    Set the delay between callouts
    -m maxcalls Set the max. length of the callout manager
                queue
    -n          Start the next callout
10  -r          Re-start failed callouts
    -s when     Start the callout manager daemon
    -x when     Stop the callout manager daemon
```

-80-

Example

To set the delay between callouts to 10 minutes:

chcall -d 10-mins

Files

/var/call/calls/call.ctrl A binary file which stores the callout manager queue and configuration parameters.

Related Information:

The following commands/programs: callcfg, callact, callforce, netact, netactd, netcall, mkcall, lscall, rmcall, calld, callout, callbin.

9. chmsg Command

Syntax:

```
chmsg -n source_identifier -I message_identifier
      [(-i newid | -e expression)] [-t threshold]
      [-d duration] [-k keepmax] [-r]
```

Description

The chmsg command is used to modify the attributes of a monitored message in the RSF unit. The identifier of the message and the identifier of the source to which it belongs are required options. The following attributes of the message can be changed with this command:

message id   This is the hexadecimal identifier used by the RSF unit to differentiate between messages.

expression   This is the regular expression used for pattern matching log messages. For example, consider the following fictional log messages:

BUS ERROR: CONTROLLER NUMBER 5
BUS ERROR: CONTROLLER NUMBER 6

Although these two messages are not syntactically identical, they are both reporting a problem with the bus. The RSF unit uses regular expressions to match these messages together.

-81-

The following regular expression could be used to categorize all bus errors regardless which controller failed:

"BUS ERROR:CONTROLLER NUMBER .*"

threshold       This is the integer number of a given message which the RSF unit must record before it will perform an action. When the threshold has been reached, the next message of that type will result in an action.

duration        This is the time period during which a given threshold must be exceeded to result in an action. For example, the RSF unit may be configured to perform an action if message x is detected n times during time duration t. The duration must be specified as follows:

(0-999)-(days | hours | mins)

keepmax         This will specify the maximum number of the given message that will be stored by the RSF unit. This will eliminate the possibility of runaway error messages creating a runaway RSF database.

Options

-n source_identifier      Specifies the identifier of the source.

-I message_identifier     Specifies the identifier of the message.

-I new_message_identifier Specifies the new id for the message.

-e expression             Specifies the new regular expression for the message.

-t threshold              Specifies the new threshold value for the message.

-d duration               Specifies the new duration value for the message.

-k keepmax                Specifies the new keepmax value for the message.

-r                        Resets the message count to zero.

-82-

Example

To change message FFFFFFFF for source "testsource" to have a threshold of 25 and a duration of 1 day:

chmsg -n testsource -I FFFFFFFF -t 25 -d 1-day

5  Related Information:

The following commands/programs: chrsf, chmsrc, rsfd, lsmsg, lsmsrc, mkmsg, mkmsrc, rmmsg, rmmsrc, netact, netactd.

10. chmsrc Command

10  Syntax:

```
chmsrc -n source_identifier [-i new_source_identifier]
       [-t type] [-p path] [-a action] [-c cleantime]
       [-s searchtime] [-f initialization_file] [-b]
       [-u] [-e] [-r]
```

15  Description

The chmsrc command is used to modify the attributes of a monitored source in the RSF unit. The identifier of the monitored source is a required option. The following attributes of the source can be changed with this
20  command:

| | | |
|---|---|---|
| | source identifier | This is the ASCII identifier specified by the user for the monitored source. |
| 25 | type | This is the type of the source. It can be either ASCII or SYSTEM. A SYSTEM source is the system log and an ASCII source can be any log file in ASCII format. |
| 30 | path | This is the path to the source, or log file, to be monitored. |
| | action | This is the path to the action which will be executed when the RSF unit detects that a message has gone over threshold. |
| 35 | cleantime | This is the time interval at which the RSF database is flushed. The following format is required for |

-83-
the time interval:

{0-999}-{days | hours | mins} searchtime      This is the time interval at which
                the source, or log file, is scanned
                for new messages. The following
                format is required for the time
                interval:

{0-999}-{days | hours | mins} initialization_file  This is a file which specifies a
                list of messages to be monitored by
                the RSF unit on the given source.
                An example of the required format
                is given below for both ASCII and
                SYSTEM sources. Lines beginning
                with # are comments:

For an ASCII source:

| #expression | threshold | duration | keepmax |
|---|---|---|---|
| system_error.* | 2 | 1-day | 50 |
| i/o_error_on_device.* | 5 | 4-days | 10 |

For a SYSTEM source:

| #id | threshold | duration | keepmax |
|---|---|---|---|
| 23e44f | 2 | 1-day | 50 |
| abcdef | 10 | 2-hours | 10 | action blocking   The action associated with a source
                  can be blocked from executing.

action log        The record of actions associated
                  with a source can be erased.

reset             The count of over threshold
                  messages can be reset.

Options

-n source_identifier      Specifies the identifier of the
                          source to be changed.

-i new_source_identifier  Specifies the new identifier
                          for the given source.

-t type           Specifies the new type of the source.

-p path           Specifies the new path to the source.

-84-

| | | |
|---|---|---|
| -a action | | Specifies the new action for the source. |
| -c cleantime | | Specifies the new cleantime. |
| -s searchtime | | Specifies the new searchtime |
| -f initialization_file | | Specifies the path to the initialization file. |
| -b | | Blocks the action associated with this source. |
| -u | | Unblocks the action associated with this source. |
| -e | | Erases record of actions for this source. |
| -r | | Resets counts of over threshold messages for this source. |

Example

To modify the source "testsource" to scan the log files every 5 minutes and erase the action log:

chmsrc -n testsource -c 5-mins -e

Related Information:

The following commands/programs: chrsf, chmsg, rsfd, lsmsg, lsmsrc, mkmsg, mkmsrc, rmmsg, rmmsrc, netact, netactd.

-85-
11. chrsf Command

Syntax:

```
chrsf {-s ( now | reboot | both ) | -x ( now | reboot |
      both ) } { -a ( now | reboot | both ) | -n ( now
      | reboot | both}}
```

Description

The chrsf command is used to start or stop the RSF daemon and the netactd daemon. The daemons can be started or stopped in three different ways:

now      perform startup/shutdown now.

reboot   perform startup/shutdown at reboot time.

both     perform startup/shutdown now and again at reboot time.

Options

-s       Starts the RSF daemon.

-x       Stops the RSF daemon.

-a       Starts the netactd daemon.

-n       Stops the netactd daemon.

Example

To start the RSF daemon at reboot time:

chrsf -s reboot

To stop the netactd daemon now:

chrsf -n now

To start the RSF daemon and the netactd daemon now:

chrsf -s now -a now

-86-

Related Information:

The following commands/programs: chmsg, chmsrc, rsfd, lsmsg, lsmsrc, mkmsg, mkmsrc, rmmsg, rmmsrc, netact, netactd.

12. confdiag Command

Syntax:

confdiag [-s | -x ] [-t frequency] [-q]

Description

The RSF unit may be configured to test itself periodically. If enabled, a diagnostic routine will force a message to be written to the system log file. The RSF unit is set to monitor the system log file for this message and will perform a callout as soon as it is detected by the RSF daemon. This feature allows the system administrator to confirm that the RSF unit is actually detecting messages. If callout(s) are not made periodically when this feature is enabled, this is the first diagnosis that the RSF unit is sick.

Options

-s   Enables the diagnostic message injection.

-x   Disables the diagnostic message injection.

-t frequency Specifies the frequency of the diagnostic message injection to be performed by the RSF daemon. Valid settings are DAILY, WEEKLY, BIWEEKLY, MONTHLY, and BIMONTHLY.

-q   Displays the current status of the diagnostic feature.

Defaults

If no options are provided, the default option is -q.

-87-

Examples

1. To enable the diagnostic feature with a weekly frequency:

confdiag -s -t WEEKLY

2. To disable the diagnostic feature:

confdiag -x

Related Information:

The following commands/programs: chrsf, chmsg, chmsrc, rsfd, lsmsg,lsmsrc, mkmsg, rmmsg, rmmsrc, netact, netactd.

13. confmon Command

Syntax:

confmon [-d] [-x] [-t device] [-s] [-n] [-m device] [-e]
        [-f] [-a address] [-l] [-g] [-c TermType]
        [-DSALTO]

Description

This command is used to configure the session scripting features of the RSF call-back environment. With session scripting enabled all characters sent and received to/from the remote user's terminal is captured and echoed to one or more destinations depending on the configuration. This can be used by the local system administrator to watch everything that is being done by the remote user to preserve system security. There are three forms of session scripting that are supported:

Direct-to-Terminal Scripting

With this form of scripting the moment a remote user logs in on the system a specified terminal is immediately taken over and a mirror of the remote user's terminal is displayed.

Session-Notification-Interactive Scripting

With this form of scripting, when a remote user logs in on the host system, a warning message is sent to the specified terminal. Once warned the local system administrator may run a command to view a mirror of the remote session. In this mode -88-
if the 'K' key is hit the remote user will be immediately logged off the host system.

Session Logging

With this form of scripting a file is created which contains a script of the remote user's session. There will be one such file for each time the remote user logs in. These files are stored in /var/call/sessions and are named based on the date/time of the login. These files may be listed, played back, and removed with the lslses, showlses, and rmlses commands.

All three of these scripting options may be turned on and off independently.

The -d option turns on direct-to-terminal scripting, the -x option turns it off. The -t option configures the tty device to which the remote session should be copied.

The -s option turns on session-notification-interactive scripting, the -n option turns it off. The -m option configures the tty device to which the warning about remote user login should be sent.

The -e option turns on E-mail notification. With this enabled, an E-mail message is sent to the address specified with -a whenever the remote user logs in and out. The -f option turns off E-mail notification.

The -l option turns on session logging, -g turns it off.

The -c option is used to specify the terminal type ($TERM) that must be used for call-back. This parameter is important because scripted sessions may be viewed only on a terminal that is equivalent to the terminal being used by the remote user. Using this parameter, the local system administrator configures the type of terminal on which the administrator plans to view scripted sessions. The remote user is then forced to use a terminal or terminal emulator that is equivalent to the configured terminal type.

Note: if Direct-to-Terminal scripting is enabled the -c option should be set to the terminal type of the terminal attached to the specified tty port.

This command is available from GMIS. The fastpath is "conf_mon".

Options

-89-

| | | |
|---|---|---|
| -d | | Turn on direct-to-terminal scripting |
| -x | | Turn off direct-to-terminal scripting |
| -t device | | Specify the tty device to use for direct-to-terminal scripting |
| -s | | Enable session-notification-interactive scripting |
| -n | | Disable session-notification-interactive scripting |
| -m device | | Specify the tty device to use for session-notification-interactive scripting |
| -e | | Turn on E-mail notification |
| -f | | Turn off E-mail notification |
| -a address | | Specify the E-mail address to use for E-mail notification |
| -l | | Turn on session logging |
| -g | | Turn off session logging |
| -c TermType | | Specify the terminal type that must be used for callback |
| -D | | Display direct-to-terminal device, if enabled |
| -S | | Display session-notification-interactive device, if enabled |
| -A | | Display E-mail address, if E-mail notification is enabled |
| -L | | Display "Y" if session logging is enabled, "N" otherwise |
| -T | | Display the terminal type configured with the -c option |
| -O | | Command to discover (used by GMIS) |

Example

To disable direct-to-terminal scripting, enable session-notification-interactive scripting on the console, enable E-mail to user "phoenix" on system "hazel" when remote users login/logout, and set the call-back -90-
terminal type to vt100:

confmon -x -s -m /dev/console -e -a phoenix@hazel -l -c vt100

Files

/var/call/mon.conf    A binary file which stores the session scripting configuration parameters.

/var/call/sessions    Directory where date-stamped logged session files are kept.

Related Information:

The following commands/programs: confperm, doremote, confmon, callscript, showscript, showses, lslses, showlses, rmlses.

14. confperm Command

Syntax:

confperm [-r] [-n]

Description

This command allows the local system administrator of a system to control whether or not remote users will be granted root access. This applies to the "Crash Analysis" and "Root Login" items on the "Callback Administration" menu that is presented to remote users when they log in.

If the -r option is used then future requests for root access will be granted. If the -n option is used then future requests for root access will be denied.

This command is available from within GMIS. The fastpath is "conf_perm".

Options

-r    Allow future root access requests

-n    Deny future root access requests

Example

To allow root access run the following command as root:

-91- confperm -r

Files

| | |
|---|---|
| /var/call/remote.conf | A binary file which stores permissions configuration parameters. |

Related Information:

The following commands/programs: confperm, doremote, confmon, callscript, showscript, showses, lslses, showlses, rmlses.

15. doremote Command

Syntax:

doremote -r

Description

If root access is allowed then a root sub-shell will be spawned. Otherwise an error message is printed and root access is not granted.

The only valid option is -r and it must be supplied.

This command is not meant to be run from the command line. It is run from the GMIS "Callback Administration" menu that is presented to remote users when they log in using the RSF call-back environment.

-92-

Options

-r   Request root access

Example

To request root access:

5   doremote -r

Files

/var/call/remote.conf    A binary file which stores permissions configuration parameters.

10  Related Information:

The following commands/programs: confperm, doremote, confmon, callscript, showscript, showses, lslses, showlses, rmlses.

16. lscall Command Program

15  Syntax:

lscall [-n #] [-a] [-N] lscall { -c | -o }

Description

The RSF callout manager controls the sequencing and timing of callouts to a response center. It manages a
20  queue of callout requests. This queue may be manipulated using the mkcall and rmcall commands. The queue is serviced by a daemon process (calld). Parameters relating to this queue may be set with the chcall command.

25  Running lscall with no arguments will show the list of queued callouts along with a header that describes each of the columns. See the following example.

```
      Date       Time      Origin       Condition
      --------   --------  ----------   ---------------------
30 1 S  12/14/92  15:09:52  jonathan     RSF DIAGNOSTIC MESSAGE
```

-93-

The first two items "1" and "S" are the callout request ID and the callout status. The callout request ID is a number that may be used to reference a particular callout when using rmcall or -n option of lscall. The callout status may have the following values:

W   Waiting for the calld daemon to service this request. Requests are serviced on a first-come-first-serve basis.

S   Started. The callout is in progress.

F   Failed. An earlier callout attempt has failed. Failed callouts remain in the queue and may be restarted with the "chcall -r" command.

The date and time fields represent when a callout request was queued with the mkcall command. The origin field shows the name of the system that generated the callout request. The condition field shows a short description of the reason for the callout request.

If the "-n #" option is used then information will be shown for the callout with the given request ID only. If the -N option is used the the header will not be displayed. If the -a option is used then the contents of the callout record will be displayed. Use -n and -a together to look at the callout record for a particular callout.

If the -c option is used then callout manager status will be shown as follows:

Delay:      4-mins
Calls:      0
Max Calls:  20
Next Call:  Immediate

The following explains the meaning of each field:

Delay   The time interval that should be allowed between sending callouts when there are multiple callouts in the queue. This delay keeps the modem from being "hogged" when there are many callout requests that occur within a small period of time. The delay allows a remote user to log in (if configured). A delay of "Infinite" means calld will not start another callout until the "chcall -n" command is run. A delay of "None" indicates that callouts will always be started immediately upon being enqueued.

-94-

Calls    The number of calls currently in the callout manager queue.

Max Calls    The maximum length of the callout manager queue. If there are this number of callouts already in the queue, mkcall will return an error if an attempt is made to enqueue another one.

Next Call    Shows the amount of time before the callout daemon will start another callout. "Immediate" means the next callout to be enqueued with mkcall will start immediately. "On demand" means that calld will not start another callout until the "chcall -n" command is run.

The -O option is used by GMIS as a "command to discover".

This command is available from within the GMIS unit. The fastpath is "brc_callman".

Options

-n #    Show information about the callout with the specified callout ID (#)

-a    Show callout record content

-N    Do not show headers

-c    Show callout manager status information

-O    "Command to Discover" (used by GMIS)

Example

To show information about callout ID number 37 including the callout record contents:

lscall -n 37 -a

Files

/var/call/calls/call.ctrl    A binary file which stores the callout manager queue and configuration parameters.

Related Information:

The following commands/programs: callcfg, callact, callforce, netact, netactd, netcall, mkcall, rmcall, chcall, calld, callout, callbin.

17. lslses Command

Syntax:

lslses

Description

If Session Logging is enabled (see confmon), when a remote user calls in to a system a file is created which contains a log of all activities performed. There is one such log file for each time a remote service representative logs in to the system. These session files may be listed with the lslses command. The name of the log file represents the date and time at which the call-back occurred. For example:

BRC-121892144357

Indicates that a call-back occurred on December 18th 1992 at 2:43:57 PM.

This command is not available from within GMIS as an individual command, but is used by GMIS to build a list of logged sessions from which a session to review or delete may be picked.

Related Information:

The following commands/programs: confperm, doremote, confmon, callscript, showscript, showses, showlses, rmlses.

18. lsmsg Command Program

Syntax:

lsmsg [-n source_identifier] [ {-i | -e | -a} ] [-d]
      [-o] [-N] [[-S] -I message_identifier]

Description

The lsmsg command program is used to output the messages monitored by the RSF unit. There are several options provided for different output formats. If no options are provided, the default is to use -i for SYSTEM sources and -e for ASCII sources.

Options

| | |
|---|---|
| -n source_identifier | Specifies the identifier of the source to be listed. |
| -i | List the ID's only. |
| -e | List ID's and expressions (only with ASCII sources). |
| -a | List the following information: expression(ASCII sources only), id, count, threshold, duration, and keepmax. |
| -d | In addition to what is displayed with -a, output the timestamp and full description of all messages with a count > 0. |
| -o | List only the over-threshold messages. |
| -N | Suppress the headers. |
| -S | List output in GMIS ready format. |
| -I message_identifier | List only the message with given id. |

-97-

Example

To give a full listing of all messages that are over-threshold:

lsmsg -a -o

Files

Related Information:

The following commands/programs: chrsf, chmsg, chmsrc, rsfd, lsmsrc, mkmsg, mkmsrc, rmmsg, rmmsrc, netact, netactd.

19. lsmsrc Command Programs

Syntax:

lsmsrc [-iaArcpN] [-t type] [[-S] -n source_identifier]

Description

The lsmsrc command is used to output the sources monitored by the RSF unit. There are several options provided for different output formats.

Options

| | |
|---|---|
| -n source_identifier | Specifies the identifier of the source to be listed. |
| -i | List source identifiers only. |
| -a | Full listing of source identifier, type, cleantime, searchtime, and overthreshold values. |
| -A | List source identifier, action, and action-blocked values. |
| -r | List record of actions. |
| -c | List record of actions on behalf of cluster nodes. |
| -p | List source identifier and path. |
| -N | Suppress headers. |
| -t type | List only sources of given type. |

-98-
Can be ASCII or SYSTEM.

-s                List output in GMIS ready format.

Example

To give a full listing of all ASCII sources:

lsmsrc -a -t ASCII

Related Information:

The following commands/programs: chrsf, chmsg, chmsrc, rsfd, lsmsg, mkmsg, mkmsrc, rmmsg, rmmsrc, netact, netactd.

20. mailact RSF Action Program

Syntax mailact source_identifier description_file message_identifier

Description

Mailact is an RSF action (i.e., it may be configured as an action that is taken by RSF when an over-threshold condition occurs). The mailact action sends E-mail to an address specified with the callcfg command.

To use this action, RSF is configured as though it were to use a local modem to make callouts. Telephone numbers for the response center and other modem related parameters are ignored if this action is used. Only E-mail is sent.

If the E-mail address specified is the address of a user on a remote machine, be user to configure sendmail appropriately.

The callout record that is sent via E-mail is created by callact and includes the following items:

Subject line with originating system and short description
    Current date and time
    The text of the over threshold message: "description_file"

This utility is not used from the command line or from GMIS. It is meant to be invoked by rsfd as an action.

Options source_identifier   Which monitored source is involved with this action.

description_file    File containing text of over-threshold message.

message_identifier  ID of the message that is over-threshold.

Related Information:

The following commands/programs: callcfg, callforce, netact, netactd, netcall, mkcall, lscall, rmcall, chcall, calld, callout, callbin.

21. mkcall Command

Syntax:

mkcall [-o origin] [-d description] [-f file]
       [-p pcode] [-s scode] [-S site-information]

Description

The RSF callout manager controls the sequencing and timing of callouts to a response center. It manages a queue of callout requests. This queue may be viewed and manipulated using the lscall and rmcall commands. The queue is serviced by a daemon process (calld). Parameters relating to this queue may be viewed and set with the lscall and chcall commands.

The mkcall command queues a new callout request with the callout manager. The information specified with the -f, -p, -s, and -S options is queued along with the request and is eventually passed to the "callbin" command. See the "callbin" command for more information on these options.

The -o argument is used to specify the origin of the callout (the hostname of the system that is the source of callout). This is used to identify the calling system in the case of several cluster clients on a LAN. If this parameter is not supplied "Unknown" is used. See callact for more information on cluster callouts.

The -d argument specifies a short description of the

-100-
reason for the callout. This description is shown when lscall is used to list queued callouts. If this parameter is not supplied "Unknown" is used.

If -f is not supplied, mkcall will read from stdin. If -p or -s are not supplied, a default of 0x0000 is used.

This command is not meant to be executed from the command line or from GMIS. It is called from the netcall and callact script programs. For callouts associated with the system error log the short description passed with -d is the "Error Description" field.

Options

| | |
|---|---|
| -o origin | Origin of callout (name of calling system) |
| -d description | Short description of the reason for the callout |
| -f file | File specifying content of callout record (see callbin) |
| -p primary-code | Hexadecimal Primary Error Code (see callbin) |
| -s secondary-code | Hexadecimal Secondary Error Code (see callbin) |
| -S "site_information" | Site identifier (see callbin) |

Example

Files

| | |
|---|---|
| /var/call/calls/call.ctrl | A binary file which stores the callout manager queue and configuration parameters. |

Related Information:

The following commands/programs: callcfg, callact, callforce, netact, netactd, netcall, lscall, rmcall, chcall, calld, callout, callbin.

22. mkmsg Command

Syntax:

-101-

```
mkmsg -n source_identifier {{ -e expression | -i
      message_identifier } [-t threshold] [-d duration]
      [-k keepmax]} | { -f initialization_file }
```

Description

The mkmsg command adds a new message to be monitored by the RSF unit for the given source. The identifier of the source for which the message is monitored is a required option and either the -e, -i, or -f options must be used. The -e and -i options are used for making a single message and the -f option is used for batch message creation.

Options

| | |
|---|---|
| -n source_identifier | Specifies the identifier of the source to be removed. |
| -e expression | Specifies the regular expression for the message (ASCII sources). |
| -i message_identifier | Specifies the message id (SYSTEM sources). |
| -t threshold | Specifies the threshold value for the message. |
| -d duration | Specifies the duration value for the message. |
| -k keepmax | Specifies the keepmax value for the message. |
| -f initialization_file | Specifies the initialization file for batch message creation. The following is an example of the format for both ASCII and SYSTEM sources: |

For an ASCII source:

| #expression | threshold | duration | keepmax |
|---|---|---|---|
| "system_error_.*" | 2 | 1-day | 50 |
| "i/o_error_on_device.*" | 5 | 4-days | 10 |

For a SYSTEM source:

| #id | threshold | duration | keepmax |
|---|---|---|---|
| 23e44f | 2 | 1-day | 50 |
| abcdef | 10 | 2-hours | 10 |

-102-

Defaults

If the options are not provided, the default threshold is 5, duration is 1-day and keepmax is 20.

Example

To make a new message for the ASCII source "testsource":

mkmsg -n testsource -e "controller number .*" -t 10

Related Information:

The following commands/programs: chrsf, chmsg, chmsrc, rsfd, lsmsg, lsmsrc, mkmsrc, rmmsg, rmmsrc, netact, netactd.

23. mkmsrc Command

Syntax:

```
mkmsrc -i source_identifier -p path -a action
       [-t type] [-c cleantime] [-s searchtime]
       [-f initialization_file]
```

Description

The mkmsrc command is used to define a new source to be monitored by the RSF unit. The source is a file located on the system which is either a system log file or an arbitrary ASCII log file generated by any application. The mkmsrc command requires a user defined identifier for the source, the path to the log file, and the path to the action to execute when an over-threshold condition occurs.

Options

| | |
|---|---|
| -i source_identifier | Specifies the identifier of the source to be created. |
| -p path | Specifies the path to the source. |
| -a action | Specifies the path to the action to execute when an over-threshold condition occurs. |
| -t type | Specifies the type of the source (ASCII or SYSTEM). |
| -c cleantime | Specifies the interval at which |

-103-
the RSF database is cleaned.

-s searchtime
Specifies the interval at which the RSF daemon scans the log for new messages.

-f initialization_file
Specifies an input file for initializing the messages associated with the new source. The following is an example of the format for both ASCII and SYSTEM sources:

For an ASCII source:

| #expression | threshold | duration | keepmax |
|---|---|---|---|
| "system_error_.*" | 2 | 1-day | 50 |
| "i/o_error_on_device.*" | 5 | 4-days | 10 |

For a SYSTEM source:

| #id | threshold | duration | keepmax |
|---|---|---|---|
| 23e44f | 2 | 1-day | 50 |
| abcdef | 10 | 2-hours | 10 |

Defaults

If the options are not provided, the default type is ASCII, cleantime is 1-day and seektime is 5-hours.

-104-

Example

To make a new source named "testsource" of type ASCII:

mkmsrc -i testsource -p path_to_source -a path_to_action -t ASCII

Related Information:

The following commands/programs: chrsf, chmsg, chmsrc, rsfd, lsmsg, lsmsrc, mkmsg, rmmsg, rmmsrc, netact, netactd.

24. netact Command Program

Syntax:

netact hostname action source_identifier
    description_file message_identifier [options]

Description

The netact command program contacts the netactd daemon on the server machine "hostname" and requests that "action" be run on that machine. The rest of the options are arguments to the remote action. The "description_file" is a local file which is temporarily transferred to the remote host. The standard and error output from the remote command is transferred back and written on standard output of netact program. Following "message_identifier," a list of additional options may be specified. These will be passed to the remote action as is.

The netactd daemon must be running on the remote host. This utility is not used from the command line or from GMIS. It is used in scripts like callact and callforce.

Options

| | |
|---|---|
| hostname | The remote host to contact. |
| action | The pathname of the action on the remote host. |
| source_identifier | Which monitored source is involved with this action. |
| description_file | File containing text of over-threshold message. |

-105- message_identifier  ID of the message that is over-threshold.

[options]  Optional list of options which will be passed to the remote action.

Related Information:

The following commands/programs: callcfg, callact, callforce, netactd, netcall, mkcall, lscall, rmcall, chcall, calld, callout, callbin.

25. netactd Cluster Daemon

Syntax:

Description

The netactd daemon services requests from the netact command program running on remote hosts. It is implemented as an RPC server using the TCP/IP protocol. This daemon and the associated netact command are used to implement the callout cluster environment.

The daemon is not run directly from the command line. It may be started and stopped from GMIS or from the command line with the chrsf command. The fast path for GMIS is "actions".

Related Information:

The following commands/programs: chrsf, callcfg, callact, callforce, netact, netcall, mkcall, lscall, rmcall, chcall, calld, callout, callbin.

26. netcall RSF Action Program

Syntax:

netcall source_identifier description_file
        message_identifier host_name site_information

-106-

Description

Netcall is an RSF action. It is used on a cluster server system in conjunction with the callact, netact, and netactd programs to send a callout record to a response center from a cluster client system response center in a clustered callout environment.

When a cluster client needs to make a callout to the response center, callact is invoked by rsfd on the client system. Callact determines that it needs to send the callout record to the cluster server system, so callact invokes netact with an action of netcall. Netcall passes the callout record to the callout manager (see mkcall). Netcall also handles remote callforce requests.

The callout record that is sent to the response center is created by callact or callforce. Netcall adds cluster server site configuration to the callout record before passing it to the callout manager (for normal RSF callouts) or directly to callout (for forced callouts). Netcall may be configured to send mail to a given E-Mail address whenever a remote callout request is made.

This utility program is not used from the command line or from GMIS. It is meant to be invoked by netactd as an action on behalf of a remote callout request.

Options source_identifier   Which monitored source is involved with this action.

description_file    File containing callout record generated by callact.

message_identifier  ID of the message that is over-threshold.

host_name           Network name of the host that is making this request.

site_information    Site identifier information from the cluster client.

Related Information:

The following commands/programs: callcfg, callact, callforce, netact, netactd, mkcall, lscall, rmcall, chcall, calld, callout, callbin.

-107-
27. rmcall Command

Syntax:

rmcall ID [ID ID ...]

Description

The RSF callout manager controls the sequencing and timing of callouts to a response center. It manages a queue of callout requests. Requests are enqueued using the mkcall command. Requests and parameters are viewed with the lscall command. The queue is serviced by a daemon process (calld). Parameters relating to this queue may be set with the chcall command. This command removes the callouts requested with the specified request ID(s). See the lscall command for a definition of "request ID". Callouts that have already been started ("S" status) may not be removed.

This command is available from within GMIS. The fastpath is "brc_callman".

Options

ID    Request ID of the callout request to be removed

Example

To remove callout request ID number 25 rmcall 25

Files

/var/call/calls/call.ctrl   A binary file which stores the callout manager queue and configuration parameters.

Related Information:

The following commands/programs:    callcfg, callact, callforce, netact, netactd, netcall, mkcall, lscall, chcall, calld, callout, callbin.

28. rmlses Command

Syntax:

-108-
rmlses logged-session

Description

Removes the specified logged session. The list of currently logged sessions may be viewed using lslses.

This command is available from within GMIS. The fastpath is "call_mon".

Options logged-session   The logged session to remove

Related Information:

The following commands/programs: confperm, doremote, confmon, callscript, showscript, showses, lslses, showlses.

29. rmmsg Command

Syntax:

rmmsg -n source_identifier -i message_identifier

Description

The rmmsg command is used to remove a monitored message from a monitored source. This is used to alert the RSF unit to no longer monitor the given message.

Options

-n source_identifier    Specifies the identifier of the source for which the message belongs.

-i message_identifier   Specifies the message id to be removed from the given source.

-109-

Example

To alert RSF to no longer monitor message id FFFFFFFF for source "testsource":

rmmsg -n testsource -i FFFFFFFF

Related Information:

The following commands/programs: chrsf, chmsg, chmsrc, rsfd, lsmsg, lsmsrc, mkmsg, mkmsrc, rmmsrc, netact, netactd.

30. rmmsrc Command

Syntax:

rmmsrc -n source_identifier

Description

The rmmsrc command is used to remove the specified source from the list of message sources monitored by the RSF unit. After this is done, the mkmsrc command is used to restart monitoring of the source.

Options

-n source_identifier    Specifies the identifier of the source to be removed.

Example

To remove a source named "testsource":

rmmsrc -n testsource

Related Information:

The following commands/programs: chrsf, chmsg, chmsrc, rsfd, lsmsg, lsmsrc, mkmsg, mkmsrc, rmmsg, netact, netactd.

-110-

31. rsfd Command Daemon

Syntax:

rsfd [ -t level [ -f trace_file ] ]

Description

5  This is the RSF daemon. It can be started with an optional trace level between 0-9 and also an optional tracing output file. The default is no tracing.

When rsfd program is started it performs a sanity check on the RSF configuration (see rsfstat). Any warnings or
10 fatal errors are reported. If there are any fatal errors the daemon will not start.

Options

-t level      level specifies the detail of tracing output.

15 -f trace_file  trace_file specifies an output file for tracing output.

Related Information:

The following commands/programs: chrsf, chmsg, chmsrc, lsmsg, lsmsrc, mkmsg, mkmsrc, rmmsg, rmmsrc, netact,
20 netactd.

32. rsfstat Command Program

Syntax:

rsfstat [-v]

Description

25 The RSF unit includes up to three daemons: calld, netactd, and rsfd. This utility displays a table showing the status of each daemon. If the daemon is running then the status is "up". In this case, also shown are, how long the daemon has been running and what
30 its process ID is. If the daemon is not running then the status is "down".

If a partial installation was performed then only the status of the installed daemons is shown.

-111-

The -v option performs a check of the RSF configuration and reports any fatal errors, or warnings. Note: you must be root or "remote" to use the -v option.

Options

5  -v         Perform sanity check on RSF configuration.

Defaults

Examples

Typical output from rsfstat looks like the following:

```
    Daemon    Status
10  -------   -------------------------------
    rsfd      up (7-days, pid=10895)
    calld     down
    netactd   down
```

Related Information:

15 The following commands/programs:  chrsf, chcall, rsfd, netactd, calld.

33. showlses Command

Syntax:

showlses logged-session

20 Description

This command is used to view a session log created when a remote user logs in to the system.

If Session Logging is enabled (see confmon), when a remote user calls in to a system a file is created which
25 contains a log of all activities performed. There is one such log file for each time a remote service representative logs in to the system. These session files may be listed with the lslses command. The name of the session log is passed to showlses. The name of
30 the log file represents the date and time at which the call-back occurred. For example:

BRC-121892144357

Indicates that a call-back occurred on December 18th 1992 at 2:43:57 PM.

-112-
While viewing a logged session the following keys may be useful:

```
q       Quits showlses
p       Pauses/resumes viewing
!       Speeds up viewing
space   Slows down viewing
```

This command is available from within GMIS. The fastpath is "call_mon".

Options logged-session    The name of the logged session to review. A list of logged sessions may be seen using lslses.

Related Information:

The following commands/programs: confperm, doremote, confmon, callscript, showscript, showses, lslses, rmlses.

34. showscript Command Program

Syntax:

showscript (-s | -r) script-file
showscript -c script-file -p pid

Description

This command program is used along with the callscript command program to support the console logging and playback feature of the RSF call-back environment. The command reads files created using the -s option of callscript. These files contain scripted sessions with timing information so that they can be played back like a movie.

The terminal that session files are viewed on must be equivalent to the kind of terminal that they are recorded on. In order to help ensure this, session files created by callscript contain the $TERM that was in effect when the script was created. This is checked against the $TERM that is in effect when showscript is run. If they don't match then a warning message is printed.

Note: Many times terminal types that have different names may have definitions close enough to allow the -113-
session files to be viewed (e.g. vt100 and xterm).

The two different syntax forms are used to support the two different ways that the RSF unit looks at session files. The first form (using -s) reviews a complete session file (see showlses). When the end of the file is reached showscript terminates. The second form (using -c and -p) shows the contents of a session script that is still being created (i.e., callscript is still running). When the end of the file is reached showscript will wait for more data to be added to the file (see showses). The process with the pid specified with the -p option is sent a SIGKILL signal when the 'k' "hot key" is hit.

There are special keys that can be used while viewing a session:

| | |
|---|---|
| q | Quits showscript |
| p | Pauses/resumes viewing |
| ! | Speeds up viewing |
| space | Slows down viewing |
| k | Terminates process with pid (used only with -c and -p) |

Note: The 'k' key does not end the showscript session. Hit 'q' to stop viewing.

RSF users do not invoke this command directly or through GMIS. This command is called from the showses and showlses scripts which are available through GMIS.

Options

-s script-file   Plays back the specified script file

-r script-file   Strips timing information from the specified script file. The result is written to standard output

-114-

-c script-file    Plays back the specified script file in
                  a mode which follows the end of the file
                  (like tail -f).

-p pid            Specifies the process ID to which a
                  SIGKILL is sent if the 'k' "hot-key" is
                  hit.

Examples

To view a previously recorded session.

showscript -s script-file

To strip timing information from a recorded session showscript -r script-file > output-file Related Information:

The following commands/programs: confperm, doremote, confmon, callscript, showscript, showses, lslses, showlses, rmlses.

35. showses Command

Syntax:

showses

Description

If Session-Notification-Interactive style session monitoring is enabled, (see confmon) when a remote user calls in to a system a warning message is displayed on a terminal chosen by the local administrator. The warning message says ...

Remote maintenance session in progress
    Type 'showses' to monitor

This command may then be used by the local administrator to view everything that the remote service representative is doing. If the local administrator hits the 'k' key, it will immediately log the remote user off the system.

-115-
If the remote maintenance representative has been working on the system for a while before this command is run, all of the activity prior to the execution of showses will be seen. It may take a while to catch up with the remote session. The '!' key may be used to speed up viewing. Other special keys are:

```
q       Quits showses
p       Pauses/resumes viewing
space   Slows down viewing (until caught up)
```

This command is available from within GMIS. The fastpath is "call_mon".

Related Information:

The following commands/programs: confperm, doremote, confmon, callscript, showscript, showses, lslses, showlses, rmlses.

-116-
SECTION II  DEFINITIONS/GLOSSARY OF TERMS

SOURCE ATTRIBUTE DATABASE:

A binary file managed by RSF unit 10-10 which records information about sources being monitored by RSF unit 10-10 including parameters that control how each source should be monitored.

MESSAGE TEMPLATES DATABASE:

A binary file managed by unit 10-10 which contains search criteria and status information for each message being monitored. There is an individual message templates database for each source being monitored.

STORED MESSAGE DATABASE:

A binary file managed by unit 10-10 which contains a recent history of messages being monitored which have appeared. There is an individual stored message database for each source being monitored.

KEEPMAX:

For each message in the message templates database, the keepmax parameter sets an upper limit on how many of this particular message will be backlogged in the stored message database.

SOURCE:

A "source" is any source of messages (such as a log file).

MESSAGE:

A "message" is a record that appears in a source.

THRESHOLD:

A "threshold" is a number of times that a particular message must be observed before that message is considered "over-threshold."

DURATION:

A "duration" is the amount of time allowed in which a particular message "counts" toward the threshold. Together, the threshold and the duration define the over-threshold status of a message. A message is considered overthreshold if the threshold is reached within the duration (e.g. 4 must appear within 5 minutes to be over-threshold).

ACTION:

An "action" is a program that is run in response to an overthreshold condition. Any program can be specified as an action.

SEARCHTIME:

For each source, this parameter controls how often unit 10-10 will scan the source for new messages.

CLEANTIME:

For each source, this parameter controls how often the associated stored message database is cleaned (old messages are removed).

STANDALONE:

A host system with modem connection.

CLUSTER CLIENT:

A host system with no modem connection which uses a cluster server system to make callouts.

CLUSTER SERVER SYSTEM:

A host system with modem connection which is shared with cluster client systems.

-118-

**SECTION III  DESCRIPTION OF ROUTINES
STORED IN RSF 10-104 LIBRARY**

1. Action Routines

Routines uysed to maintain the log of actions taken by the RSF unit.

Remove (delete) the action log
    Add an entry to the action log

2. Control Routines

Routines used to access the source attributes database (control file).

Open the control file
    Read the next sequential record from the control file
    Move read pointer to the start of the control file
    Add a new record to the end of the control file
    Look up a control file record based on the source ID
    Change the contents of a specific control file record
    Delete a specific record from the control file
    Close the control file 3. Config Routines

Routines used to access the callout configuration (call.conf file).

Set default callout configuration parameters
    Read the callout configuration from the call.conf file
    Write the callout configuration to the call.conf file

-119-

4. Display Msg. Routines

Routines used to format messages that have been received by the RSF unit.

Generic routine to print format a message regardless of type
   Routine to print format an ASCII message
   Routine to print format a system message 5. Keep File Routines

Routines used to access the stored message database (*.keep files)

Delete an entire keep file
   Create a new keep file
   Clean a keep file (removing logically deleted entries)
   Open a keep file
   Read the next sequential entry from the keep file
   Move read pointer to the start of the keep file
   Add a new entry to the end of the keep file
   Logically delete the last N kept messages with a specific ID
   Logically all kept messages with a specific ID
   Adjust durations for kept messages with a specific ID
   Logically delete expired messages with a specific ID
   Cloase the keep file 6. Support Routines

Miscellansous routines used by various RSF modules.

Internal/User parameter format conversion routines.
   User parameter format checking routines
   Initialization file parsing routines
   User access restriction routines

-120-

7. Error Msg. Routines

Routines used to access the Host System Error Log file.

Read the next sequential record from the host error log file
   Find the start of the next sequential record
   Format a system error log file record into human readable form 8. Search Routines

Routines used to access the message template database (*.search files).

Delete an entire search file
   Create a new search file
   Determine if a search file is empty
   Open a search file
   Generic routine to search for a matching search file entry
   Search for a matching ASCII record (use regular expressions)
   Search for a matching system record (use message ID)
   Read the next sequential record from the search file
   Move read pointer to the start of the search file
   Generic routine to add an entry to a search file
   Add an ASCII search record to the end of a search file
   Add a system search record to the end of a search file
   Add a new record to the end of the search file
   Sort all the records if the search file by message ID
   Look up a record in the search file based on message ID
   Change the contents of a specific search file record
   Delete a specific record from a search file
   Close a search file -121-
9. Source Routines

Routines used to access RSF sources (log files).

Open a source
   Generic routine to read the next sequential record from source
   Read the next sequential record from an ASCII source
   Read the next sequential record from a system source
   Close a source 10. Verify Routines

Routines used to check to RSF configuration files for errors.

Routine to check the validity of a host name
    Routine to check the validity of a tty
    Routine to check the validity of remote's published password
    Routine to check the callout configuration
    Routine to check the source attributes database
    Routine to check daemon status
    Routine to check free space on disks
    Verify a specified subset of the above 11. Config. Diag. Routines

Routines used to configure the diagnostic callout parameters.

Routine to disable diagnostic callout
    Routine to enable diagnostic callout
    Routine to read diagnostic frequency
    Routine to write diagnostic frequency 12. PID Routines

Routines used to manage daemon PID files (*.pid files).

Create a PID file containing PID of caller
    Remove a PID file
    Check the status of a PID file
    Send a signal to a daemon (uses PID file to get PID)

-122-
SECTION IV

#1 - EXAMPLES OF STANDALONE CALLOUT RECORDS

Parameters required for logging back into host system are in bold type.

```
5   Date: Fri Apr  2 10:23:11 EST 1993

Site Configuration
    -------------------------------- calltype: modem
    suptype:  RCS2
10  sysid:    UD9999 remote phone numbers:
       18005552855 opphone: (665) 555-3423
    opname:  Jonathan S.
15  mail:    root
    sysphone: 6655552331
    passwd:  phoenix
    tty:     /dev/tty0
    Terminal type that must be used for callback: vt100

20  Full Text of Message
    --------------------------------

ERROR LABEL:    SDM_ERR1
    ERROR ID:       BAECC981

Date/Time:       Fri Apr  2 10:23:08
25  Sequence Number: 397433
    Machine Id:      000004375C3A
    Node Id:         hazel
    Error Class:     H
    Error Type:      PERM
30  Resource Name:   serdasda0

Error Description
    MICROCODE PROGRAM ERROR

Probable Causes
    STORAGE CONTROLLER MICROCODE

35  Install Causes
    MISMATCH BETWEEN HARDWARE AND MICROCODE
    MISMATCH BETWEEN SOFTWARE AND MICROCODE Recommended Actions
```

-123-
CHECK FOR CORRECT MICROCODE FIX

Failure Causes
LOADABLE STORAGE CONTROLLER MICROCODE

Recommended Actions
5      PERFORM PROBLEM DETERMINATION PROCEDURES

Detail Data
SENSE DATA
01FF 0000 0000 0000 0000 0000 0000 0000

System Information
10     ----------------------------------

OS Name: BOSX
OS Version: 3
OS Release: 2

Configuration Information
15     ----------------------------------

INSTALLED RESOURCE LIST WITH VPD

The following resources are installed on your machine.

```
       sysplanar0         00-00              CPU Planar

Part Number..................043G1797
20          EC Level.....................00C74316
            Processor Identification.....00000594
            ROS Level and ID.............IPLVER1.0
                                         LVL1.02,043G2189
            Processor Component ID.......0102006300000014
25          Device Specific.(Z0).........012048
            Device Specific.(Z1).........021047
            Device Specific.(Z2).........031246
            Device Specific.(Z3).........041149
            Device Specific.(Z4).........CD234D
30          Device Specific.(Z5).........ED234D
            Device Specific.(Z6).........0A114A
            Device Specific.(Z7).........2A114A
            Device Specific.(Z8).........4A114A
            Device Specific.(Z9).........6A114A
35          ROS Level and ID.............OCS(07040A00)
            ROS Level and ID.............SEEDS(F0BABC01)

ioplanar0          00-00              I/O Planar

EC Level.....................39 bus0               00-00              Microchannel Bus
40     sio0               00-00              Standard I/O Planar
```

-124-

```
          Part Number................. 52G1265
          EC Level...................D25842
          Serial Number..............00000299
          FRU Number................. 52G1266
 5        Manufacturer...............IBM97N
          Displayable Message........STANDARD I/O
          Device Driver Level........00
          Diagnostic Level...........00
          ROS Level and ID...........0000
10        Displayable Message........ STANDARD SCSI
          Device Driver Level........00
          Diagnostic Level...........00
          Loadable Microcode Level....0044
          ROS Level and ID...........0044
15        Read/Write Register Ptr.....0100 fda0            00-00-0D           Standard I/O
                                       Diskette Adapter
    fd0             00-00-0D-00        Diskette Drive
    ppa0            00-00-0P           Standard I/O
20                                     Parallel Port
                                       Adapter
    lp0             00-00-0P-00        Bull Compuprint 4/51
    scsi0           00-00-0S           Standard SCSI I/O
                                       Controller
25  hdisk0          00-00-0S-00        1.37 GB SCSI Disk
                                       Drive Device Specific.(Z0)........0000
          Manufacturer...............IBM
          Machine Type and Model......ST41600N
30        Serial Number..............00055744
          Device Specific.(Z1)........70899604 cd0             00-00-0S-10        CD-ROM Drive

Device Specific.(Z0)........0580
          Manufacturer...............TOSHIBA
35        Machine Type and Model......CD-ROM DRIVE:XM
          ROS Level and ID...........3232 hdisk1          00-00-0S-20        1.37 GB SCSI Disk Drive

Device Specific.(Z0)........0000
          Manufacturer...............IBM
40        Machine Type and Model......ST41600N
          Serial Number..............00073612
          Device Specific.(Z1)........70899604 rmt0            00-00-0S-50        2.3 GB 8mm Tape Drive

Device Specific.(Z0)........0180
```

-125-
```
                         Manufacturer................EXABYTE
                         Machine Type and Model......EXB-8200 sa0             00-00-S1              Standard I/O
                                               Serial Port 1
 5       tty0            00-00-S1-00           Asynchronous
                                               Terminal
         sa1             00-00-S2              Standard I/O
                                               Serial Port 2
         tty1            00-00-S2-00           Asynchronous
10                                             Terminal
         scsi1           00-01                 SCSI I/O
                                               Controller Device Driver Level.........00
                  Diagnostic Level............00
15                Displayable Message.........SCSI
                  EC Level....................C74317
                  FRU Number.................. 31G9729
                  Manufacturer................IBM97N
                  Part Number................. 43G1811
20                Serial Number...............
                  Loadable Microcode Level....0044
                  ROS Level and ID............0050
                  Read/Write Register Ptr.....0100 hdisk2          00-01-00-00           1.37 GB SCSI Disk Drive

25                Device Specific.(Z0)........0000
                  Manufacturer................IBM
                  Machine Type and Model......ST41600N
                  Serial Number...............00073493
                  Device Specific.(Z1)........70899604

30       ent0            00-03                 Ethernet High-
                                               Performance LAN
                                               Adapter Network Address.............02608C2F9E82
                  ROS Level and ID............0015
35                Displayable Message.........802.3/ETHERNET
                  Part Number.................000G3369
                  EC Level....................C73859
                  Device Driver Level.........01
                  Diagnostic Level............01
40                FRU Number..................000G3368
                  Serial Number...............00110116
                  Manufacturer................204491 x25s0           00-04                 X.25 Adapter
         fddi0           00-05                 FDDI Primary Card,
45                                             Single Ring Fiber
```

```
                              -126-
            Network Address.............10005AB8054F
            Displayable Message......... FDDI RING B
            EC Level....................C73876
            FRU Number.................. 81F9003
 5          Manufacturer................VEN0857049
            Part Number................. 31G9393
            Serial Number...............001114
            ROS Level and ID............0000
            Loadable Microcode Level....01

10     fddi1              00-07              FDDI Primary Card,
                                             Dual Ring Fiber Network Address.............10005AB8054E
            Displayable Message......... FDDI RING B
            EC Level....................C73876
15          FRU Number.................. 81F9003
            Manufacturer................VEN0857049
            Part Number................. 31G9393
            Serial Number...............001069
            ROS Level and ID............0000
20          Loadable Microcode Level....01 fddix0             00-06              FDDI Extender Card
       sa2                00-08              16-Port Asynchronous
                                             Adapter EIA-422A Displayable Message.........16PORT RS422
25          EC Level....................C26396
            FRU Number..................030F9297
            Manufacturer................ven0857049
            Part Number.................071F0976
            Serial Number...............001329

30     tty2               00-08-01-00        Asynchronous
                                             Terminal
       fpa0               00-00              Floating Point
                                             Processor
       slc0               00-00              Serial Optical
35                                           Link Chip
       slc1               00-00              Serial Optical
                                             Link Chip
       ioplanar1          00-10              I/O Planar EC Level....................FFFFFFFF 40     bus1               00-10              Microchannel Bus
       serdasda0          00-11              Serial-Link Disk
                                             Adapter Part Number.................045G2774
            Serial Number...............00009908
45          EC Level....................0015720938
```

```
                          -127-
              Manufacturer................IBM053
              ROS Level and ID............000D
              Loadable Microcode Level....00
              Device Driver Level.........01
   5          Displayable Message.........SERIAL-ADAPTER serdasdc1         00-11-02           Serial-Link Disk
                                             Controller Part Number.................42G9575
              Serial Number...............00003738
  10          Machine Type and Model......9333-000
              Manufacturer................IBM       -0053
              ROS Level and ID............0C hdisk6            00-11-02-01        857MB F Serial-
                                             Link Disk Drive 15          Part Number.................95X2431
              EC Level....................C79493
              Serial Number...............B182136E
              Machine Type and Model......9333-100
              Manufacturer................IBM       -0902
  20          ROS Level and ID............63
              Device Specific.(Z1)........ 9103944
              Device Specific.(Z2)........7102
              Device Specific.(Z3)........70F9042
              Device Specific.(Z4)........92087

25    hdisk7            00-11-02-03        857MB F Serial-
                                             Link Disk Drive Part Number.................95X2431
              EC Level....................C79493
              Serial Number...............B207056L
  30          Machine Type and Model......9333-100
              Manufacturer................IBM       -0902
              ROS Level and ID............52
              Device Specific.(Z1)........ 9104086
              Device Specific.(Z2)........5866
  35          Device Specific.(Z3)........70F9042
              Device Specific.(Z4)........92093 serdasdc0         00-11-03           Serial-Link Disk
                                             Controller Part Number.................07G5194
  40          Serial Number...............00002893
              Machine Type and Model......9333-000
              Manufacturer................IBM       -0053
              ROS Level and ID............0B hdisk4            00-11-03-00        1.07GB F Serial-
```

-128-
Link Disk Drive

```
                Part Number..................69F9821
                EC Level.....................C79493
                Serial Number................R012573V
                Machine Type and Model.......9333-110
                Manufacturer.................IBM     -0902
                ROS Level and ID.............63
                Device Specific.(Z1)........ 8203386
                Device Specific.(Z2)........10959
                Device Specific.(Z3)........70F9042
                Device Specific.(Z4)........92199 ent1            00-14                Ethernet High-
                                         Performance LAN
                                         Adapter Network Address.............02608C2F8A70
                ROS Level and ID............0015
                Displayable Message.........802.3/ETHERNET
                Part Number.................000G3369
                EC Level....................C73859
                Device Driver Level.........01
                Diagnostic Level............01
                FRU Number..................000G3368
                Serial Number...............00114965
                Manufacturer................204491 mpqa0           00-15                4-Port Multi-
                                         protocol
                                         Communications
                                         Controller
    mpq0            00-15-00             Multiprotocol
                                         Adapter Port
    mpq1            00-15-01             Multiprotocol
                                         Adapter Port
    mpq2            00-15-02             Multiprotocol
                                         Adapter Port
    mpq3            00-15-03             Multiprotocol
                                         Adapter Port
    mem0            00-0B                64 MB Memory Card Device Specific.(Z3)........07
                EC Level....................21
                Device Specific.(Z0)........00
                Device Specific.(Z1)........00
                Device Specific.(Z2)........00
                Size........................64 mem1            00-0C                64 MB Memory Card

Device Specific.(Z3)........07
                EC Level....................21
```

```
                         -129-
            Device Specific.(Z0)........00
            Device Specific.(Z1)........00
            Device Specific.(Z2)........00
            Size.......................64 mem2                00-0D              64 MB Memory Card

Device Specific.(Z3)........07
            EC Level...................21
            Device Specific.(Z0)........00
            Device Specific.(Z1)........00
            Device Specific.(Z2)........00
            Size.......................64 mem3                00-0F              64 MB Memory Card

Device Specific.(Z3)........07
            EC Level...................21
            Device Specific.(Z0)........00
            Device Specific.(Z1)........00
            Device Specific.(Z2)........00
            Size.......................64 mem4                00-0G              64 MB Memory Card

Device Specific.(Z3)........07
            EC Level...................21
            Device Specific.(Z0)........00
            Device Specific.(Z1)........00
            Device Specific.(Z2)........00
            Size.......................64 mem5                00-0H              64 MB Memory Card

Device Specific.(Z3)........07
            EC Level...................21
            Device Specific.(Z0)........00
            Device Specific.(Z1)........00
            Device Specific.(Z2)........00
            Size.......................64 sysunit0            00-00              Bull DPX/20 System
                                           Unit
```

-130-
SECTION IV - (Cont'd.)

#2 - EXAMPLES OF CLUSTER CLIENT CALLOUT RECORDS

Parameters required for logging back into host system are in bold type.

```
 5   Cluster Server Configuration
     --------------------------------- calltype: modem
     suptype:  RCS2
     sysid:    UD9999

10   remote phone numbers:
         18005552855 opphone:  (665) 555-3423
     opname:   Jonathan S.
     mail:     root
15   sysphone: 6655552331
     passwd:   phoenix
     tty:      /dev/tty0
     Terminal type that must be used for callback: vt100

Date: Fri Apr  2 09:40:00 EST 1993

20   Site Configuration
     ---------------------------------

Cluster Node Name: fiver calltype: network
     suptype:  RCS2
25   sysid:    UD9998
     opphone:  (665) 555-3423
     opname:   Jonathan S.
     mail:     root
     passwd:   bennu
30   server:   hazel
     Terminal type that must be used for callback: vt100

Full Text of Message
     ---------------------------------

ERROR LABEL:     SRC
35   ERROR ID:        E18E984F
     Date/Time:       Fri Apr  2 09:39:55
     Sequence Number: 1788031
     Machine Id:      000004375C00
     Node Id:         fiver
40   Error Class:     S
     Error Type:      PERM
```

-131-
    Resource Name:   SRC

Error Description
    SOFTWARE PROGRAM ERROR

Probable Causes
5   APPLICATION PROGRAM

Failure Causes
    SOFTWARE PROGRAM

Recommended Actions
            PERFORM PROBLEM RECOVERY PROCEDURES

10  Detail Data
    SYMPTOM CODE
            256
    SOFTWARE ERROR CODE
            -9035
15  ERROR CODE
            0
    DETECTING MODULE
    'srchevn.c'@line:'162'
    FAILING MODULE
20  infod System Information
    -----------------------------------

OS Name: BOSX
    OS Version: 3
25  OS Release: 2

Configuration Information
    -----------------------------------

INSTALLED RESOURCE LIST WITH VPD

The following resources are installed on your machine.

30    sysplanar0         00-00             CPU Planar

Part Number.................043G1797
            EC Level....................00C74316
            Processor Identification....00000594
            ROS Level and ID............IPLVER1.0
35                                      LVL1.02,043G2189
            Processor Component ID......0102006300000014
            Device Specific.(Z0)........012048
            Device Specific.(Z1)........021047
            Device Specific.(Z2)........031246
40          Device Specific.(Z3)........041149
            Device Specific.(Z4)........CD234D

```
                            -132-
                Device Specific.(Z5)........ED234D
                Device Specific.(Z6)........0A114A
                Device Specific.(Z7)........2A114A
                Device Specific.(Z8)........4A114A
 5              Device Specific.(Z9)........6A114A
                ROS Level and ID............OCS(07040A00)
                ROS Level and ID............SEEDS(F0BABC01)

ioplanar0       00-00           I/O Planar

EC Level...................39

10      bus0            00-00           Microchannel Bus
        sio0            00-00           Standard I/O Planar Part Number................. 52G1265
                EC Level....................D25842
                Serial Number...............00000299
15              FRU Number.................. 52G1266
                Manufacturer................IBM97N
                Displayable Message.........STANDARD I/O
                Device Driver Level.........00
                Diagnostic Level............00
20              ROS Level and ID............0000
                Displayable Message......... STANDARD SCSI
                Device Driver Level.........00
                Diagnostic Level............00
                Loadable Microcode Level....0044
25              ROS Level and ID............0044
                Read/Write Register Ptr.....0100 fda0        00-00-0D        Standard I/O Diskette Adapter
        fd0         00-00-0D-00     Diskette Drive
        ppa0        00-00-0P        Standard I/O Parallel Port
30                                  Adapter
        lp0         00-00-0P-00     Bull Compuprint 4/51
        scsi0       00-00-0S        Standard SCSI I/O Controller
        hdisk0      00-00-0S-00     1.37 GB SCSI Disk Drive Device Specific.(Z0)........0000
35              Manufacturer................IBM
                Machine Type and Model......ST41600N
                Serial Number...............00055744
                Device Specific.(Z1)........70899604 cd0             00-00-0S-10     CD-ROM Drive

40              Device Specific.(Z0)........0580
                Manufacturer................TOSHIBA
                Machine Type and Model......CD-ROM DRIVE:XM
                ROS Level and ID............3232 hdisk1      00-00-0S-20     1.37 GB SCSI Disk Drive
```

-133-

```
            Device Specific.(Z0)........0000
            Manufacturer................IBM
            Machine Type and Model......ST41600N
            Serial Number...............00073612
            Device Specific.(Z1)........70899604 rmt0          00-00-0S-50        2.3 GB 8mm Tape Drive

Device Specific.(Z0)........0180
            Manufacturer................EXABYTE
            Machine Type and Model......EXB-8200 sa0           00-00-S1           Standard I/O Serial Port 1
  tty0          00-00-S1-00        Asynchronous Terminal
  sa1           00-00-S2           Standard I/O Serial Port 2
  tty1          00-00-S2-00        Asynchronous Terminal
  scsi1         00-01              SCSI I/O Controller Device Driver Level.........00
            Diagnostic Level............00
            Displayable Message.........SCSI
            EC Level....................C74317
            FRU Number.................. 31G9729
            Manufacturer................IBM97N
            Part Number................. 43G1811
            Serial Number...............
            Loadable Microcode Level....0044
            ROS Level and ID............0050
            Read/Write Register Ptr.....0100 hdisk2        00-01-00-00        1.37 GB SCSI Disk Drive

Device Specific.(Z0)........0000
            Manufacturer................IBM
            Machine Type and Model......ST41600N
            Serial Number...............00073493
            Device Specific.(Z1)........70899604 ent0          00-03              Ethernet High-
                                   Performance LAN
                                   Adapter Network Address.............02608C2F9E82
            ROS Level and ID............0015
            Displayable Message.........802.3/ETHERNET
            Part Number.................000G3369
            EC Level....................C73859
            Device Driver Level.........01
            Diagnostic Level............01
            FRU Number..................000G3368
            Serial Number...............00110116
            Manufacturer................204491
```

-134-

```
           x25s0            00-04              X.25 Adapter
           fddi0            00-05              FDDI Primary Card,
                                               Single Ring Fiber 5             Network Address.............10005AB8054F
               Displayable Message......... FDDI RING B
               EC Level....................C73876
               FRU Number.................. 81F9003
               Manufacturer................VEN0857049
               Part Number................. 31G9393
10             Serial Number...............001114
               ROS Level and ID............0000
               Loadable Microcode Level....01 fddi1            00-07              FDDI Primary Card,
                                               Dual Ring Fiber 15             Network Address.............10005AB8054E
               Displayable Message......... FDDI RING B
               EC Level....................C73876
               FRU Number.................. 81F9003
               Manufacturer................VEN0857049
20             Part Number................. 31G9393
               Serial Number...............001069
               ROS Level and ID............0000
               Loadable Microcode Level....01 fddix0           00-06              FDDI Extender Card
25         sa2              00-08              16-Port Asynchronous
                                               Adapter EIA-422A Displayable Message.........16PORT RS422
               EC Level....................C26396
               FRU Number..................030F9297
30             Manufacturer................ven0857049
               Part Number.................071F0976
               Serial Number...............001329 tty2             00-08-01-00        Asynchronous Terminal
           fpa0             00-00              Floating Point Processor
35         slc0             00-00              Serial Optical Link Chip
           slc1             00-00              Serial Optical Link Chip
           ioplanar1        00-10              I/O Planar EC Level....................FFFFFFFF bus1             00-10              Microchannel Bus
40         serdasda0        00-11              Serial-Link Disk
                                               Adapter Part Number.................045G2774
               Serial Number...............00009908
```

```
                           -135-
              EC Level...................0015720938
              Manufacturer................IBM053
              ROS Level and ID............000D
              Loadable Microcode Level....00
    5         Device Driver Level.........01
              Displayable Message.........SERIAL-ADAPTER serdasdc1         00-11-02           Serial-Link Disk
                                              Controller Part Number.................42G9575
   10         Serial Number...............00003738
              Machine Type and Model......9333-000
              Manufacturer................IBM       -0053
              ROS Level and ID............0C hdisk6            00-11-02-01        857MB F Serial-
   15                                         Link Disk Drive Part Number.................95X2431
              EC Level....................C79493
              Serial Number...............B182136E
              Machine Type and Model......9333-100
   20         Manufacturer................IBM       -0902
              ROS Level and ID............63
              Device Specific.(Z1)........ 9103944
              Device Specific.(Z2)........7102
              Device Specific.(Z3)........70F9042
   25         Device Specific.(Z4)........92087 hdisk7            00-11-02-03        857MB F Serial-
                                              Link Disk Drive Part Number.................95X2431
              EC Level....................C79493
   30         Serial Number...............B207056L
              Machine Type and Model......9333-100
              Manufacturer................IBM       -0902
              ROS Level and ID............52
              Device Specific.(Z1)........ 9104086
   35         Device Specific.(Z2)........5866
              Device Specific.(Z3)........70F9042
              Device Specific.(Z4)........92093 serdasdc0         00-11-03           Serial-Link Disk
                                              Controller 40         Part Number.................07G5194
              Serial Number...............00002893
              Machine Type and Model......9333-000
              Manufacturer................IBM       -0053
              ROS Level and ID............0B
```

```
                        -136-
    hdisk4              00-11-03-00         1.07GB F Serial-
                                            Link Disk Drive Part Number..................69F9821
            EC Level.....................C79493
5           Serial Number................R012573V
            Machine Type and Model.......9333-110
            Manufacturer.................IBM       -0902
            ROS Level and ID.............63
            Device Specific.(Z1)......... 8203386
10          Device Specific.(Z2).........10959
            Device Specific.(Z3).........70F9042
            Device Specific.(Z4).........92199 ent1                00-14               Ethernet High-
                                            Performance LAN
15                                          Adapter Network Address..............02608C2F8A70
            ROS Level and ID.............0015
            Displayable Message..........802.3/ETHERNET
20          Part Number..................000G3369
            EC Level.....................C73859
            Device Driver Level..........01
            Diagnostic Level.............01
            FRU Number...................000G3368
            Serial Number................00114965
25          Manufacturer.................204491 mpqa0               00-15               4-Port Multi-
                                            protocol
                                            Communications
                                            Controller
30  mpq0                00-15-00            Multiprotocol
                                            Adapter Port
    mpq1                00-15-01            Multiprotocol
                                            Adapter Port
    mpq2                00-15-02            Multiprotocol
35                                          Adapter Port
    mpq3                00-15-03            Multiprotocol
                                            Adapter Port
    mem0                00-0B               64 MB Memory Card Device Specific.(Z3)........07
40          EC Level....................21
            Device Specific.(Z0)........00
            Device Specific.(Z1)........00
            Device Specific.(Z2)........00
            Size........................64

45  mem1                00-0C               64 MB Memory Card

Device Specific.(Z3)........07
```

```
                        -137-
            EC Level....................21
            Device Specific.(Z0)........00
            Device Specific.(Z1)........00
            Device Specific.(Z2)........00
            Size........................64 mem2            00-0D              64 MB Memory Card

Device Specific.(Z3)........07
            EC Level....................21
            Device Specific.(Z0)........00
            Device Specific.(Z1)........00
            Device Specific.(Z2)........00
            Size........................64 mem3            00-0F              64 MB Memory Card

Device Specific.(Z3)........07
            EC Level....................21
            Device Specific.(Z0)........00
            Device Specific.(Z1)........00
            Device Specific.(Z2)........00
            Size........................64 mem4            00-0G              64 MB Memory Card

Device Specific.(Z3)........07
            EC Level....................21
            Device Specific.(Z0)........00
            Device Specific.(Z1)........00
            Device Specific.(Z2)........00
            Size........................64 mem5            00-0H              64 MB Memory Card

Device Specific.(Z3)........07
            EC Level....................21
            Device Specific.(Z0)........00
            Device Specific.(Z1)........00
            Device Specific.(Z2)........00
            Size........................64 sysunit0        00-00              Bull DPX/20 System
                                       Unit
```

-138-

SECTION IV - Cont'd.

3 - EXAMPLE OF E-MAIL FOR A CALLOUT

Successful callout to response center: Mon Mar 15 14:57:19 EST 1993

The reason for the callout is as follows:
------------------------------------------------

```
ERROR LABEL:      LION_BUFFERO
ERROR ID:         50CA5315

Date/Time:        Thu Mar 11 14:15:08
Sequence Number:  95740
Machine Id:       000006706300
Node Id:          onion
Error Class:      S
Error Type:       TEMP
Resource Name:    tty3/0
```

Error Description
Buffer overrun: 64 port concentrator

Failure Causes
EXCESSIVE LOAD ON PROCESSOR

Recommended Actions
    Reduce system load
    Reduce serial port baud rate

Notes:

If an E-mail address is configured, E-mail such as the above example will be sent to the specified address whenever a callout occurs.

If it is desired to send E-mail notification to several people at once, then an E-mail alias is used.

It will be apparent to those skilled in the art that many changes may be made to the preferred embodiment of the present invention. For example, while a UNIX based host computer system was shown as utilizing the present invention to provide remote support, the present invention may be used on other system platforms, in conjunction with other types of operating systems and graphical interfaces and other system configurations. Also, the invention may be used to monitor other types of host system sources.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of organizing and operating a proactive and reactive remote services facility (RSF) unit installable within a host system which is operatively connected to communicate with a remote response center dedicated to performing remote support services for said host system involving diagnosis of host system problems reported to said center, said method comprising the steps of:

(a) constructing a number of independently operable software components, each component being constructed for performing one of a predetermined number of different basic functions required for performing said proactive and reactive support for said host system;

(b) including in each of said number of software components, configuration control means for preconfiguring each component by establishing predetermined parameters defining how said each component is to perform said one of said number of basic functions in carrying out remote support; and, (c) integrating said number of software components together in a predetermined manner so that said components collectively perform said proactive and reactive remote support according to said predetermined parameters preconfigured in step (b).

2. The method of claim 1 wherein said host system includes a host computer, an operating system for controlling the operation of said host computer, a generic menu interface system (GMIS) unit for communicating with said operating system using menu initiated dialog sequences and a display terminal unit operatively coupled to said host computer and to said GMIS unit for enabling a user to enter commands directly or through said GMIS unit for execution by said RSF unit, said method further comprising the steps of:

(d) operatively coupling each of said number of software components to said GMIS unit; and, (e) including within each of said number of components, a number of modules which operatively couple to said GMIS unit, said number of modules being responsive to a different predetermined command set containing a small number of commands customized for configuring said each of said components according to step (b).

3. The method of claim 2 wherein said computer system includes a number of source error log files used by said host computer for logging errors encountered while running applications on said host computer and wherein said remotely located response center performs support services for said host system by calling back into said host system in response to a first component of said number of components having detected an overthreshold condition which caused a callout action to be made by said RSF unit for further diagnosis and correction of a system problem reported by said host system, said first component including said number of source error log files and a control attribute file and wherein said step (b) of said method further includes the steps of:

(f) configuring each of said number of source error log files to be monitored by causing storage of a source record entry in said control file for each of said number of source log files to be monitored, said record entry containing a unique user specified name for said log file, a path name to said log file, information identifying the type of log file, information identifying how often to scan for new messages and information designating what notification action to invoke if a message is detected by said first component as being overthreshold; and;

(g) initiating said notification action specified by said source record entry to said response center upon detecting an occurrence of an overthreshold condition within one of said source log files being monitored.

4. The method of claim 3 wherein step (f) further includes the step of specifying said scan rate by defining the time interval for monitoring error information being stored by each of said source error log files being monitored.

5. The method of claim 3 wherein step (f) further includes the step of configuring said notification action by specifying a callout action and/or an electronic mail notification action.

6. The method of claim 3 wherein step (f) further includes the step of configuring said type of source by indicating whether said source is a system or ASCII log file.

7. The method of claim 3 wherein said first component includes a message template database associated with each source log file to be monitored and wherein said step (f) further includes the steps of:

(h) configuring said potential messages to be monitored by causing storage in said message template database designated by said source identifier contained in said control file entry for said each source log file, a number of information message entries corresponding to a number of said potential messages to be monitored, each said entry including search criteria information used for detecting when said potential message should be deemed to match messages stored in said source error log file and threshold information indicating a number of messages that must be exceeded to be deemed an occurrence of an over threshold condition.

8. The method of claim 7 wherein said search criteria includes either a message identifier for each system type of source error log file or regular expression parameters for each ASCII type of source error log file.

9. The method of claim 7 wherein said step of configuring said message template database is performed in response to a user generated make message source command.

10. The method of claim 9 wherein said method further includes the steps of:

(i) issuing a make message template command for creating an initialization file containing said number of messages to be added to said message template database file; and, (j) designating said initialization file by including in said make message source command, a parameter specifying said initialization file.

11. The method of claim 7 wherein said first component further includes a storage library, said library being operatively coupled to said control file, said message template databases and source error log files and wherein said method further includes the steps of:

(k) storing a plurality of different types of routines in said library; and (l) accessing different ones of said routines in response to different commands within said small set of commands to configure said first component.

12. The method of claim 11 wherein said plurality of different types of routine includes a number of different search routines, one for each different type of source error log file and wherein said method further includes the steps of:

(m) accessing one of said different search routines according to type information stored in said control file for scanning said source by reading messages from said source and comparing each message with message entries stored in said message template database for determining a match according to search criteria specified in said message entries.

13. The method of claim 3 wherein said number of components further includes a second component operatively coupled to said operating system and to said first component and wherein said method further includes the steps of:

(h) preconfiguring said second component to be responsive to said notification action to perform any support notification operation in accordance with said specified callout action as preconfigured by said user.

14. The method of claim 13 wherein said number of modules of said second component further includes a call configuration file and a call configuration module coupled to said file and to said GMIS unit and wherein step (g) further includes the steps of:

(1) configuring site parameters and modem parameters through said GMIS unit as a function of how said host system has been configured;

(2) initiating storage of said site parameters and modem parameters in said call configuration file by causing generation of a predetermined one of said set of commands with a preestablished command line; and (3) said call configuration module in response to said predetermined command causing said site parameters and modem parameters to be written into said call configuration file for subsequent use in controlling how said second component performs support notification operations.

15. The method of claim 14 wherein said host system is configurable in standalone, cluster client and cluster server configurations and wherein steps (1) through (3) are performed wherein said host system is configured in said standalone and cluster server configurations.

16. The method of claim 15 wherein said host system is configured in a cluster client configuration and wherein said RSF unit further includes a third component for performing support notification operations using communications facilities of another host system, said number of modules of said third component including a call configuration module coupled to said GMIS unit and a call configuration file coupled to said call configuration module and to said GMIS unit and wherein in lieu of steps (1) through (3) being performed, said method further includes the steps of:

(4) configuring cluster server parameters through said GMIS unit;

(5) initiating storage of said cluster server parameters in said call configuration file by causing generation of a predetermined command with a preestablished command line; and (6) said call configuration module in response to said predetermined command causing said cluster server parameters to be written into said call configuration file for subsequent use in controlling how said third component performs support notification operations.

17. The method of claim 14 wherein step (1) further includes the steps of:

(7) configuring communications control OK and CONNECT strings as a function of modem type being used;

(8) initiating storage of said communications control OK and CONNECT strings in said call configuration file by causing generation of said predetermined command with a preestablished command line; and (9) said call configuration in response to said predetermined command causing said communications control OK and CONNECT strings to be written into said call configuration file for controlling how said second component performs support notification operations.

18. The method of claim 14 wherein said number of modules of said second component further includes a call configuration file, a call configuration module coupled to said file and to said GMIS unit and a mailaction module operatively coupled to said operating system, to said first component and to said call configuration file and wherein step (g) of said method further includes the steps of:

configuring electronic mail address parameters as a function of whether said support notification operation includes a mail notification action;

initiating storage of said electronic mail address parameters in said call configuration file by causing generation of said predetermined command with a preestablished command line; and said call configuration module in response to said predetermined command causing said electronic mail parameters to be written into said call configuration file for enabling said mail action module to perform said mall notification action using said electronic mail parameters.

19. The method of claim 13 wherein said number of modules of said second component further includes a callout manager subcomponent including a call control file containing a callout queue for storing callout requests generated in response to callout actions initiated by said first component and a plurality of different call modules, each different call module being operatively coupled to said GMIS unit and wherein said method further includes the steps of:

removing a callout request through said GMIS unit by initiating generation of a first one of said small set of commands; and a first one of said different call modules in response to said first one of said set of commands accessing said call control file and removing said callout request from said callout queue.

20. The method of claim 19 wherein said method further includes the steps of:

changing parameters of a callout request by initiating generation of a second one of said set of commands with command line parameters; and a second one of said different callout modules in response to said second one of said set of commands accessing said call control file and changing said callout request stored in said callout queue according to said command line parameters.

21. The method of claim 19 wherein said method further includes the steps of:

listing callout requests stored in said callout queue by initiating generation of a third one of said set of commands; and a third one of said different callout modules in response to said third one of said set of commands accessing said call control file and listing each request stored in said callout queue.

22. The method of claim 2 wherein said number of components further includes a fourth component operatively coupled to said operating system and to said GMIS unit and wherein said step (b) of said method further includes the steps of:

preconfiguring said fourth component to enable further diagnosis of said problem by said response center by accessing facilities of said host system only as preconfigured.

23. The method of claim 22 wherein said number of modules of said fourth component includes a permissions subcomponent including a configure permissions module operatively coupled to said GMIS unit, a remote configuration file coupled to said configure permissions module and a doremote module coupled to said GMIS unit and to said remote configuration file, said preconfiguring step further including the steps of:

configuring whether remote dial-in access is to be permitted as a function of how said host system is configured and whether root access privileges are to be granted by generating a predetermined command with a preestablished command line parameters;

said configure permissions module in response to said predetermined command storing said parameters in said remote configuration file; and said doremote module in response to a remote command specifying a task to be performed, accessing said remote configuration file to determine whether said task is allowed to be performed by said doremote module.

24. The method of claim 22 wherein said fourth component further includes a mirroring monitoring subcomponent, said subcomponent including a configuration monitor module operatively coupled to said GMIS unit and a monitoring configuration file coupled to said configuration monitor module and wherein said preconfiguring step further includes the steps of:

configuring said monitoring subcomponent by selecting parameters defining types of session scripting operations to be performed by said monitoring subcomponent and generating a predetermined command with command line parameters; and, said configuration monitor module in response to said predetermined command accessing said monitoring configuration file and writing said parameters into said file specifying how said session scripting is to be performed.

25. The method of claim 24 wherein said configuring step further includes the step of entering a terminal type parameter for defining the type of terminal which is to be used by said response center in making the callback to said host system.

26. The method of claim 1 wherein said number of components of said RSF unit are included within a predetermined number of subpackages, said predetermined number of subpackages including a problem detection and reaction subpackage, a system action subpackage, a callback subpackage and a cluster subpackage and wherein said method further includes the step of:

selectively loading predetermined ones of said predetermined number of subpackages as a function of how said host system has been configured to operate.

27. The method of claim 2 wherein said GMIS unit utilizes a hierarchical organization of menu screens, said organization including an initial problem determination submenu containing a number of selection items relating to specific components of said number of components, each selection item leading to a number of submenus which in turn lead to dialogs for each command of said small number of commands enabling configuration of said number of said components.

28. A proactive and reactive remote services facility (RSF) unit installable within a host system which is operatively connected to communicate with a remote response center dedicated to performing remote support services for said host system involving diagnosis of host system problems reported to said center, said RSF unit comprising:

a number of independently operable software components, each component being constructed for performing one of a predetermined number of different basic functions required for performing said proactive and reactive support for Said host system;

each of said components including configuration control means for preconfiguring said each component by establishing predetermined parameters defining how said each component is to perform said one of said number of basic functions in carrying out remote support; and, means for integrating said number of software components together in a predetermined manner so that said components collectively perform said proactive and reactive remote support according to said predetermined parameters.

29. The RSF unit of claim 28 wherein said host system includes a host computer, an operating system for controlling the operation of said host computer, a generic menu interface system (GMIS) unit for communicating with said operating system using menu initiated dialog sequences and a display terminal unit operatively coupled to said host computer and to said GMIS unit for enabling a user to enter commands directly or through said GMIS unit for execution by said RSF unit, said RSF unit further comprising:

means operatively coupling each of said number of software components to said GMIS unit; and, each of said number of components further including a number of modules which operatively couple to said GMIS unit, said number of modules being responsive to a different predetermined command set containing a small number of commands customized for configuring said each of said components.

30. The RSF unit of claim 29 wherein said host computer further includes utility and application programming means for logging errors encountered while running on said host computer and wherein said remotely located response center performs support services for said host system by calling back into said host system in response to a first component of said number of components having detected an overthreshold condition which caused a callout action to be made by said RSF unit for further diagnosis and correction of a system problem reported by said host system, said first component further including:

a number of source error log files used by said programming means for logging said errors and a control attribute file;

means for configuring each of said number of source error log files to be monitored, said means for configuring causing storage of a source record entry in said control file for each of said number of source log files to be monitored, said record entry containing a unique user specified name for said log file, a path name to said log file, information identifying the type of log file, information identifying how omen to scan for new messages and information designating what notification action to invoke if a message is detected by said first component as being overthreshold; and;

means for initiating said notification action specified by said source record entry to said response center upon detecting an occurrence of an overthreshold condition within one of said source log ties being monitored.

31. The RSF unit of claim 30 wherein said means for configuring further includes means for specifying said scan rate by storing information coded to designate a time interval for monitoring error information being stored by each of said source error log files being monitored.

32. The RSF unit of claim 30 wherein said means for configuring further includes means for storing information coded for specifying a callout action and/or an electronic mail notification action.

33. The RSF unit of claim 30 wherein said means for configuring further includes means for storing type information coded to designate said source as a system or ASCII log file.

34. The RSF unit of claim 30 wherein said first component includes a message template database associated with each source log file to be monitored and wherein said means for configuring further includes:

module means for configuring said potential messages to be monitored by causing storage in said message template database designated by said source identifier contained in said control file entry for said each source log file, a number of information message entries corresponding to a number of said potential messages to be monitored, each said entry including search criteria information used for detecting when said potential message should be deemed to match messages stored in said source error log file and threshold information indicating a number of messages that must be exceeded to be deemed an occurrence of an over threshold condition.

35. The RSF unit of claim 34 wherein said search criteria includes either a message identifier for each system type of source error log file or regular expression parameters for each ASCII type of source error log file.

36. The RSF unit of claim 34 wherein said module means for configuring said message template database is responsive to a user generated make message source command.

37. The RSF unit of claim 34 wherein said first component further includes a library operatively coupled to said control file, said message template databases and source error log files and wherein said library stores a plurality of different types of routines which are accessed in response to said different commands of said small set of commands for configuring said first component.

38. The RSF unit of claim 34 wherein said plurality of different types of routines includes a number of different search routines, one for each different type of source error log file and wherein said means for configuring further includes:

means for accessing one of said different search routines according to type information stored in said control file for scanning said source by reading messages from said source; and, means for comparing each message with message entries stored in said message template database for determining a match according to search criteria specified in said message entries.

39. The RSF unit of claim 29 wherein said number of components further includes a second component operatively coupled to said operating system and to said first component and wherein said means for configuring further includes:

preconfiguring said second component to be responsive to said notification action to perform any support notification operation in accordance with said specified callout action as preconfigured by said user.

40. The RSF unit of claim 39 wherein said number of modules of said second component further includes a call configuration file and a call configuration module coupled to said file and to said GMIS unit, said means for configuring including:

means for configuring site parameters and modem parameters through said GMIS unit as a function of how said host system has been configured;

means for initiating storage of said site parameters and modem parameters in said call configuration file by causing generation of a predetermined one of said set of commands with a preestablished command line; and said call configuration module in response to said predetermined command causing said site parameters and modem parameters to be written into said call configuration file for subsequent use in controlling how said second component performs support notification operations.

41. The RSF unit of claim 40 wherein said host system is configurable in standalone, cluster client and cluster server configurations and wherein said host system is configured in said standalone and cluster server configurations.

42. The RSF unit of claim 41 wherein said host system is configured in a cluster client configuration and wherein said RSF unit further includes a third component for performing support notification operations using communications facilities of another host system, said number of modules of said third component including a call configuration module coupled to said GMIS unit and a call configuration file coupled to said call configuration module and to said GMIS unit and wherein in lieu of configuring site parameters and modem parameters, said configuring means includes:

means for configuring cluster server parameters through said GMIS unit;

means for initiating storage of said cluster server parameters in said call configuration file by causing generation of a predetermined command with a preestablished command line; and said call configuration module in response to said predetermined command causing said cluster server parameters to be written into said call configuration file for subsequent use in controlling how said third component performs support notification operations.

43. The RSF unit of claim 41 wherein said means for configuring further includes:

means for configuring communications control OK and CONNECT strings as a function of modem type being used;

means for initiating storage of said communications control OK and CONNECT strings in said call configuration file by causing generation of said predetermined command with a preestablished command line; and said call configuration in response to said predetermined command causing said communications control OK and CONNECT strings to be written into said call configuration file for controlling how said second component performs support notification operations.

44. The RSF unit of claim 39 wherein said number of modules of said second component further includes a call configuration file, a call configuration coupled to said file and to said GMIS unit and a mailaction module operatively coupled to said operating system, to said first component and to said call configuration file and wherein said means for configuring further includes:

means for configuring electronic mail address parameters as a function of whether said support notification operation includes a mail notification action;

means for initiating storage of said electronic mail address parameters in said call configuration file by causing generation of said predetermined command with a preestablished command line; and said call configuration module in response to said predetermined command causing said electronic mail parameters to be written into said call configuration file for enabling said mail action module to perform said mail notification action using said electronic mail parameters.

45. The RSF unit of claim 40 wherein said number of modules of said second component further includes a callout manager subcomponent including a call control file containing a callout queue for storing callout requests generated in response to callout actions initiated by said first component and a plurality of different call modules, each different call module being operatively coupled to said GMIS unit and wherein said second component further includes:

means for removing a callout request through said GMIS unit by initiating generation of a first one of said small set of commands; and a first one of said different call modules in response to said first one of said set of commands accessing said call control file and removing said callout request from said callout queue.

46. The RSF unit of claim 45 wherein said second component further includes:

means for changing parameters of a callout request by initiating generation of a second one of said set of commands with command line parameters; and a second one of said different callout modules in response to said second one of said set of commands accessing said call control file and changing said callout request stored in said callout queue according to said command line parameters.

47. The RSF unit of claim 45 wherein said second component further includes:

means for listing callout requests stored in said callout queue by initiating generation of a third one of said set of commands; and a third one of said different callout modules in response to said third one of said set of commands accessing said call control file and listing each request stored in said callout queue.

48. The RSF unit of claim 30 wherein said number of components further includes a fourth component operatively coupled to said operating system and to said GMIS unit and wherein said means for configuring further includes:

means for configuring said fourth component to enable further diagnosis of said problem by said response center by accessing facilities of said host system only as preconfigured.

49. The RSF unit of claim 48 wherein said number of modules of said fourth component includes a permissions subcomponent including a configure permissions module operatively coupled to said GMIS unit, a remote configuration file coupled to said configure permissions module and a doremote module coupled to said GMIS unit and to said remote configuration file, said configuring means further including:

means for configuring whether remote dial-in access is to be permitted as a function of how said host system is configured and whether root access privileges are to be granted by generating a predetermined command with a preestablished command line parameters;

said configure permissions module in response to said predetermined command storing said parameters in said remote configuration file; and said doremote module in response to a remote command specifying a task to be performed, accessing said remote configuration file to determine whether said task is allowed to be performed by said doremote module.

50. The RSF unit of claim 48 wherein said fourth component further includes a mirroring monitoring subcomponent, said subcomponent including a configuration monitor module operatively coupled to said GMIS unit and a monitoring configuration file coupled to said configuration monitor module and wherein said preconfiguring means further includes:

means for configuring said monitoring subcomponent by selecting parameters defining types of session scripting operations to be performed by said monitoring subcomponent and generating a predetermined command with command line parameters; and, said configuration monitor module in response to said predetermined command accessing said monitoring configuration file and writing said parameters into said file specifying how said session scripting is to be performed.

51. The RSF unit of claim 50 wherein said means for configuring further includes means for entering a terminal type parameter defining the type of terminal which is to be used by said response center in making the callback to said host system.

52. The RSF unit of claim 29 wherein said GMIS unit utilizes a hierarchical organization of menu screens, said organization including an initial submenu containing a number of selection items relating to specific components of said number of components, each selection item leading to a number of submenus which in turn lead to dialogs for each command of said small number of commands enabling configuration of said number of said components through said configuration means.

\* \* \* \* \*